(12) United States Patent
Neier et al.

(10) Patent No.: US 12,342,797 B2
(45) Date of Patent: Jul. 1, 2025

(54) AUTONOMOUS SYSTEM FOR EVENLY DISPENSING LIVESTOCK FEED

(71) Applicant: Roto-Mix, LLC, Dodge City, KS (US)

(72) Inventors: Rodney R. Neier, Dodge City, KS (US); Mark T. Cooksey, Dodge City, KS (US); Kelly J. Wittman, Dodge City, KS (US); Ross M. Groening, Dodge City, KS (US); Andrew Fillingim, Plymouth, MI (US); Timothy Spencer, Dodge City, KS (US); Corbin Dale Baldwin, Dodge City, KS (US); Leonard Gasior, Plymouth, MI (US); Jennifer Anne Ogles, Dodge City, KS (US)

(73) Assignee: Roto-Mix, LLC, Dodge City, KS (US)

( * ) Notice: Subject to any disclaimer, the term of this patent is extended or adjusted under 35 U.S.C. 154(b) by 84 days.

(21) Appl. No.: 17/818,594

(22) Filed: Aug. 9, 2022

(65) Prior Publication Data
US 2023/0044138 A1    Feb. 9, 2023

Related U.S. Application Data

(60) Provisional application No. 63/260,083, filed on Aug. 9, 2021.

(51) Int. Cl.
*A01K 5/02*    (2006.01)
(52) U.S. Cl.
CPC .......... *A01K 5/0283* (2013.01); *A01K 5/0208* (2013.01)

(58) Field of Classification Search
CPC .. A01K 5/0283; A01K 5/0208; A01K 5/0275; G05B 19/4155
See application file for complete search history.

(56) References Cited

U.S. PATENT DOCUMENTS

| 3,139,217 | A  | 6/1964  | Mell          |
| 3,409,155 | A  | 11/1968 | Hamlet        |
| 5,008,821 | A  | 4/1991  | Pratt et al.  |
| 5,424,957 | A  | 6/1995  | Kerkhoff et al. |
| 6,690,160 | B2 | 2/2004  | Gray et al.   |
| 6,923,393 | B1 | 8/2005  | Neier et al.  |

(Continued)

OTHER PUBLICATIONS

AE-2008-006, Circuit Considerations for Decaying the Load Sense Signal in Open Circuit Load Sense Pumps, Danfoss, 2008, 6 pages.

(Continued)

*Primary Examiner* — Donnell A Long
(74) *Attorney, Agent, or Firm* — McKee, Voorhees & Sease, PLC

(57) ABSTRACT

An autonomous feed delivery system for evenly dispensing a specified amount of feed into a specified distance such as a feed bunk. This results in a concisely controlled rate of discharge per linear distance which is critical to achieving an even and accurate delivery of the specified amount of feed into the feed bunk. Features can include using a georeferenced map of feed bunks to identify correct feed rations to the correct bunks based on a prescription for each bunk, and preventing feed dispensing outside of bunk locations, load sense hydraulic control to provide hydraulic power to dispensing independent of vehicle engine rpm, and interruption of bulk feed supply to the dispensing sub-system if indications of overload are sensed.

30 Claims, 89 Drawing Sheets

(56) References Cited

U.S. PATENT DOCUMENTS

Figure 1A:
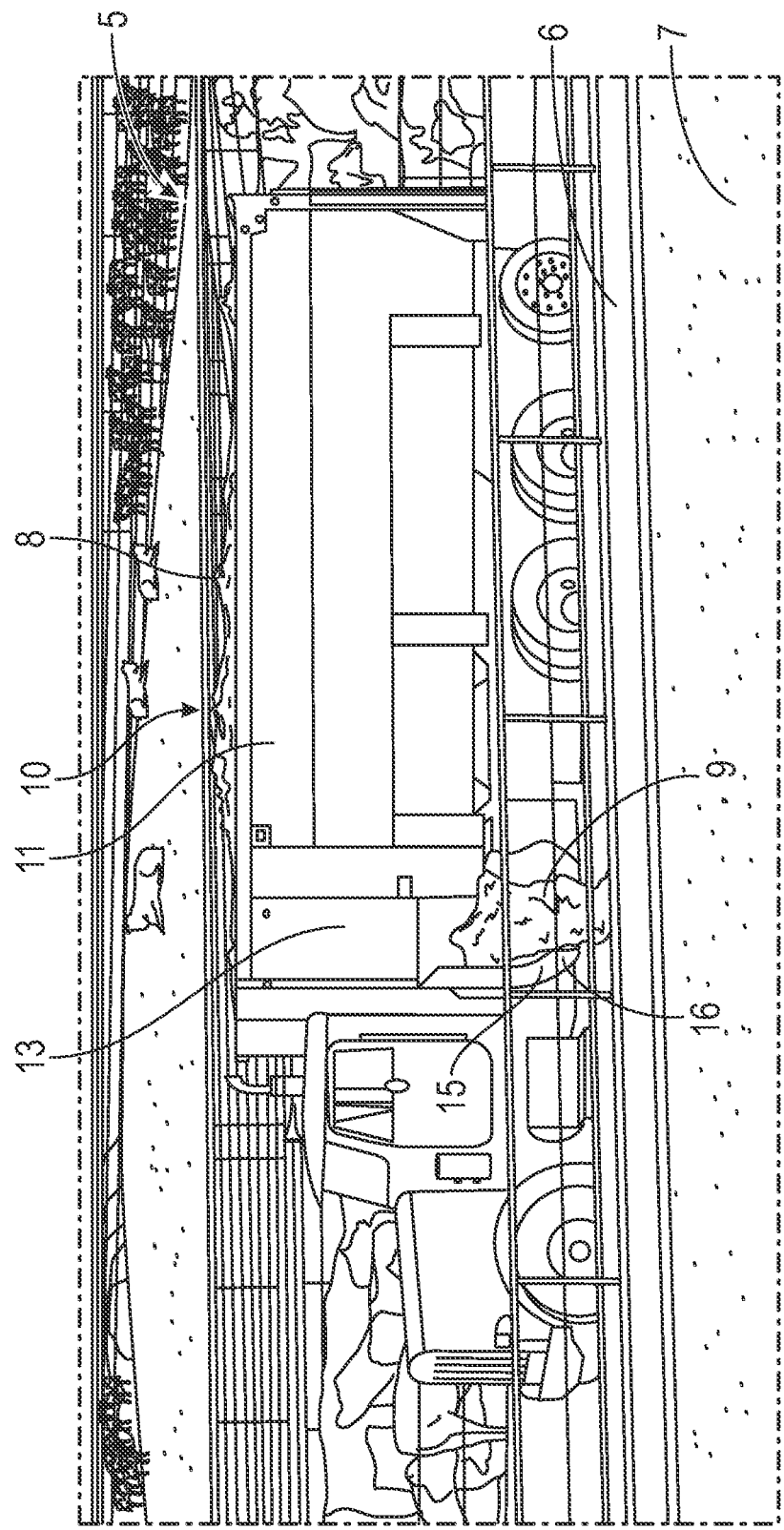

| | | | |
|---|---|---|---|
| 7,172,137 | B2 | 2/2007 | Neier et al. |
| 7,566,166 | B2 | 7/2009 | Neier et al. |
| 7,681,527 | B2 | 3/2010 | Pratt |
| 8,177,419 | B2 | 5/2012 | Neier et al. |
| 9,638,179 | B2 | 5/2017 | Sivaramakrishnan et al. |
| 9,832,547 | B2 | 11/2017 | McCleland et al. |
| 10,628,756 | B1 * | 4/2020 | Kuper .................. H04W 4/029 |
| 2007/0012039 | A1 | 1/2007 | Takebe |
| 2018/0154936 | A1 | 6/2018 | Yamasaki et al. |
| 2019/0212749 | A1 | 7/2019 | Chen et al. |
| 2019/0234047 | A1 * | 8/2019 | Nygren ................. E02F 9/2004 |
| 2020/0015450 | A1 | 1/2020 | Young et al. |
| 2020/0089244 | A1 | 3/2020 | Zhang et al. |

OTHER PUBLICATIONS

"What is J1939?" CSS Electronics, retrieved from the Internet on Aug. 8, 2021 <URL:https://www.csselectronics.com/screen/page/simple-intro-j1939-explained/language/en>, 5 pages.

Controllers, New Eagle, Datasheet, retrieved from the Internet on Aug. 8, 2021 <URL:https://wiki.neweagle.net/index.php?title=Controllers>, 2 pages.

Data Link Troubleshooting, NHTSA, Dec. 5, 2016. Retrieved from the Internet <URL:https://static.nhtsa.gov/odi/tsbs/2016/MC-10115656-9999.pdf>, 1 page.

DBW PWM to Analog Pedal Emulator, New Eagle, Datasheet, retrieved from the Internet on Aug. 8, 2021 <URL:https://wiki.neweagle.net/index.php?title=IO_Devices>, 1 page.

Directly Mounted CAN Controls, Product Documentation, HAWE Hydraulik SE, Mar. 14, 2020, 20 pages.

Hall Effect Sensors, Flange Mount Geartooth, 55505, Datasheet, Littelfuse, Oct. 16, 2015, 2 pages.

International Search Report and Written Opinion in PCT/US2022/039832, mailed Nov. 1, 2022, 12 pages.

Pedal Robots, AB Dynamics, 2022, retrieved from the Internet on Jul. 29, 2022 <URL:https://www.abdynamics.com/en/products/track-testing/driving-robots/pedal-robots>, 1 page.

Piston Pump Controls, Datasheet, Hydraulic Pump/Motor Division, Parker, PowerPoint created May 24, 2004, modified Jul. 22, 2005, 9 pages.

"Position Sensing SMART Cylinders: The Ultimate in Automation," RHK Hydraulic Cylinder Services Inc., 2022, retrieved from the Internet on Jul. 29, 2022 <URL:https://rhkhydraulics.com/blog/position-sensing-smart-cylinders-the-ultimate-in-automation/>, 1 page.

Precision Feeding Suite, Digistar, 2016, 6 pages.

Technical Information, Series 45 G Frame Pumps, Danfoss, Sep. 2013, 20 pages.

\* cited by examiner

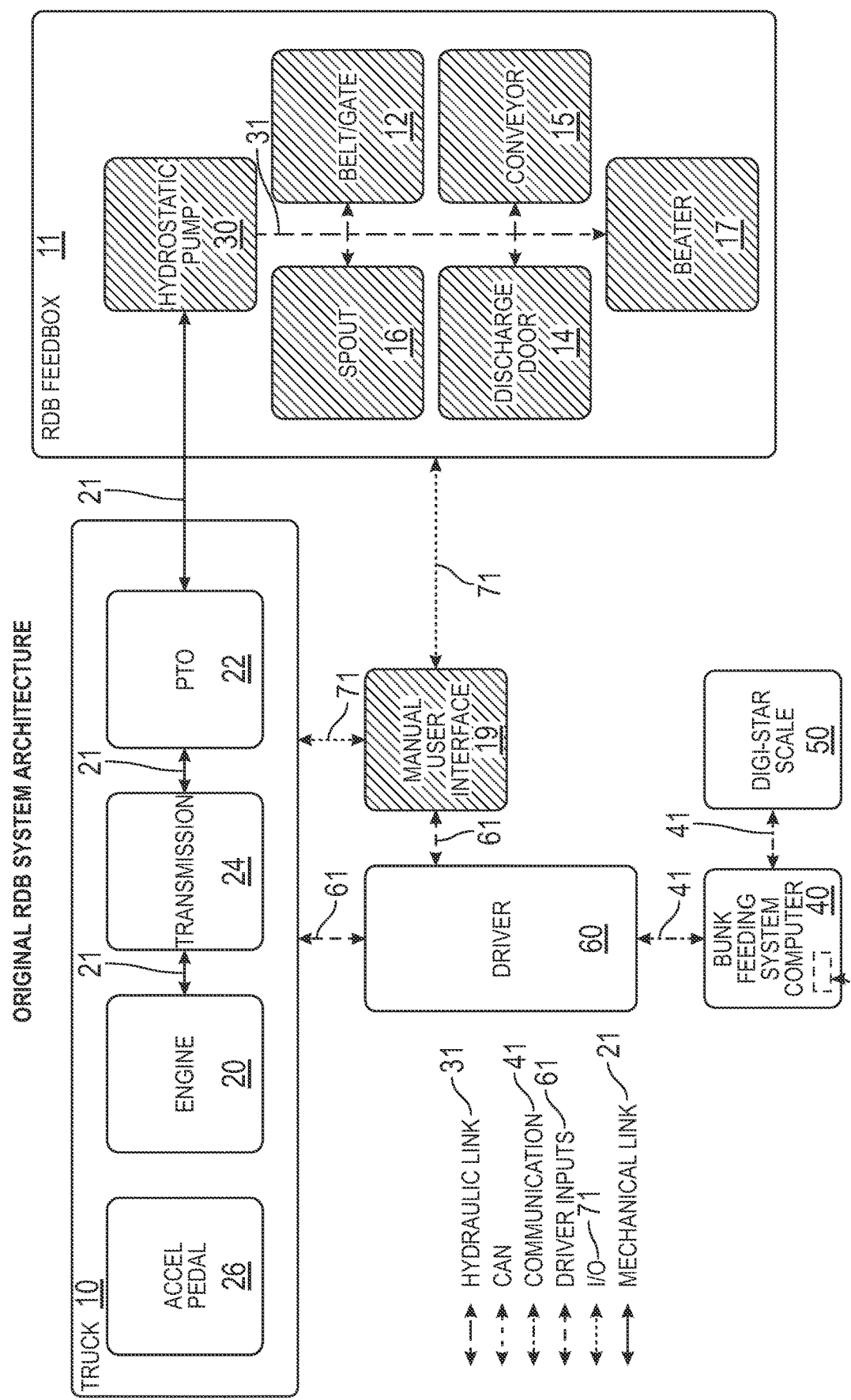
FIG. 1C (MANUAL CONTROL)

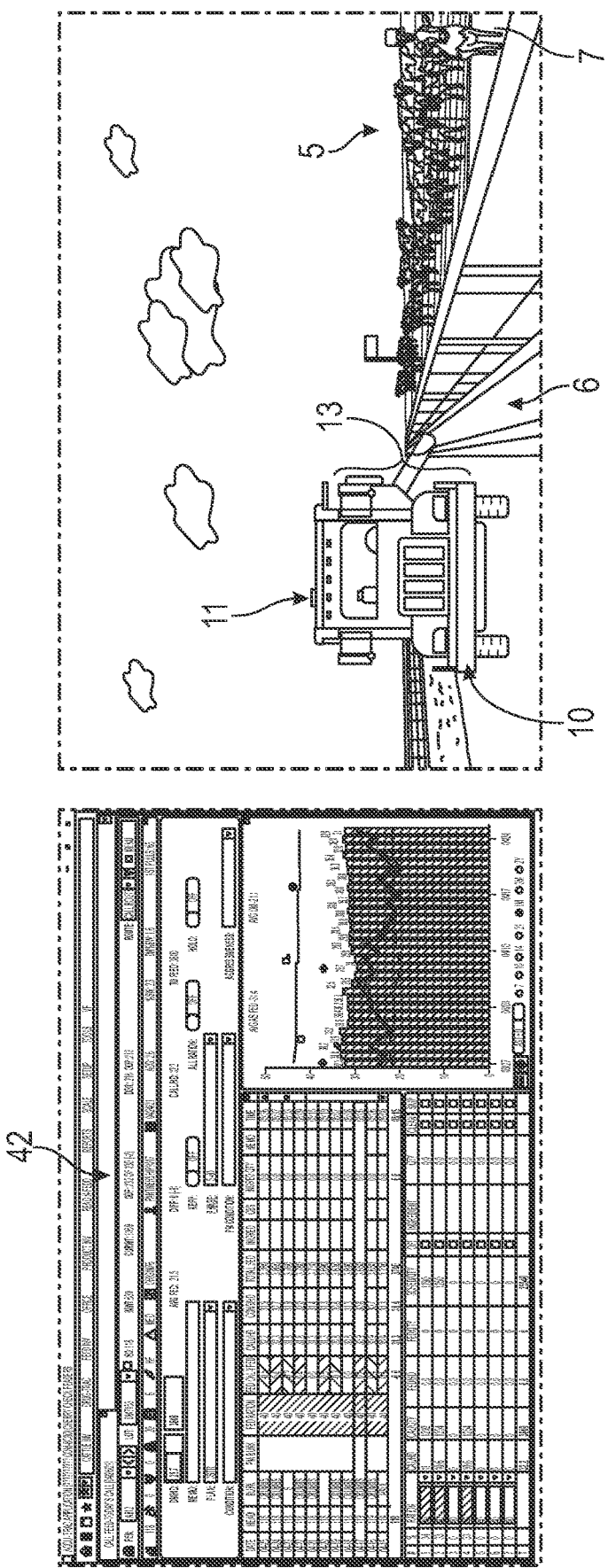
FIG. 1D (THIRD PARTY FEED LOT MAPPING)

FIG. 1E (THIRD PARTY MAPPING)

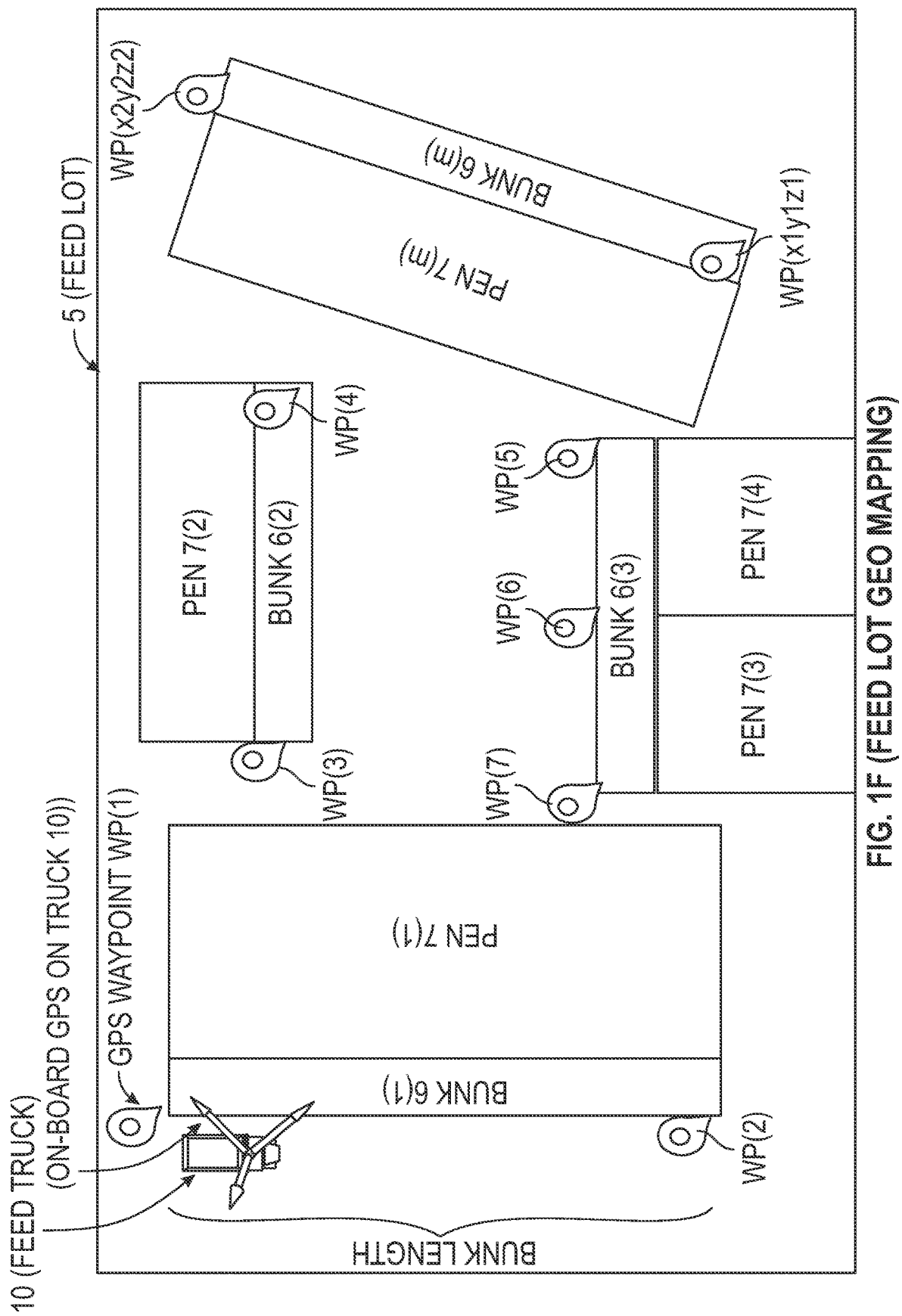
FIG. 1F (FEED LOT GEO MAPPING)

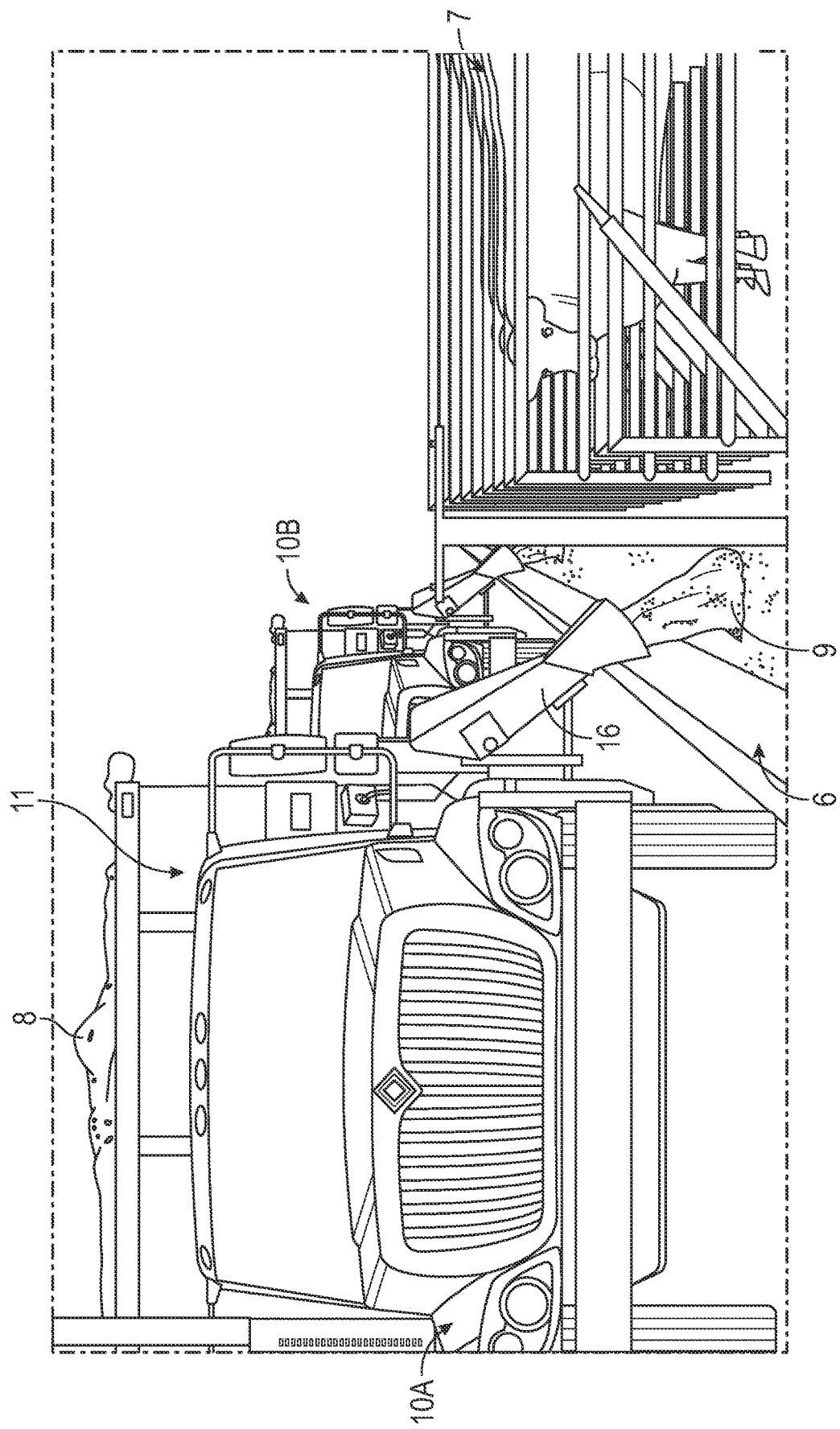
FIG. 1G (PRIOR ART-FEED DISPENSING)

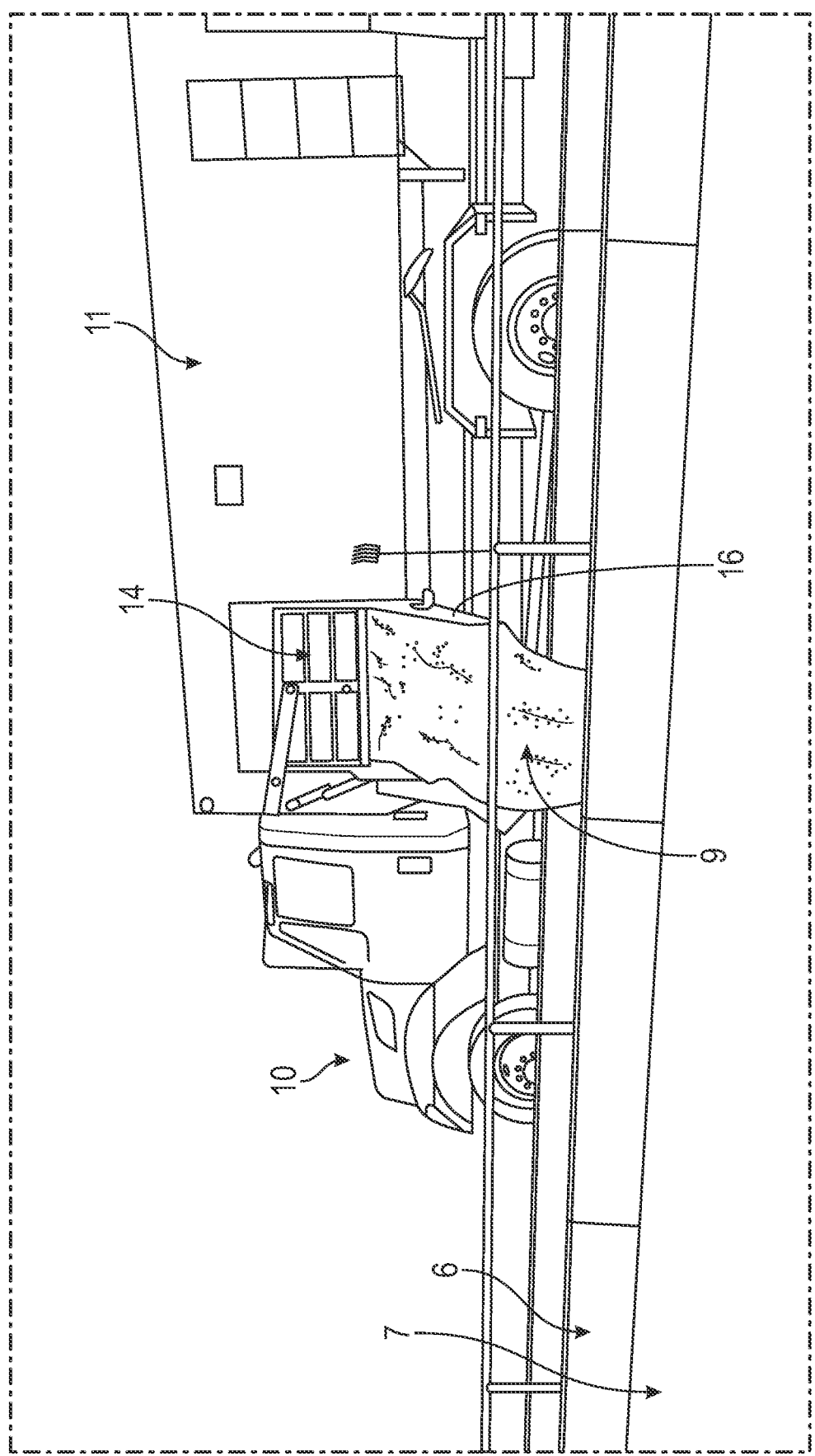
FIG. 1H (PRIOR ART-FEED DISPENSING)

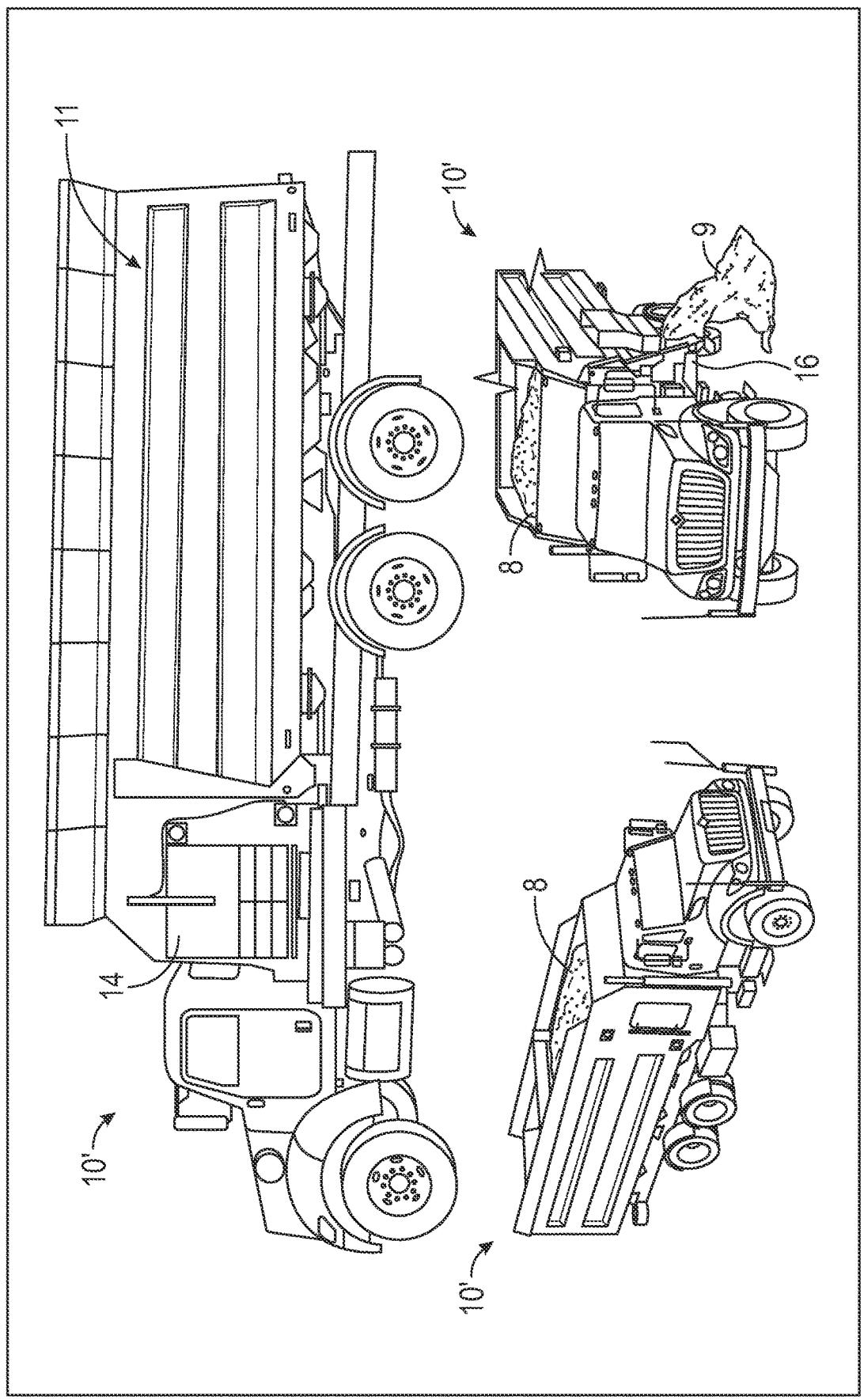
FIG. 2A (INVENTION-AUTOMATED FEEDING TRUCK)

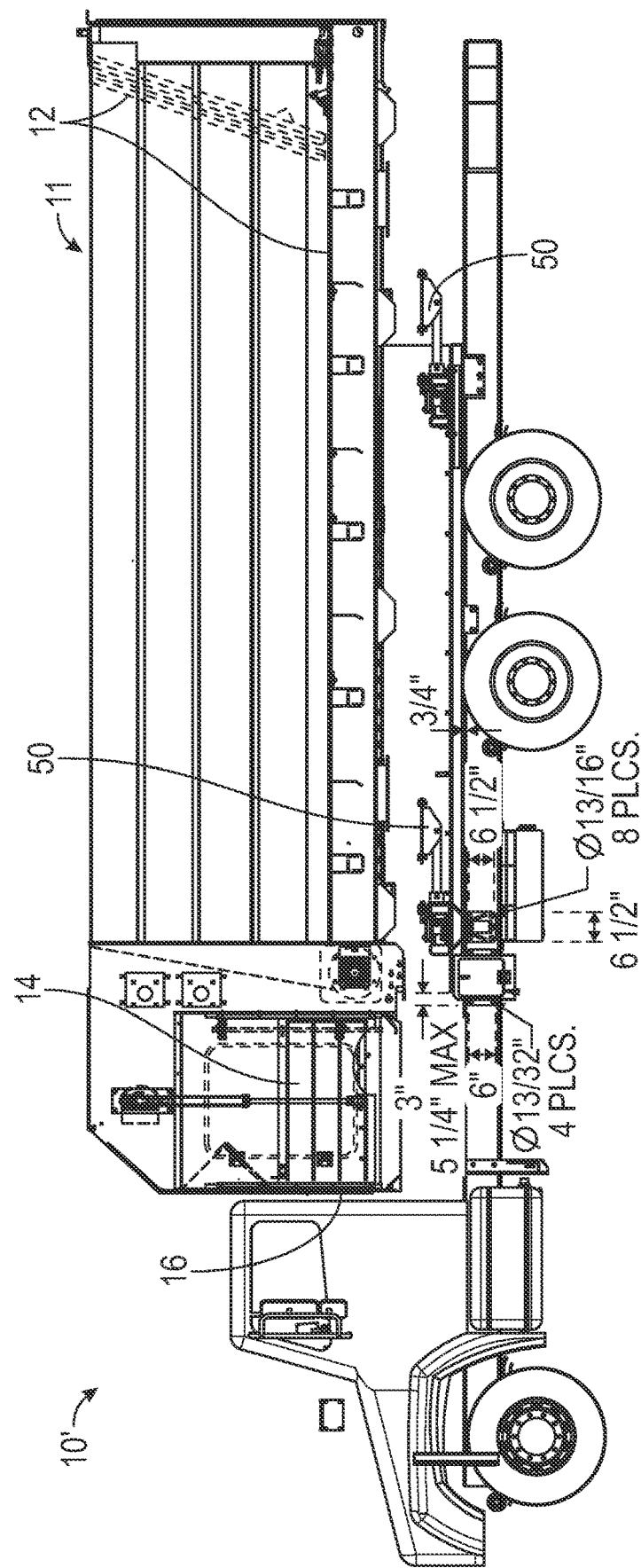
FIG. 2B (INVENTION-AUTOMATED FEEDING TRUCK)

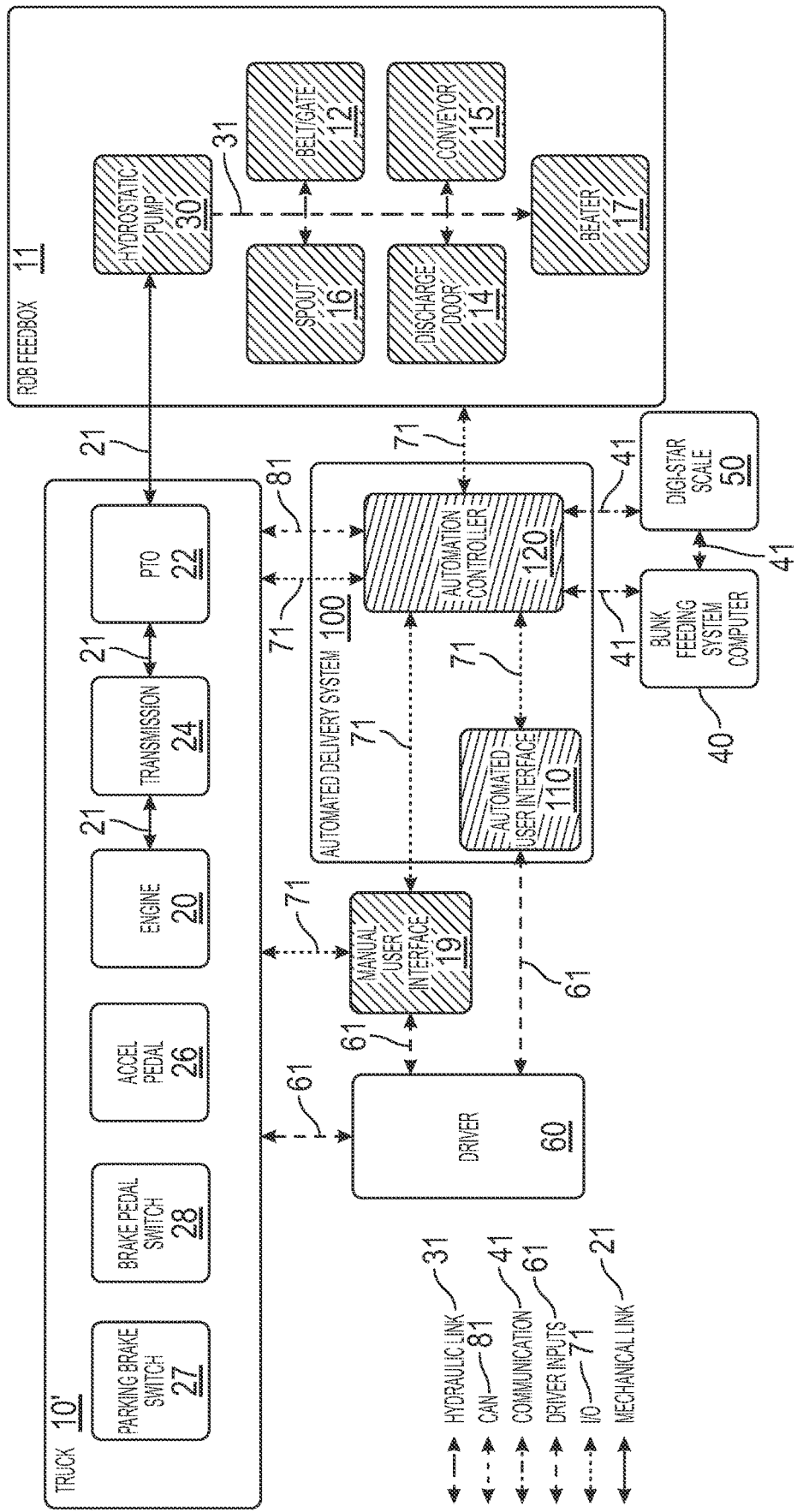
FIG. 2C (INVENTION)

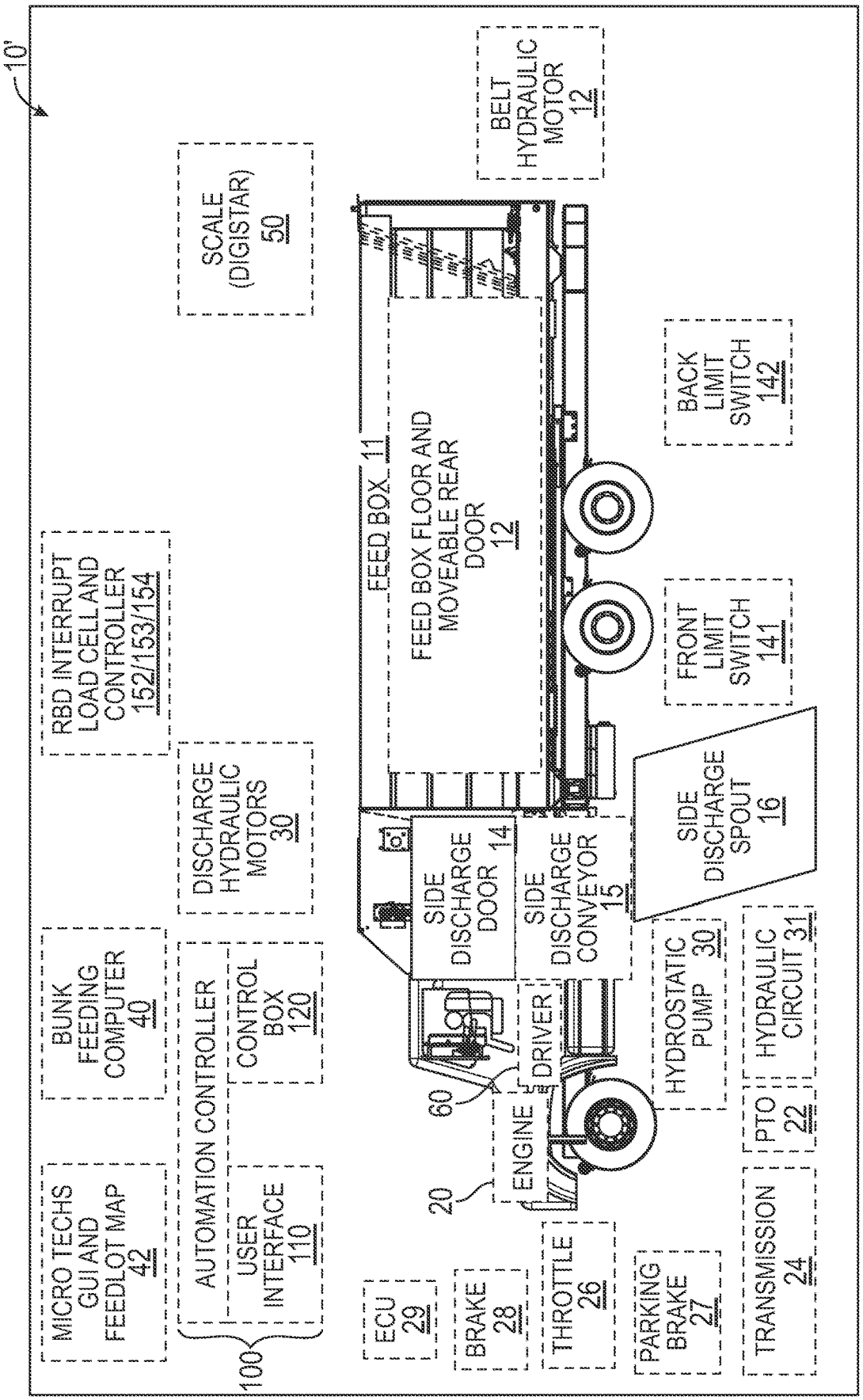
FIG. 2D (INVENTION)

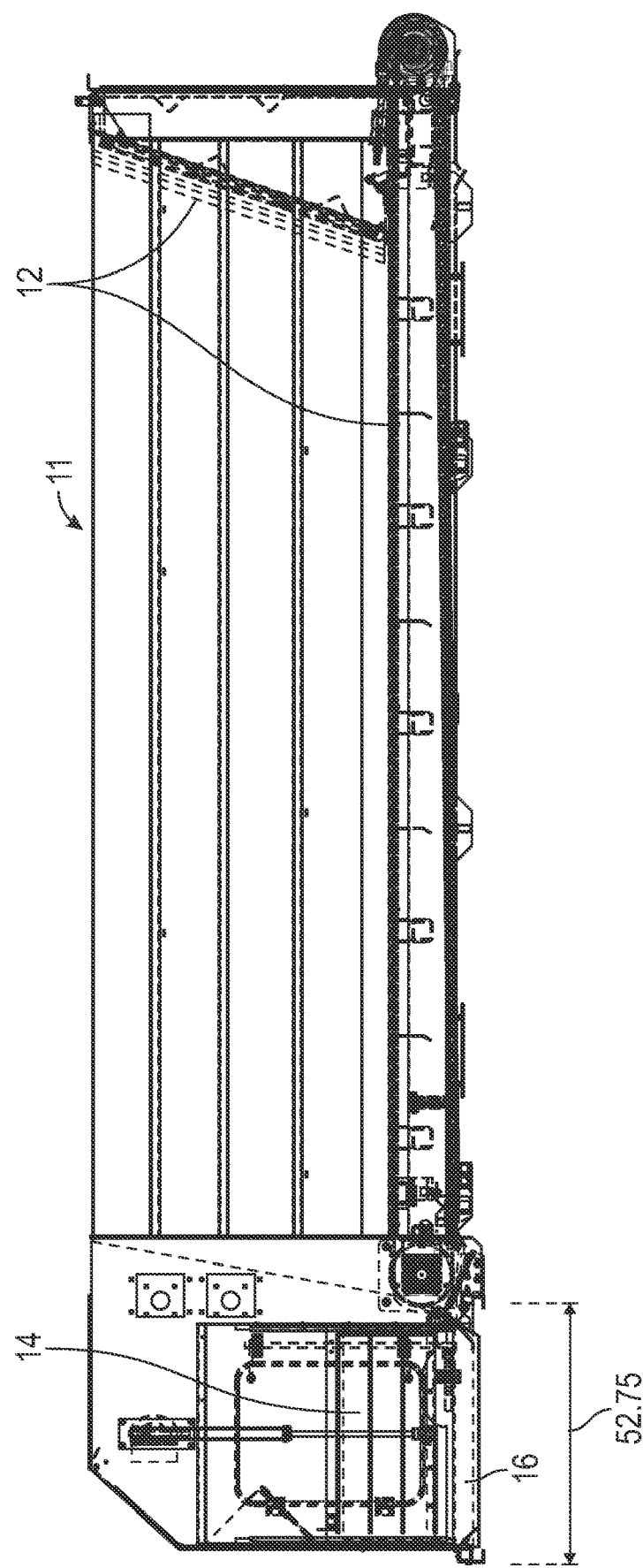

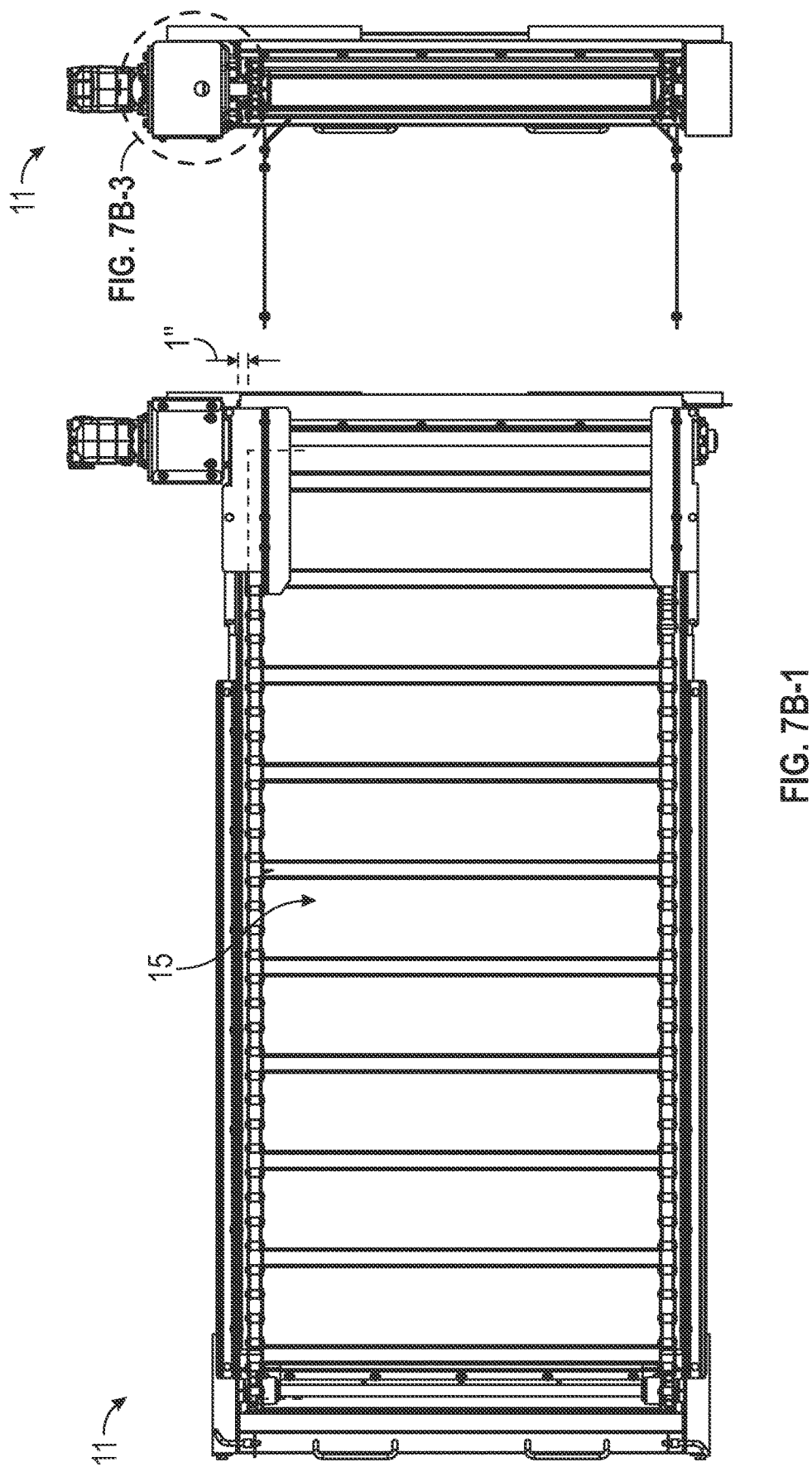

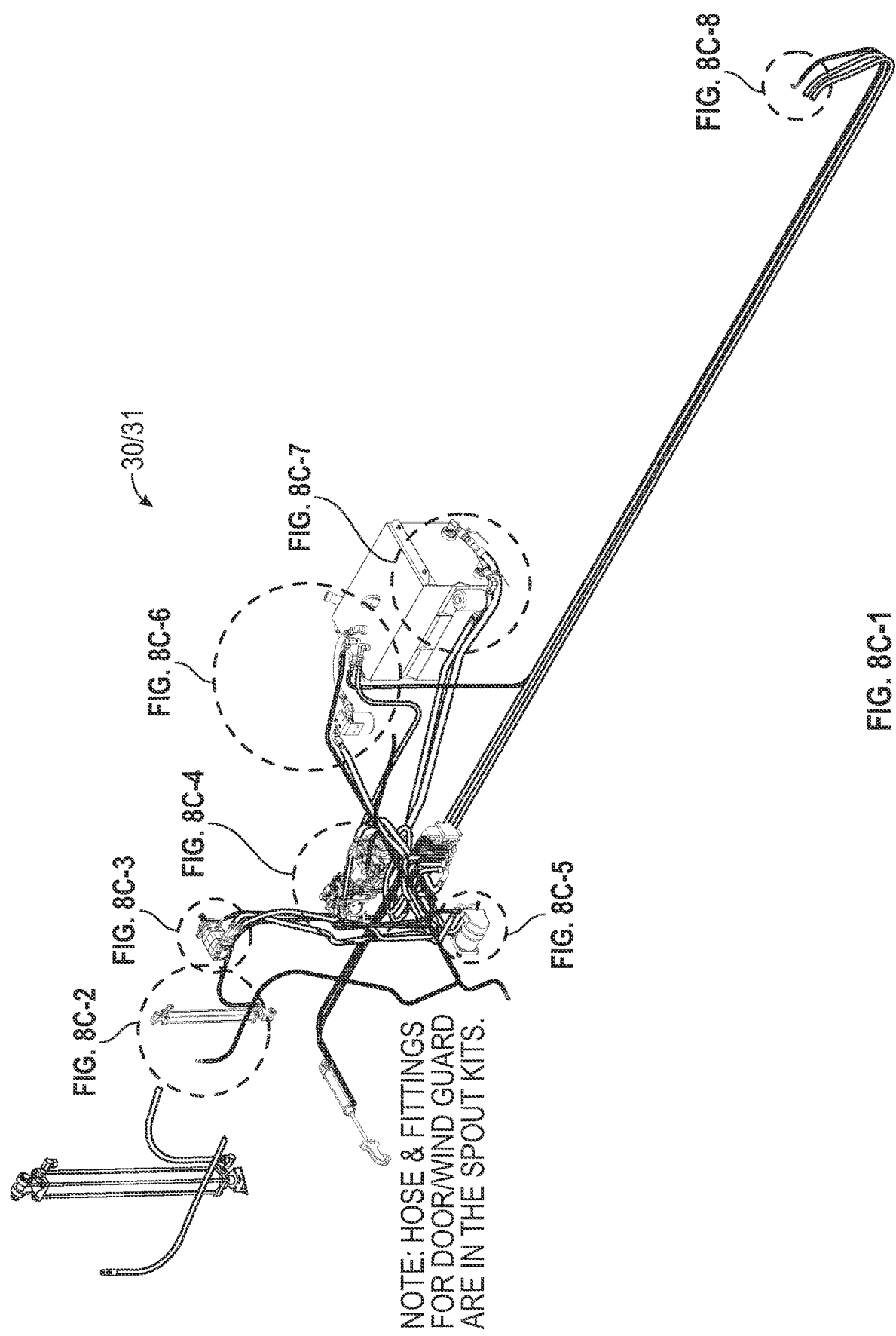

| ITEM # PART # DESCRIPTION QTY. |
| --- |
| 1 131922 FLANGE ADAPTER, 2 1/2" CODE 61 X 1 1/4" FP 1 |
| 2 189210 BRACKET, HYDRO-STAT FILTER 1 |
| 3 351906 O-RING, 3" OD X 1/8", 90 DUROMETER 1 |
| 4 351921 O-RING 4.987" ID X .103 C/s ( 5" ID X 3/32") 1 |
| 5 362056 PUMP, SERIES 90, 55 CC, RH, TAPERED SHAFT 1 |
| 6 362057 PUMP, 45 SERIES, 130 CC, RH, SPLIT 1 |
| 7 362218 HYD VALVE, PVG32 4 SPOOL 1 |
| 8 362404 FILTER HEAD, 1-1/4" FP 2 |
| 9 362442 FILTER ELEMENT 1-1/4" 2 |
| 10 366006 6M3K-3/8 X 134 - PVG 32 (BOTTOM) TO DOOR CYL. (B-BARREL) 11.17 |
| 11 366006 6M3K-3/8X 104- CONVEYOR MOTOR (C-DRAIN) TO RESERVOIR 8.67 |
| 12 366006 6M3K-3/8 X 148 - BEATER MOTOR (CASE DRAIN) TO RESERVOIR 12.33 |
| 13 366006 6M3K-3/8 X 68 - LOAD SENSE PORT TO PVG32 (LOAD SENSE) 5.6 |
| 14 366006 6M3K-3/8 X 138 - PVG 32 (TOP) TO DOOR CYLINDER (A-ROD) 11.5 |
| 15 366006 6M3K-3/8 X 316 FLOOR MOTOR CASE DRAIN TO RESERVOIR 26.33 |
| 16 366008 8M3K -1/2 X 21-LOAD SENSE (C-DRAIN) TO HYDRO (C-DRAIN) 1.75 |
| 17 366016 16M3K- 1 X 49 - LOAD SENSE PUMP (PRESSURE) TO PVG32 (INLET) 4.08 |
| 18 366032 12M3K - 3/4 X 93 - HYDRO PUMP TO RESERVOIR (CASE DRAIN) 7.75 |
| 19 366032 12M3K - 3/4 X 86 - PVG32 (PRESSURE) TO BEATER MOTOR (INLET) 7.17 |
| 20 366032 12M3K - 3/4 X 90 - BEATER MOTOR (OUTLET) TO PVG32 (RETURN) 7.08 |
| 21 366032 12M3K - 3/4 X 48 - PVG32 (PRESSURE) TO CONV. MOTOR (INLET) 4 |
| 22 366032 12M3K - 3/4 X 48 - CONV. MOTOR (OUTLET) TO PVG32 (RETURN) 4 |
| 23 366032 12M3K - 3/4 X 350 - HYDRO PUMP TO FLOOR MOTOR 29.17 |
| 24 366032 12M3K - 3/4 X 350 - HYDRO PUMP TO FLOOR MOTOR 29.17 |
| 25 366040 16GMV-1 X 82 - FILTER (RESERVOIR) TO HYDRO PUMP (SUCTION) 6.83 |
| 26 366040 16 GMV -1 X 51 - PVG 32 (RETURN) TO FILTER (LOAD SENSE PUMP) 4.25 |
| 27 366040 16GMV - 1 X 22 - RETURN FILTER TO RESERVOIR 1 |
| 28 366085 20GMV - 1 1/4 X 135 - RESERVOIR TO LOAD SENSE (SUCTION) 11.25 |
| 29 367066 HOSE COUPLING, 3/8" X 3/8" MP MEGACRIMP 2 |
| 30 367071 HOSE COUPLING, 3/8" X 13/16"FFORX 3 |
| 31 367073 HOSE STEM, 1/2" X 1-3/16" FFORX 1 |
| 32 367080 HOSE COUPLING, 3/8" X 11/16"FFORX90S 3 |
| 33 367082 HOSE COUPLING, 3/8" X 13/16"FFORX90S 3 |

FIG. 8D-1

| | |
|---|---|
| 34 367083 | HOSE COUPLING, 3/8" X 13/16"FFORX90L 1 |
| 35 367098 | HOSE COUPLING 1/2" X 13/16"FFORX90S 1 |
| 36 367114 | HOSE COUPLING 3/4 X 1-7/16 ORFS 2 |
| 37 367136 | HOSE COUPLING 16G-16FFORX90L X 1" MEGACRIMP 1 |
| 38 367137 | HOSE COUPLING 1" X 16G-16FFORX 3 |
| 39 367138 | HOSE CPLG 16G-20FFORX X 1" MEGA-CRIMP 2 |
| 40 367139 | HOSE COUPLING, 1" X 16G-16FFORX90S 2 |
| 41 367141 | HOSE COUPLING, 3/4"X 1-3/16 FFFORX 1 |
| 42 367142 | HOSE COUPLING 3/4" X 1-3/16"FFORX90S 5 |
| 43 367152 | HOSE COUPLING 20G-20FFORX X 1-1/4 2 |
| 44 367174 | HOSE COUPLING, 3/4" X 1 3/16" FFORX90L 6 |
| 45 368020 | SWIVEL 90° 3/8MP X 3/8FP 2 |
| 46 368034 | ELBOW, STREET 90° 1" MP X 1" FP 2 |
| 47 368036 | ELBOW, STREET 90° 1-1/4"MP X 1-1/4"FP 3 |
| 48 368071 | ELBOW 90° 1 1/4" MP X 1 11/16" ORFS 3 |
| 49 368137 | STRAIGHT ADAPTER 1-1/4"MP X 1-11/16"FFOR 1 |
| 50 368143 | STRAIGHT ADAPTER, 1-1/4" MP X 1-7/16" ORFS 1 |
| 51 368189 | STRAIGHT ADAPTER 11/16 ORFS X 1/2 MOR 1 |
| 52 368190 | STRAIGHT ADAPTER, 13/16" ORFS X 9/16" MORB 2 |
| 53 368191 | STRAIGHT ADAPTER, 13/16" FFOR X 7/8" MORB 4 |
| 54 368193 | STRAIGHT ADAPTER, 1-7/16" ORFS X 1-5/16" MORB 1 |
| 55 368196 | STRAIGHT ADAPTER, 11/16" FFOR X 7/16" MORB 2 |
| 56 368199 | STRAIGHT ADAPTER, 1-3/16" FFOR X 1-1/16" MORB 5 |
| 57 368415 | STRT ADPT, 1" MP X 13/16" FFOR 2 |
| 58 368417 | STRAIGHT ADAPTER, 1-7/16"ORFS X 1-1/16"MORB 1 |
| 59 368428 | HYD ADAPTER 90°, 1" MP X 1-7/16" FFOR 1 |
| 60 368451 | FLANGE SET 16 FHH SPLIT C62 (1") 2 |
| 61 368453 | FLANGE SET 20 FHH C62 (1-1/4") 1 |
| 62 368460 | FLANGE ADP, 1 7/16" ORFS X 1-1/4" CODE 62 1 |
| 63 368467 | FLANGE ADAP 16ORFS X 1 CODE 62 2 |
| 64 368468 | STRAIGHT ADAPTER, 1"-14 FFOR X 7/8" MORB 3 |
| 65 368469 | STRAIGHT ADAPTER, 1"-14 FFOR X 7/8" MORB 3 |
| 66 368525 | BALL VALVE, 1-1/4" FP 2 |
| 67 368636 | TEE RUN, 13/16" ORFS SWIVEL 1 |
| 68 368648 | HEX NIPPLE, 1-1/4" MP X 1-1/4" MP 3 |
| 69 368691 | HYDRAULIC ADAPTER, 90° 1"MP X 1-3/16 FFOR 1 |
| 70 368713 | STR ADPT, 13/16 FFOR X 1-1/16 MOR 1 |
| 71 368717 | TEE BRANCH 1-3/16" FFOR 1 |
| 72 368722 | ELBOW 90° 1-7/16"ORFS X 1-3/16" MOR 1 |
| 73 400114 | HEX NUT, 1/2-13 SERRATED FLANGE #5 8 |
| 74 402005 | WASHER 5/16", SPRING LOCK, MED PLTD 2 |
| 75 402405 | FLAT WASHER MED PLTD 5/16" 2 |
| 76 402605 | FENDER WASHER PLTD. 5/16"ID X 1 1/2"OD 4 |
| 77 405628 | HHCS 5/16"-18 X 1" #5 PLTD 6 |
| 78 407913 | HHCS 1/2"-13 X 1-1/2" SERRATED #5 PLTD 4 |
| 79 407914 | HHCS SERRATED 1/2"-13 X 1 3/4" #5 PLTD 8 |
| 80 434101 | HYDRAULIC OIL-CITGO TRANSGARD 60 |
| 81 730261 | RDB TRUCK HYDRAULIC RESERVOIR, 55GAL 1 |

FIG. 8D-2

| INVENTION: SYSTEM REQUIREMENTS |
|---|
| REQUIREMENTS |
| 1. The system will be able to control engine speed.<br>2. The system will be able to control belt direction and speed.<br>3. The system will be able to turn the conveyor on/off.<br>4. The system will be able to control the conveyor speed.<br>5. The system will be able to open/close the discharge door.<br>6. The system will be able to lower/raise the spout.<br>7. The system will be able to measure engine speed.<br>8. The system will be able to measure vehicle speed.<br>9. The system will be able to measure the state of the interrupter switch.<br>10. The system will be able to measure the state of the forward belt limit switch.<br>11. The system will be able to measure the state of the back belt limit switch.<br>12. The system will be able to measure the state of the PTO switch.<br>13. The system will be able to measure the state of the Start Button.<br>14. The system will be able to measure the state of the Stop Button.<br>15. The system will be able to measure the state of the Auto/Manual Switch<br>16. The system will be able to read the scale weight.<br>17. The system will be able to receiver the bunk length and call weight. |

FIG. 14A

| INVENTION: FUNCTIONALITIES |
|---|
| NORMAL OPERATION |
| 1. The driver will drive to the pin.
2. The driver will engage the PTO.
3. The driver hit the Auto mode switch (if not already pressed).
4. The driver will press Start on the system.
5. The system will perform safety checks.
6. The system will take control of the pedal.
7. The system will read the current weight, call weight, and bunk length.
8. The system will lower the spout.
9. The system will open the discharge door.
10. The system will turn on the belt until the interrupter switch is triggered (first time only).
11. The system will turn on the conveyor.
12. The system will begin acceleration the vehicle.
13. The system will regulate the vehicle speed and conveyor speed to hit call weight.
14. At the end of the bunk, the system will stop the vehicle (go to idle).
15. The system will stop the conveyor.
16. The system will stop the belt.
17. The system will leave the discharge door open.
18. The system will raise the spout (optional).
19. The system will give pedal control back to the driver. |

FIG. 14B

| ADDITIONAL FUNCTIONS |
|---|
| 1. When the Belt Forward Limit Switch is hit and the system is finished, the belt will move in reverse until the Belt Back Limit Switch is hit or a timeout is reached (optional).
2. When the Brake is pressed, the engine speed will not increase. If the brake is pressed for a set number of seconds, the system will stop.
3. When the Stop button is pressed, the system will relieve control of the pedal, stop the conveyor, and stop the belt
4. If the AH/Metric system tells the driver to return to the filling station, the belt will move in reverse until the Back Limit switch is hit or a timeout is reached. |

FIG. 14C

| INVENTION: DRIVER INPUTS AND FEEDBACK |
|---|
| 1. There will be an Auto/Manual Switch
   a. Manual will let the original system have complete control of the RDB
   b. Auto will only let the Driver adjust the door and spout
2. There will be a Start Button
   a. This will initiate the feeding sequence
3. There will be a Stop Button
   a. This will pause the operation of the system, but the system will still remember relative location and remaining call weight
4. There will be a Fault Light
   a. If the system has faulted, the Fault LED will be lit
5. The Start/Stop buttons will have additional functionality if pressed twice.
   a. Start pressed twice will tell the system to perform a first feeding sequence, which will get feed onto the conveyor before moving.
   b. Stop pressed twice will tell the system to perform a complete feeding sequence, which includes closing the door and lifting the spout (this will not move the belt back). |

FIG. 14D

250 ⤹

INVENTION: EXAMPLE OF PROCESS FLOW

☐ Rotomix/Micro Process Flow

Communication Protocol

For the first revision, the Roto-Mix controller box and Micro system will communicate using serial.

| Communication Protocol | |
|---|---|
| Communication Type | RS-232 |
| Baud Rate | 115200 |
| Data Bits | 8 |
| Parity | Even |
| Stop Bits | 1 |

| DB9 Female Pinout - RS232 #2 | |
|---|---|
| RS232 In (Rx) | 3 |
| RS232 Out (Tx) | 2 |
| GND | 5 |

Message Format

The RS-232 will send communicate by sending ACSII characters. The start of a message is done by using <STX> and the end of the message is done by using <CR><LF>. The data or signals are comma delimited.

Structure

<STX>Message ID, Data Signal [0], Data Signal [1], ... <CR><LF>

Example - Micro Request - Start Pressed

<STX>01, 1, 0<CR><LF>

Signals

| Signal List | | | | | | |
|---|---|---|---|---|---|---|
| Signal Name | Message Name | Message ID | Date Type | Range | Char Length | Data Index [i] |
| Start | Micro Request | '01' | Boolean | 0-1 | 1 | 0 |
| Stop | Micro Request | '01' | Boolean | 0-1 | 1 | 1 |

FIG. 15A

250

| Tolerance | Micro Data | '02' | Boolean | 0-1 | 1 | 0 |
| Bunk Length | Micro Data | '02' | Uint16 | 0-0xFFFF | 4 | 1 |
| Call Weight w/Offset | Micro Data | '02' | Uint16 | 0-0xFFFF | 4 | 2 |
| Ration Type | Micro Data | '02' | Uint8 | 0-0xF | 1 | 3 |
| Ration Density | Micro Data | '02' | Uint16 | 0-0xFFFF | 4 | 4 |
| Checksum (CRC) | Micro Data | '02' | Uint16 | 0-0xFFFF | 4 | 5 |
| Relative Distance Travelled | Micro Heartbeat | '03' | Uint16 | 0-0xFFFF | 4 | 0 |
| Rolling Counter | Micro Heartbeat | '03' | Uint8 | 0-0xF | 1 | 1 |
| Request ID | Rotomix Request Id | '10' | Uint8 | 0-0xFF | 2 | 0 |
| Received ID | Rotomix Response | '11' | Uint16 | 0-0xFFFF | 4 | 0 |
| Received Message Success | Rotomix Response | '11' | Boolean | 0-1 | 1 | 1 |
| Start Button | Rotomix Button | '12' | Boolean | 0-1 | 1 | 0 |
| Stop Button | Rotomix Button | '12' | Boolean | 0-1 | 1 | 1 |

Micro Request Message ['01']
This message is event based. When the start or stop button are pressed on the bunk feeding screen, the system sends this message.

Start
Reports when the start button on the bunk feed system screen/computer is pressed.

| Data Type | Boolean |

| Values | 0 | Not Pressed |
|        | 1 | Pressed |

Stop
Reports when the stop button on the bunk feed system screen/computer is pressed.

| Data Type | Boolean |

| Values | 0 | Not Pressed |
|        | 1 | Pressed |

FIG. 15B

250 ↘

Micro Data Message ['02]
This is message is by request. When the system receives a request command with the id of '02', this message is sent.

Tolerance
Reports if the system needs to hit the call wieght exactly (High) or if it can be within a wider threshold (Low).

| Data Type | Boolean |
| Values | 0 Low |
| | 1 High |

Bunk Length
Length of bunk in feet.

| Data Type | Unit32 |
| Range | 0-65535 |
| Factor | 0.25/bit |
| Units | ft |

Call Weight w/Offset
Call weight to be dispensed into the bunk. This includes any offsets values that are used for reporting. The system will distribute this amount of feed.

| Data Type | Unit32 |
| Range | 0-65535 |
| Factor | 0.50/bit |
| Units | lb |

Ration Type
Reports what type of ration is currently loaded in the vehicle.

| Data Type | Unit8 |
| Values | 0 Unknown |
| | 1 Type 1 |
| | 2 Type 2 |
| | 3 Type 3 |
| | 4 Type 4 |
| | 5 Type 5 |
| Range | 0-0xF |

FIG. 15C

250↘

> Ration Density
> Estimated density of the ration in the vehicle. Reports 0 if unknown.
>
> | Data Type | Unit32 |
> |---|---|
> | Range | 0-65535 |
> | Factor | 0.50/bit |
> | Units | lb/in^3 of kg/m^3 |
>
> Checksum
> Calculated checksum of the data to verify correct message transmission. Uses CRC-16 to calculate the checksum. Include the id, data, and all commas when calculating. This includes the comma right before the CRC.
>
> | Data Type | Unit16 |
> |---|---|
> | Range | 0-0xFFFF |
>
> Micro Heartbeat Message ["03"]
> This is message continuously broadcasted. When the system is on, it is this sending message at a rate of 0.5 second.
>
> Relative Distance Travelled
> Relative distance travelled from starting bunk position. This value is calculated from GPS coordinates.
>
> | Data Type | Unit32 |
> |---|---|
> | Range | 0-65535 |
> | Factor | 0.25/bit |
> | Units | ft |
>
> Rolling Counter
> Updates by one every new message. When 0xF is reached, it rolls over back to 0x0.
>
> | Data Type | Unit8 |
> |---|---|
> | Range | 0-0xF |

FIG. 15D

250 ⟶

Rotomix Request Id Message ["10"]
This is message is sent by the Rotomix controller box and to used to request data from a certain message.
Request ID
Desired message ID.

| Data Type | Unit8 |
| Range | 0-0xFF |

Rotomix Response Message ["11"]
This is message is sent by the Rotomix Controller box. When the Rotomix controller box receives a message, it sends this response message that contains the id that it received.
Received ID
Received message ID.

| Data Type | Unit8 |
| Range | 0-0xFF |

Received Message Success
Reports if received message ID is recognized by the controller and if all data is present.

| Data Type | Boolean |
| Range | 0  Failed |
|        | 1  Succes |

Rotomix Button Message ["12"]
This is message is by request. When the system receives a request command with the id of '02', this message is sent.
Start Button
Reports when the start button on the automated user interface is pressed.

| Data Type | Boolean |
| Range | 0  Not Pressed |
|        | 1  Pressed |

Stop Button
Reports when the stop button on the automated user interface is pressed.

| Data Type | Boolean |
| Values | 0  Not Pressed |
|        | 1  Pressed |

FIG. 15E

250

| INVENTION: EXAMPLES OF STATE FLOW, PROCESS FLOW, AND CODE |
|---|
| Micro Test Bench Setup |
| Components<br>• An automated user interface box (AUI)<br>• A gcm80 controller used to operate the AUI, step through the bunk feeding stateflow, and communicate with the RS-232 device<br>• A RS232-CAN controller used to communicate with Micro<br>• Power and Ground banana plugs<br>• A serial db9 (long cable)<br>• A CAN db9 (short cable) |
| Connections<br>• connect the power (red) and ground (black) banana plugs to 12-14V<br>• connect the Micro system to the serial db9 cable<br>• set the AUI Auto/Manual switch to "Auto." The yellow light should be OFF. |
| Micro Test Bench Testing |
| To test the full bunk feeding process, the system is setup to follow a sequence of events<br>1. Micro: Send the Micro Request message with the start button pressed<br>2. RS232: The device will send a reply that the Micro Button message has been received<br>3. RS232: The device will send the Request ID message for the Micro Data message ('02')<br>   a. It will send this request every second until received for a max of 5 times<br>4. Micro: Send the Micro Data message with nonzero bunk length and bunk weight values (with updated rolling counter)<br>5. RS232: The device will send a reply that the Micro Data message has been received<br>6. AUI: The fault LED will flash twice<br>7. AUI: The user has 30 seconds to press the start button on the AUI<br>8. RS232: Once the start button is pressed, the device will send the Rotomix Button message with the start button set to high. The system is now engaged and "feeding"<br>9. Micro: Send the Micro Heartbeat message continuously with an increasing distance travelled value |

FIG. 16A-1

250 ⇘

10. RS232: The device will send a reply that the Micro Heartbeat message was received
11. RS232: When the distance travelled value gets to the bunk length, the system will disable and send the Rotomix Button message with the Stop button set to high.
12. AUI: The fault LED will flash twice

Testing Notes
- Pressing Stop twice on the AUI will also disengage the system and the Rotomix Button message will be sent with the stop button set to high.
- If the RS232 does not receive a message with the correct format, it will send a 0 in the message success data field in the Rotomix Response message.
- The RS232 LED turns RED when a serial message is received
- The RS232 LED turns ORANGE when a CAN message is received (when the start and stop button messages are sent)
- The Heartbeat message must have an updated rolling counter for the new values to pass through
- Sending the stop button in the Micro Request message will also cause the system to exit the "feeding" stateflow.

FIG. 16A-2

250

```
CRC Example Code
#include "stdio.h"
#include "stdlib.h"

define CRCDIV 0x8005 unsigned int encode_decode_crc (unsigned char *data, unsigned int
data_length);

unsigned char data[8] - {0x01, 0x00, 0x00, 0x00, 0x0A, 0x80, 0x47, 0};

void main(void)

{ unsigned int crc_enc;
    unsigned int crc_dec;

crc_enc -encode_decode_crc (data, 5); // EXCLUDE CRC BYTES
    crc_dee -encode_decode_crc (data, 7); ! INCLUDE CRC BYTES
    printf ("Encode : %0X Decode: %0X", crc_enc, crc_dec);
}
```

FIG. 16B

250

```
unsigned int encode_decode_crc (unsigned char *data, unsigned int
data_length)

{ unsigned int accum;
    unsigned int curr_byte;
    unsigned int curr_bit:
    unsigned int data_store;
    accum = 0;

/*repeat for all bytes in message from the header to the data*/
    for (curr_byte = 0; curr_byte < data_length; curr_byte++)

{ data_store = ((unsigned int) data[curr_byte]) << 8;

for curr_bit = 0; curr_bit < 8; curr_bit++)

{ if ((data_store ^ accum) & 0x8000)
                accum = (acoum << 1) ^ CRCDIV;

else accum <<= 1;

data_store <<= 1;

}

}

/*return CRC*/
    return (accum);

}
```

FIG. 16C

AUTONOMOUS SYSTEM FOR EVENLY DISPENSING LIVESTOCK FEED

CROSS-REFERENCE TO RELATED APPLICATIONS

This application claims the benefit of Provisional Application U.S. Ser. No. 63/260,083 filed on Aug. 9, 2021, all of which is herein incorporated by reference in its entirety.

1 BACKGROUND OF THE INVENTION

1.1 Field of the Invention

The present invention relates to apparatus, systems, and methods for delivering bulk material from a motorized vehicle with minimum driver inputs. In one example, the motorized vehicle delivers pre-selected rations of livestock feed to livestock feeding bunks in a more autonomous manner than typical systems.

1.2 Problems in the State of this Technical Art

The applicant has been involved in mechanized feed delivery for livestock for decades, and has developed and sells an extensive line of machinery, including for feed delivery/dispensing to feed bunks or locations on feed lots. Such machines are trucks or trailers pulled by trucks or tractors and carry on-board a load of feed. Mechanized sub-systems are operator-controlled to try to deliver to specific feed bunks or locations a pre-determined ration, sometimes called a prescription or dose, of the bulk on-board feed. A ration can be type and amount of feed along a linear distance (e.g. a bunk length or a drop zone on the ground) based on livestock type, age, and other factors for livestock that have access to the bunk or drop zone. A call weight is the desired amount of a ration for a given bunk or drop zone. A delivered weight is the amount a dispenser actually delivers to that given bunk or drop zone.

Examples include the Roto-Mix CFB Commercial Feeder Box truck 10 of FIG. 1A or a Roto-Mix RDB truck, both commercially available from Roto-Mix of Dodge City, KS (USA). It has sub-systems and components to deliver rations of feed 8 to one or more feed bunks 6 distributed around a feed lot 5. Each bunk 6 is usually associated with a pen 7 enclosing a specific number and age (or production phase) of livestock. Each ration of feed 8 for a pen 7 is typically pre-determined to optimize the performance of the livestock for the given type and age/phase.

Truck 10 includes an engine and sub-systems for movement of the truck (e.g., brakes, accelerator, transmission). Truck 10 includes a feed box 11 with mechanized belt 12 (or other technique) to move bulk feed forward to a side-dispensing compartment or box 13 which has a side discharge conveyor 15 and a controllable door 14 and spout 16 to dispense a ration of feed 8 to a bunk 6.

Figure 1B:
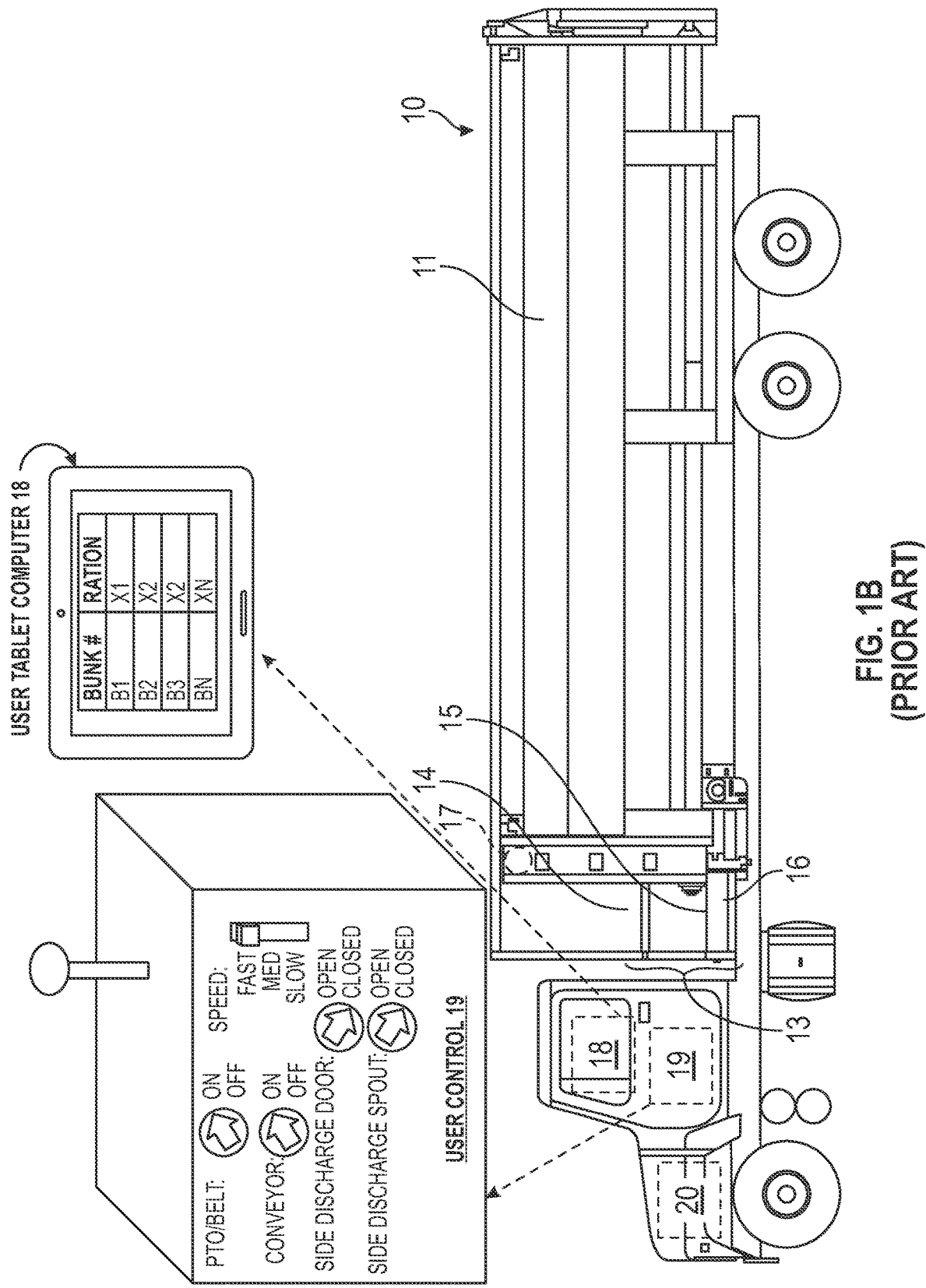

This relies heavily on human operator control. As illustrated in FIG. 1B, the driver is responsible for controlling most, if not all, functions of the truck and the feed delivery unit. In FIG. 1B, this includes manually-controlled knobs or controls for on, off, and speed of belt 12, raising/lowering of door 14 and spout 16, and on/off and speed of side discharge conveyor 15. Such trucks can also include a beater 17 which helps move feed being moved from the truck box. 11 towards the side door conveyor 15. While operators typically obtain skill and competence from experience, there is still substantial potential for human-error. Also, some livestock feeding locations have many feed bunks or feed drop locations across a geographic area. Different bunks or drop locations can have different feed requirements. This puts substantial burden on the driver to accurately dispense feed across under such a diverse set of requirements.

In the example of FIG. 1B, a digital device (e.g., tablet computer 18) can be used to display to the driver some type of identification of each bunk 6, as well as the prescription/ration for it. One example is the ACCU-TRAC® software from Micro Technologies. The driver thus has specific visual information on tablet 18 as to how to dose or ration each different bunk 6. However, the driver still must manually operate truck 10 to try to effectuate each prescription for each bunk by accurately understanding the information on the tablet and then accurately operating manual controls for both the truck and the feed delivery unit.

Additionally, a number of other factors have increased the complexity of this type of livestock feeding. Some of these factors are obvious. Some are subtle. For example, feed rationing has gotten more complex. One ration is optimal for one age of livestock, but not optimal for another; even for the same livestock species. Another example is scale. Some feeding operations have thousands of head of livestock, and tens if not hundreds of feed bunks or locations. The logistics of having available, transporting, and executing on correct ration delivery across all of those bunks or locations in an effective and efficient manner is daunting. Still further, economic pressures on livestock producers are in play. More personnel could be hired, and more equipment purchased and operated, to promote such feed delivery, but this involves substantial labor and capital costs. And it does not address inefficiencies caused by human error.

The applicant has recognized there are significant needs for improvement in this technical field. The applicant has recognized that the factors involved have complexity. Some factors are antagonistic with one another. As mentioned, more employees can be hired and more machines purchased to be available for use. Yet the costs and resource drain can outweigh the benefit from a business perspective. Another example is, on the one hand, careful training of operators can reduce human error and increase speed and accuracy of feed dispensing, but relying so heavily on human skill and performance can reduce efficiency and effectiveness if a certain level of ration accuracy is to be maintained. The applicant has recognized that accuracy of dispensing based primarily on human operation requires time to double-check the required ration bunk-to-bunk, limiting speed of the vehicle to avoid errors, and the like. Thus, efficiency of labor and equipment, and accuracy, can be antagonistic. One alternative is to increase speed. If based primarily on human operation, this can mean errors in rationing bunk-to-bunk. Too big a ration can be a waste of feed and, thus, the associated cost. Too little of a ration can reduce the value of the animals.

The applicant has therefore identified needs for improvement in this technical field that balance the sometimes subtle and sometimes antagonistic factors involved. It is not simply building bigger vehicles and speeding up movement of the vehicles from feed bunk to bunk for a given feeding operation.

There have been attempts to improve in this technical area. For example, entities such as the applicant have innovated in providing motorized feed delivery vehicles that can move bulk feed and dispense it to feeding locations. However, as mentioned, the driver must control many aspects of the feed delivery.

An early attempt at improvement of feed lot feed dispensing is U.S. Pat. No. 5,424,957 to Kerkhoff et al., which is incorporated by reference herein ( ). It suggests using geolocation and correlated feed prescription to give some automation to feed dispensing. But the applicant has identified areas that can be improved. One example is that the Kerkhoff patent shows a secondary weighing system to weigh feed as it passes across the discharge conveyor. This is extremely complicated, unreliable, and impracticable, and unnecessary with this present invention.

Some entities have developed software-based systems to correlate a feed prescription (feed type, ration, density, and other parameters) for each of multiple feed bunks or drop locations for a given area. This allows the driver to have essentially a map of the different bunks or drop locations with its intended feed prescription. Some systems georeference each bunk or drop location in the map. Some more sophisticated programs allow a wide variety of other parameters related to the livestock assigned to each feed bunk or drop location. One example is the ACLU-TRAC® system commercially available from Micro Technologies of 8701 Centerport Blvd., Amarillo, TX 79108 (see, e.g., https://www.microtechnologies.com/feedyard). Details of such a system can be found at U.S. Pat. No. 7,681,527 to Pratt and issued to Micro Technologies, and incorporated by reference herein. Another example is the commercially available AHI system from Animal Health International, of 2915 Rocky Mountain Avenue, Suite 400, Loveland, CO 80538. With the ACCU-TRAC® system, a person can move a GPS-enabled tablet computer 18 or other device around feed lot 5 and enter GPS coordinates from which geolocation of each bunk 5 can be derived. One example is waypoints/coordinates for each opposite end of each bunk 5. The bunk can have a unique identifier correlated to those waypoints/coordinates and a ration prescription entered and stored for each bunk. A driver can carry a tablet computer in the vehicle cab, and retrieve a feed prescription for each bunk or drop. However, these still require a driver to manually reference and translate the prescription for each bunk or drop via substantial driver control of the dispensing operation.

Figure 1E:
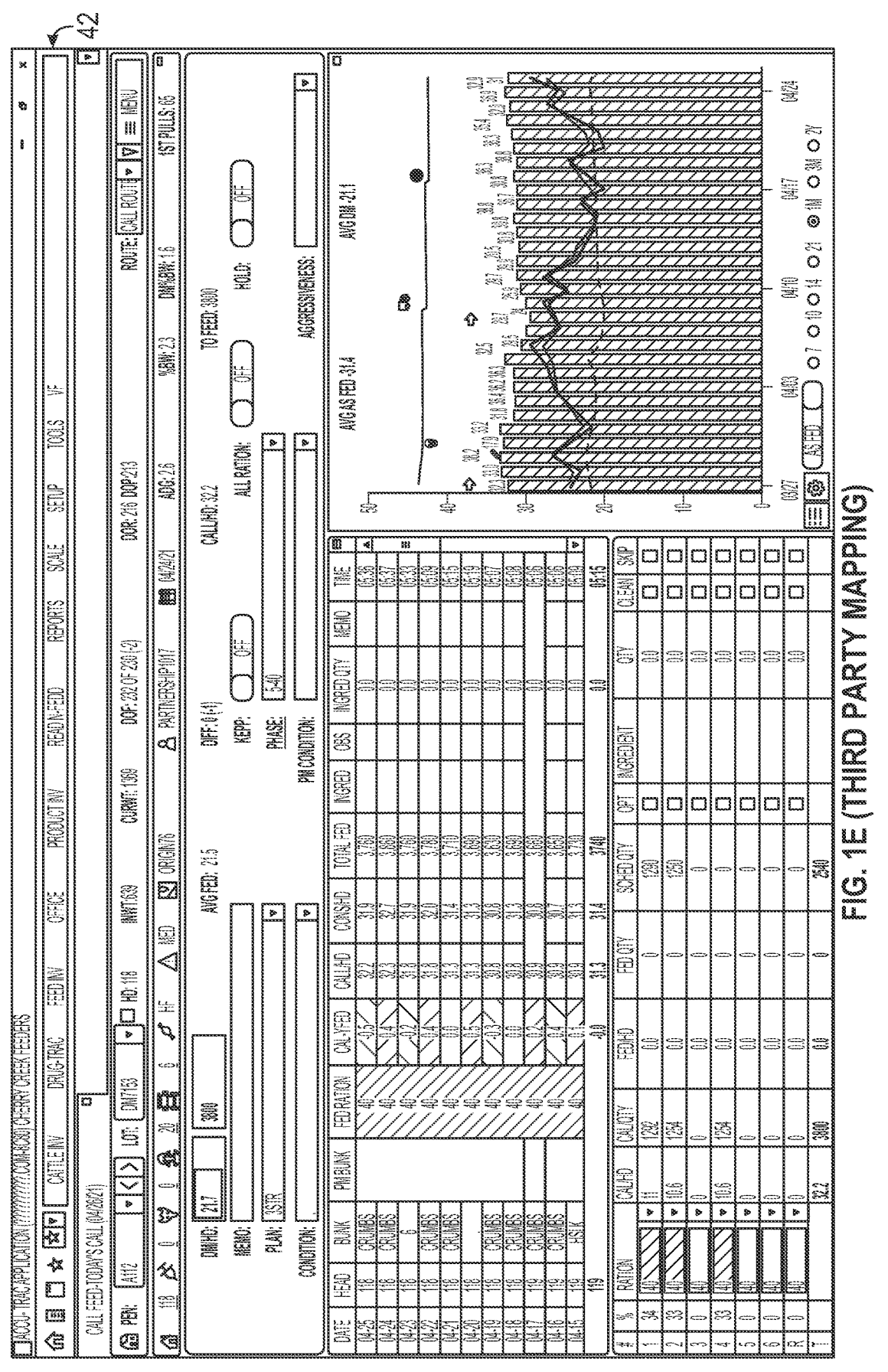

Applicant has integrated into its trucks the use of such things as the ACLU-TRAC® system to assist drivers. FIG. 1C illustrates one such example of a set-up. As seen, manual driver participation is required at a substantial level. FIGS. 1D-E illustrates one example of types of data that are possible with ACCU-TRAC®.

As can be seen in FIG. 1C, one current system architecture that relies heavily on driver manual control, does provide some assistance to the user. A typical truck 10 has an engine that can communicate mechanical power via transmission 24 to the truck drive train, as well as to a power-take-off (PTO) rotating drive 22. Rotation speed of PTO 22 can be controlled by engine speed via driver control of truck accelerator pedal 26. Transfer of mechanical power from engine 20 is shown diagrammatically with arrows 21.

The feed box 11 in this example includes a volume of space for bulk feed 8. A hydrostatic pump is operatively attached to PTO 30 to generate hydraulic power (see arrows 31) to components that facilitate moving bulk feed 8 from box 11 out via a belt-gate 12 that moves from back to front of box 11 to push bulk feed 8 forward in box 11, a beater 17 that breaks up and influences bulk feed 8 downward at the front of box 11, and a conveyor 15 that cooperates with a side discharge door 14 and spout 16 to dispense bulk feed 8, in a controlled manner, out of box 11. As is well-known in the art, coordinated control of amount of opening of door 14, speed of conveyor 15, and lowering and angle of spout 16 can regulate the rate of bulk feed 8 dispensed from box 11. Such things as higher conveyor 15 speed and/or wider door 14 opening allow more feed 8 out, and vice versa.

FIG. 1C also diagrammatically shows features of this prior art system. A digital scale 50 can be used to inform a bunk feeding system computer 40 of such things as the current overall weight of the box 11 and any feed 8 in it. The bunk feeding computer 40 can use this information and pre-programmed ration or prescription geo-referenced to a given feed bunk 6 to inform the human truck driver 60 how to manually control operation of the truck engine speed and the components in box 11 to try to dispense a quantity of feed 8 from box 11 commensurate with the ration or prescription for the given bunk 6. This is basically a prescription of a total amount of bulk feed 8 per unit distance along, bunk 6 for that bunk 6 that is as uniform as possible along and between ends of bunk 6. For a truck 10 moving at a certain speed, this typically means a certain volume of bulk feed 8 is dispensed per unit distance along bunk 6 to try to meet that prescription goal. FIG. 1C diagrammatically illustrates communication links between scale 50, computer 40, and a digital device with driver 60 at ref. nos. 41; and input/output (I/O) links between the manual user interface 19, truck 10, and the dispensing components of box 11 at ref. nos. 71.

As will be appreciated, and as is well known by those skilled in this technical art, this known system architecture requires manual driver control and input to operate. As such, it introduces potential for error in the dispensing of the prescription for each bunk, which can vary from bunk to bunk.

FIGS. 1D and 1E are examples of some of the available bulk feed system computer 40 information that can be available to the livestock producer, and at least some of which, can be available to or used to program into computer 40 a specific prescription for each bunk to be filled by truck 10. As mentioned, details of the prescription for each bunk can be displayed to the driver on a tablet 18 or other device (e.g. smart phone or laptop), as well as geolocation information or maps to help the driver select the right settings of manual user control 19, which would be in the cab of truck 10. But this still involves substantial driver manual input.

FIG. 1F diagrammatically illustrates some of the challenges for feed deliver in a feed lot 5. Typically plural bunks 6(1)-(n) are positioned around the lot 5. Sometimes they are uniform in orientation (e.g. north-south-east-west direction) and size (e.g. bunk length). Sometimes they are not. Sometimes one pen 7 associates with one bunk 6. Sometimes it is not. Thus, even if each end of each bunk 6 is mapped with way points WP and stored for retrieval and correlation to a ration dose pre-determined for each bunk 6, a driver must still coordinate as quickly and accurately as possible manual guidance (steer, brake, accelerate) of vehicle 10 to appropriate position for ultimate delivery of feed from truck 10 to bin 6 (FIGS. 1G and 1H) without waste or spillage, and must manually control the dispensing functions (belt, conveyor, beater, door, spout). This is not only a challenge, but requires substantial experience and training of drivers. Many times an incorrect dispensing requires the driver to manually back up the vehicle to finish feeding the correct ration to the bunk. This takes valuable time and fuel, and thus adds costs, and adds wear and tear to the vehicle and dispensing system.

It has been estimated by some commentators that on the order of fifty-percent of livestock producer costs are associated with livestock feeding. As such, improvement in this part of livestock production can be extremely meaningful to producers. The applicant has recognized a need for improvement in this area for its customers. The present invention relates to technological improvements to address these needs. Excess feed dispensed to a bunk or spillage outside the bunk is an added expense. Insufficient or non-uniform feed to a bunk can affect the selling price of the livestock. This is multiplied by the number of bunks to be serviced for a given producer. Thus, the technical problem that needs to be addressed. includes better handling of this substantial input expense for livestock producers.

Thus, the technological problem was to keep pace with the constant changes within the cattle and dairy feeding industry for livestock mixing and feeding equipment in light to the challenges to executing upon specific and varied feed ration prescriptions for different feeding bunks or drops around a feed lot.

What was needed was an attachment on a feed truck that would automatically dispense livestock feed into the hunk accurately and reliably. In commercial feedlots, this kind of attachment would be enormously helpful in cutting down feeding time, while also reducing waste by ensuring that a precise amount of feed is being delivered every time. The automatic feed delivery system also eliminates the need for drivers to have years of experience, opening up the number of potential employees that can operate the vehicles.

But such a technological solution had many challenges, including inter alia a user-friendly and rugged interface, a control box or sub-system to communicate with the rest of the vehicle, and software to read and analyze data, including bunk length and call weight for each bunk or drop zone, a wire harness or other inter-communication of the various different components to safely connect all the components for seamless integration.

The challenges included inter alia how new components would fit within the feed delivery vehicle, communications with the rest of the vehicle that would be fast and accurate, and controls easy to access and operate.

2 SUMMARY OF THE INVENTION

2.1 Objects, Features, and Advantages of the Invention

An object, feature, and/or advantage of the invention is to provide systems, methods, and apparatus to improve over or solve problems and deficiencies in the current state of the art.

A principal object, feature, and advantage of the invention is a system, method, and apparatus that at least substantially automatically or autonomously controls feed delivery from a bulk feed motorized vehicle to one or more feed bunks or feed drop locations in a given area or livestock feeding area with minimum driver requirements. The system, method, and apparatus provide for even and accurate feed ration for each bunk or drop. This is through at least substantially or semi-autonomous control of mechanized components to dispense bulk feed in rations to given locations. As such, the invention can be semi-autonomous in the sense that just a few driver inputs are needed, or can approach fully autonomous.

Additionally, an object, feature and/or advantage is the present invention virtually eliminates the need to backup to finish a feeding/rationing a bunk. This saves times, wear and tear on equipment and fuel consumption.

Other objects, features, and/or advantages of the invention include:
 a. Features to improve accuracy and reliability of bulk feed dispensing even in environmental conditions that can disrupt operation of dispensing components, including but not limited to obtaining accurate weight measurements over uneven or bumpy ground, or obtaining reliable sensor measurements.
 b. Features that can improve accuracy and reliability of feed ration dispensing automatically.
 c. Features that can provide more flexibility in control and monitoring of feed dispensing during automated mode.
 d. Features that can allow for simplification of components and interconnection of components of the automated system.

2.2 Aspects of the Invention

The invention is an at least substantially autonomous feed delivery system for evenly dispensing a specified amount of feed into a specified distance such as a feed bunk. This results in a precisely and reliably controlled rate of discharge per linear distance which is critical to achieving an even and accurate delivery of the specified amount of feed into the feed bunk.

In one aspect of the invention, the foregoing is provided by a system which uses pre-established input data regarding geolocation of each bunk or feed drop location, the ration density, type, and amount for each bunk or drop, and automatically controls both (a) the mechanized components of feed dispensing from the vehicle, as well as (b) at least most driver inputs for the movement and operation of the vehicle for each bunk or drop. Once actuated, the automated mode of the system controls and balances movement of the vehicle along a bunk, engine rpm to power dispensing components, and the dispensing components to accurately and evenly dispense an instructed ration along the bunk. This requires an automation controller configured to obtain a specific set of inputs, and then use that specific set of inputs to generate specific and coordinated output instructions to the vehicle and the dispensing components. As such, even and accurate rations prescribed for each bunk or location are promoted to, in turn, reduce human error and improve efficacy and efficiency of feed delivery for the livestock producer.

In one example, the inputs include bunk ID, bunk start and stop coordinates, and ration information for that bunk, as well as state of operation of the vehicle (e.g. speed) and weight of the bulk feed hopper. The driver positions the vehicle at the bunk start location and engages the automated system. The driver steers and the automated system instructs and controls vehicle speed and all dispensing components to compute and deliver the prescribed ration to the bunk. This can include varying the engine operation, vehicle speed, bulk feed belt, side discharge conveyor, door, and spout, and other parameters with automatic control. The automatic controller dynamically calculates and controls this variety of factors to lay down as even and accurate ration along the length of the bunk and all the driver/operator does is steer the vehicle. The system can have a fail-safe in the sense the driver can interrupt or discontinue automated mode manually. In this example, once one bunk is finished, the driver moves the vehicle to another bunk and repeats for the number of bunks desired for a given feed lot. This specific integration of features and functions promotes improvement in evenness and accuracy of rationing to any number of bunks.

In one example, the vehicle has a bulk feed box with belt to move bulk feed to a ration delivery box. The ration delivery box has a side discharge conveyor, but also an independently controllable door and spout. The automated mode of the system coordinates and controls all these feed delivery components to regulate rate of feed discharge to the bunk. Other modes and components for feed delivery to a bunk are possible. Also, feed discharge could also be to other end locations, such as simply a drop zone on the ground.

Other aspects of the invention can include one or more of the following specific features into the general invention discussed above:

a. Integration of a load sense hydraulics control with the vehicle to provide consistent available full hydraulic power regardless of vehicle engine rpm or speed to assist even and accurate feed dispensing.

b. Integration of a control with the vehicle to regulate any overload of the ration delivery box with bulk feed from the bulk feed box, to further improve even and accurate feed dispensing to the bunk or drop. Movement of the floor belt (the large compartment behind the discharge conveyor compartment) is automatically interrupted when there is an excessive amount of feed in the discharge conveyor compartment. Floor belt movement is automatically restored when the discharge conveyor compartment returns to a prescribed level.

c. Integration of georeferenced bunk or drop location data with the dispensing control sub-system to improve accuracy of dispensing. Examples include but are not limited to:
  i. Positive identification of each bunk or drop for accuracy in correlating the correct prescription for each bunk or drop.
  ii. Lock out of dispensing unless confirmed that the dispensing is to the correct bunk or drop location.
  iii. Ability to customize the ration at each bunk or drop, including for a partial ration if desired.

Additional optional features are possible with the invention. A few non-limiting examples are:

Use of telemetry between the vehicle and remote locations. This can include such wireless communications for purposes of data sharing or transfer between the vehicle and remote center, remote monitoring, remote trouble-shooting and diagnostics, and remote systems updates.

Fully autonomous operation, including driverless vehicles.

Dual direction dispensing, including use of the system to dispense laterally from either side of the vehicle to improve ability to maneuver around a feed lot and multiple bunks or drop sites.

Machine learning to help optimize evenness and accuracy of dispensing for each bunk or drop.

This system can be adapted to a feed mixer which can function without a discharge conveyor. In this situation, the rate of discharge will be controlled by a combination of door opening height and the rate of speed of the mixer drivels). Thus, the invention can be adapted to other configurations of how bulk feed on the truck or vehicle is dispensed to the hunk than a belt to a discharge conveyor and then feed in the discharge conveyor dispensed to the bunk.

Vehicle dynamics based scale compensations which help generate accurate and reliable weight measurements to the automated system when the vehicle is traversing challenging topography.

Sensors or components that compensate for environmental or operating conditions that could skew the operation of dispensing components and produce inaccuracies in dispensing.

These and other objects, features, advantages, and/or aspects of the invention will become more apparent with reference to the accompanying description.

3 BRIEF DESCRIPTION OF THE DRAWINGS

The appended drawings include figures to illustrate certain aspects or features of the disclosed invention in the context of exemplary embodiments of how the invention might be implemented into a motorized vehicle. The figures are summarized as follows:

Prior Art

FIGS. 1A-H illustrate prior art concepts and commercially-available components related to present feed lot feed dispensing techniques.

A Main Example of how to Make and Use the Invention

One example of how to make and use an embodiment according to the invention is illustrated in the following figures. These figures include illustrations of a specific motorized vehicle, its on-board components including vehicle and feed dispensing components, and both high level and specific functional configurations that could be used to make and use an embodiment of the invention. These figures include and show the vehicle itself, its on-board electrical and hydraulic sub-systems, and user controls.

FIGS. 2A-D are diagrams regarding an automated mode of feed dispensing system according to one exemplary embodiment of the present invention.

FIGS. 3A-F are diagrams of one example of a user interface and wiring architecture for the system of FIGS. 2A-D.

FIGS. 4A-D are diagrams of one example of a pedal emulator for use with the system of FIGS. 2A-D.

FIGS. 5A-D are isolated diagrams of switching components that could be used in pedal emulator of FIGS. 4A-E.

FIGS. 6A-E are schematic diagrams of wiring connections between various components of the dispensing system of FIGS. 2A-D.

Figures 2, 7A:
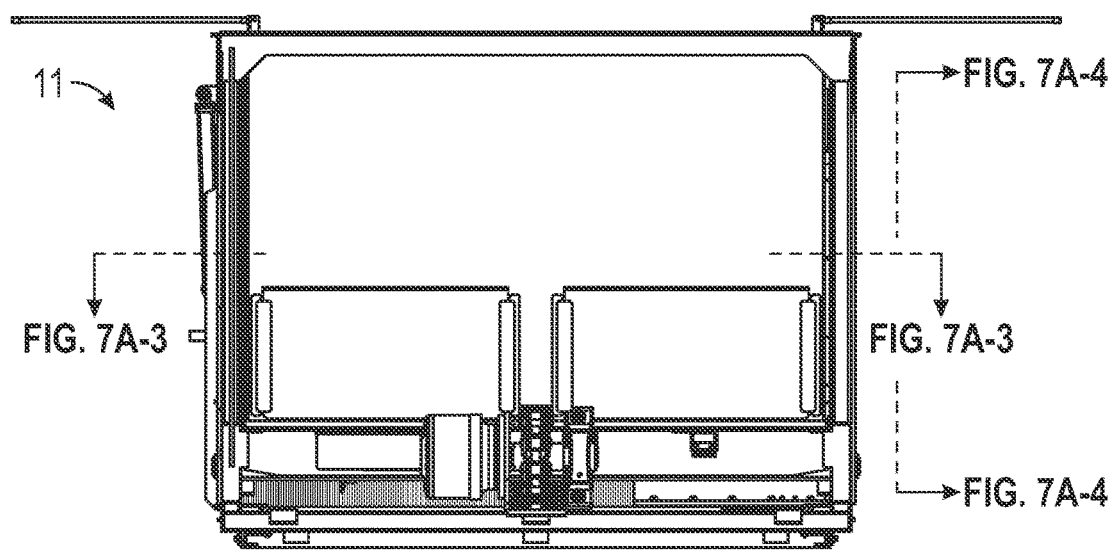
Figures 3, 7A:
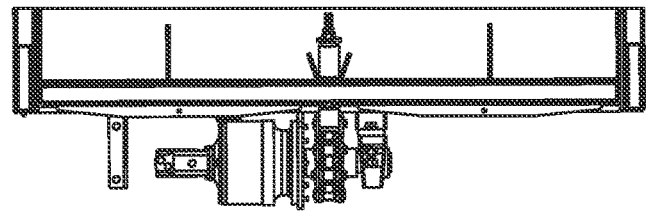
Figures 4, 7A:
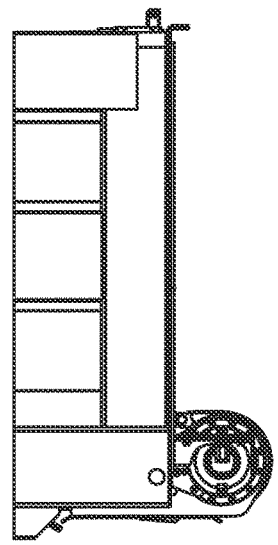
Figures 3, 7B:
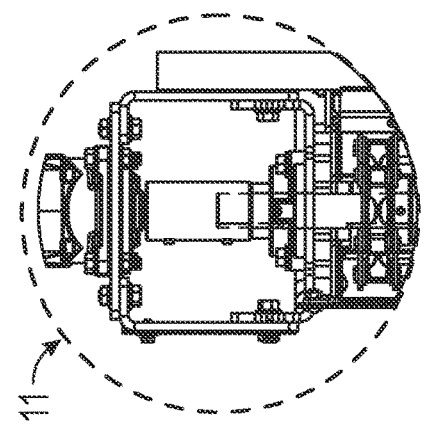
Figures 2, 7B:
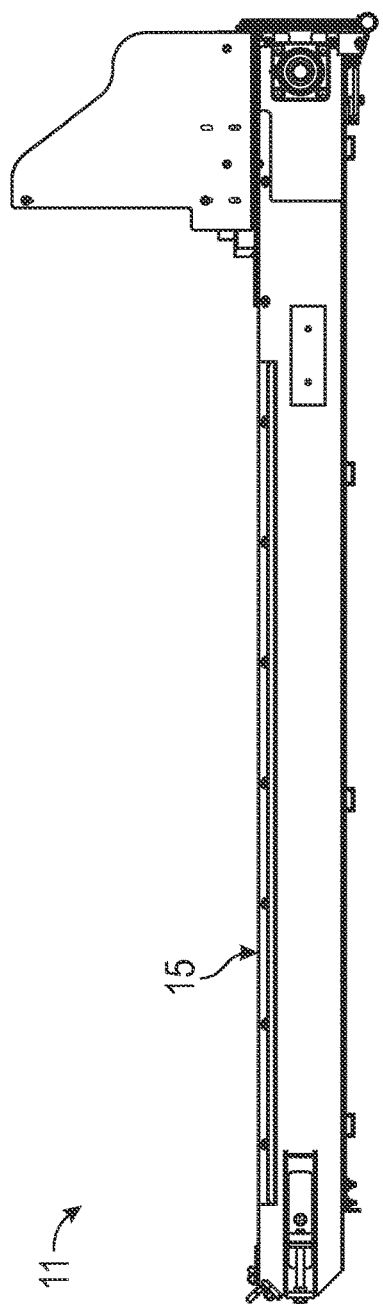
Figures 1, 7C:
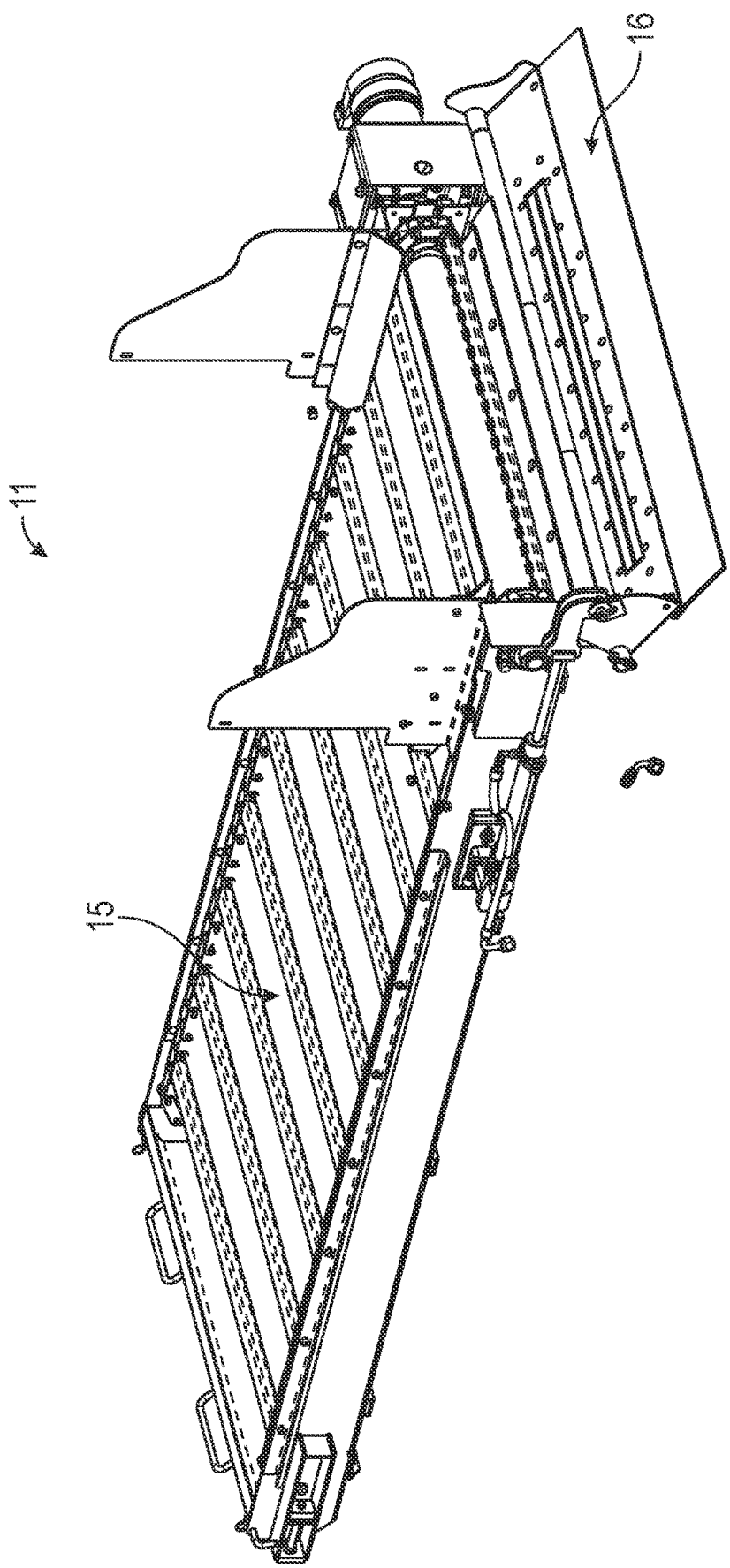
Figures 2, 7C:
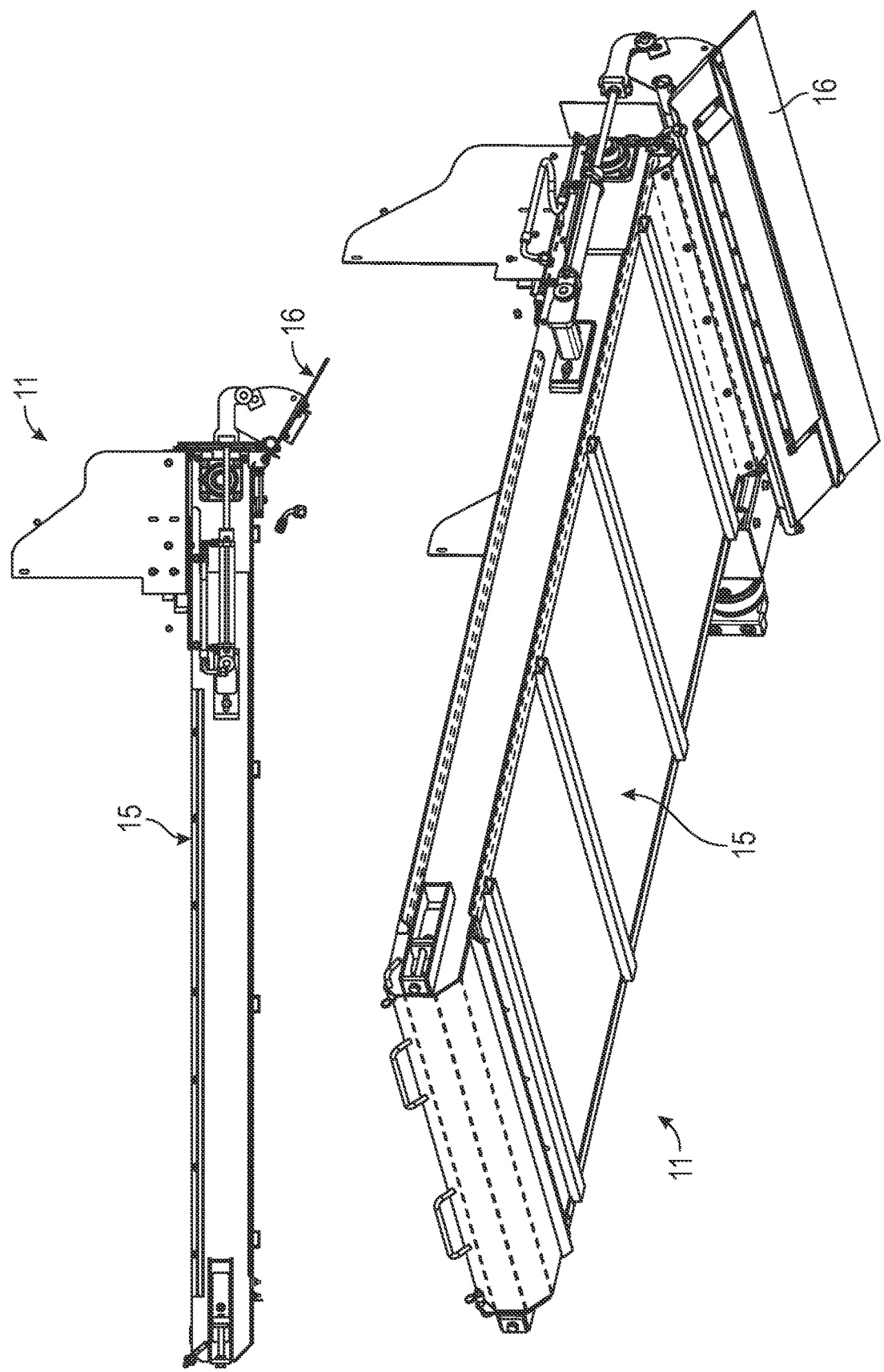

FIGS. 7A-1 to A-4, 7B-1 to B-3, and 7C-1 to C-2 are views of one example of a feed dispensing box mountable on a truck according to one example of the system of FIGS. 2A-D.

Figure 8A:
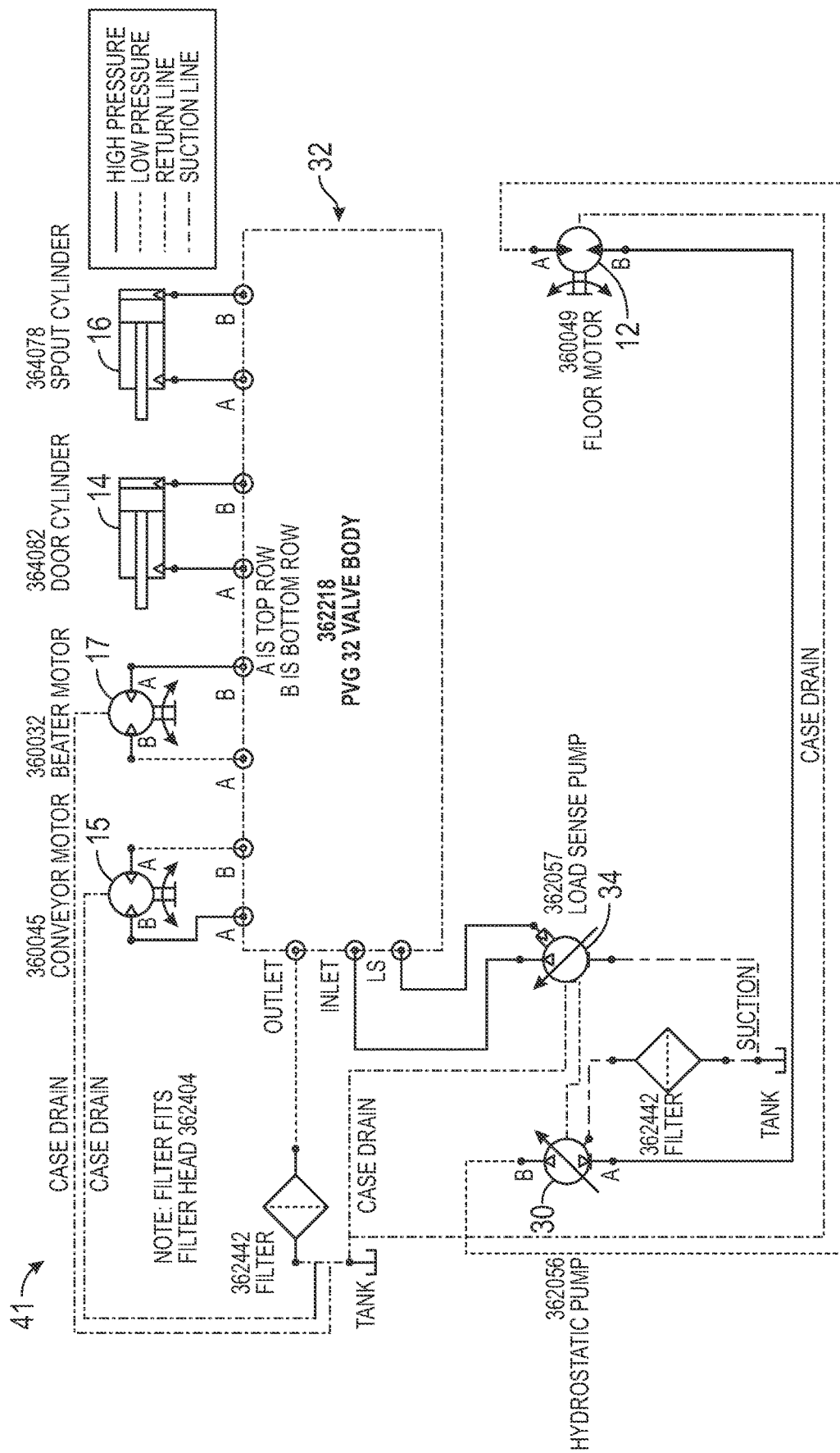
Figures 1, 8B:
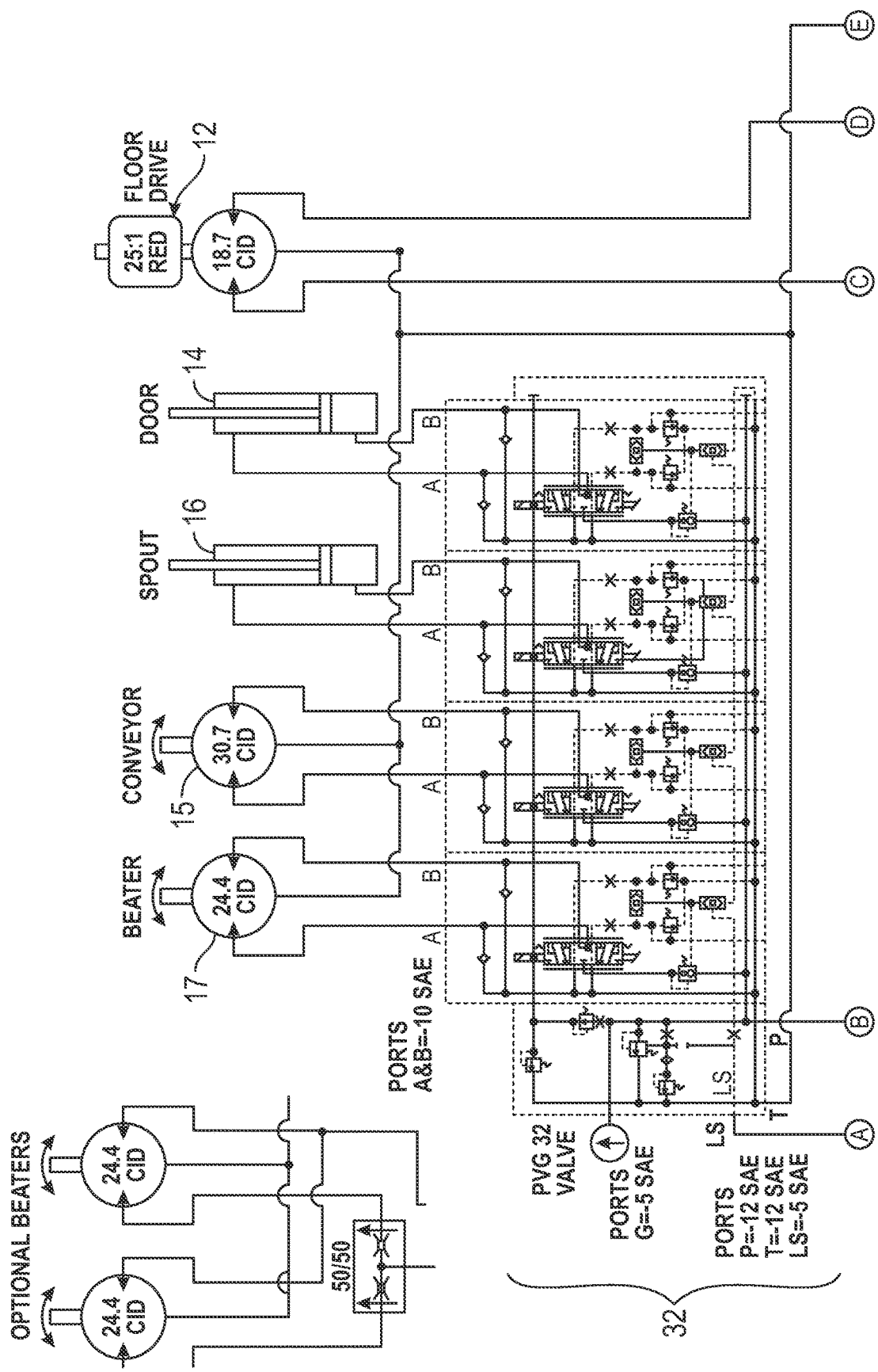
Figures 2, 8B:
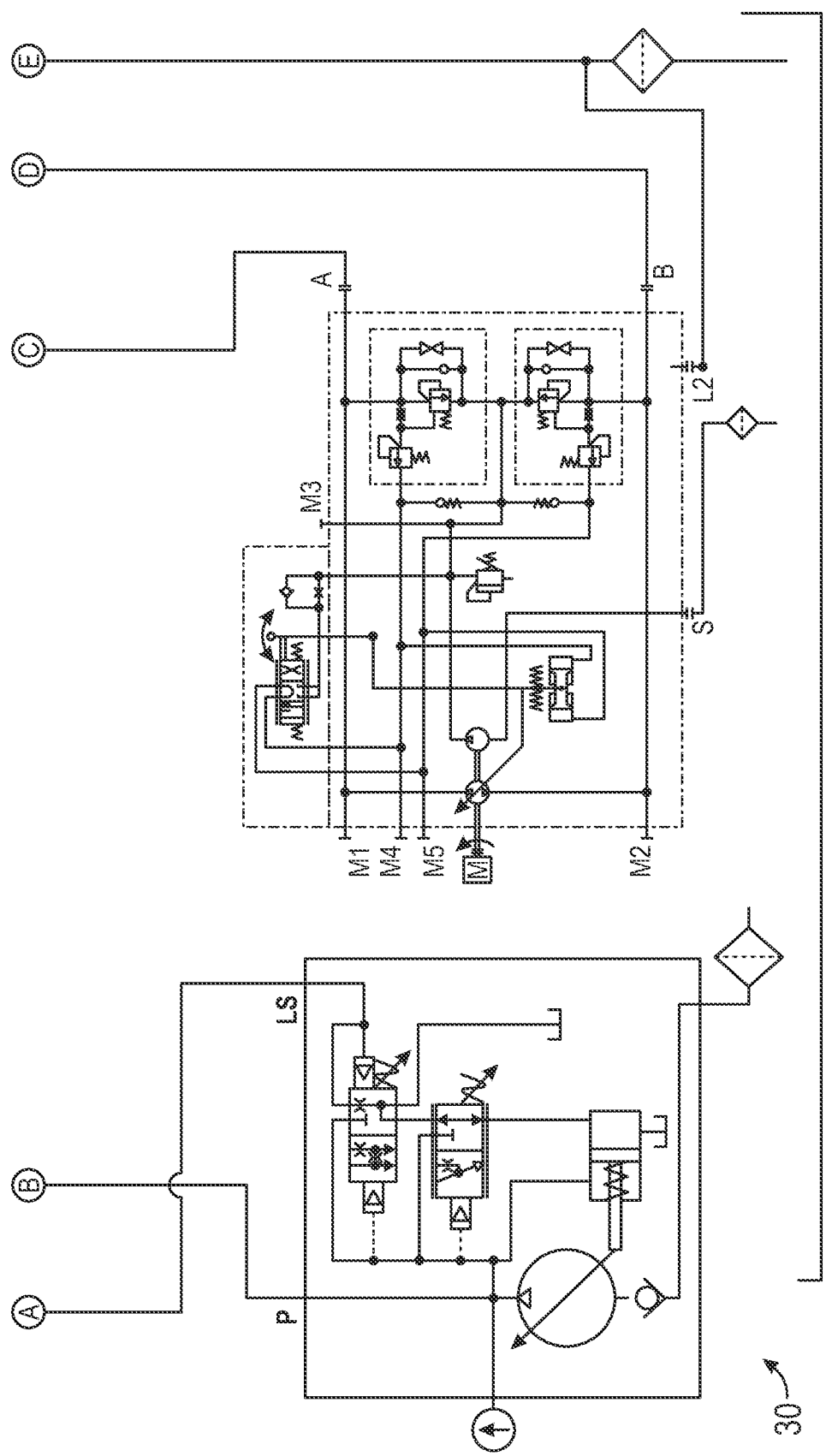
Figures 3, 8B:
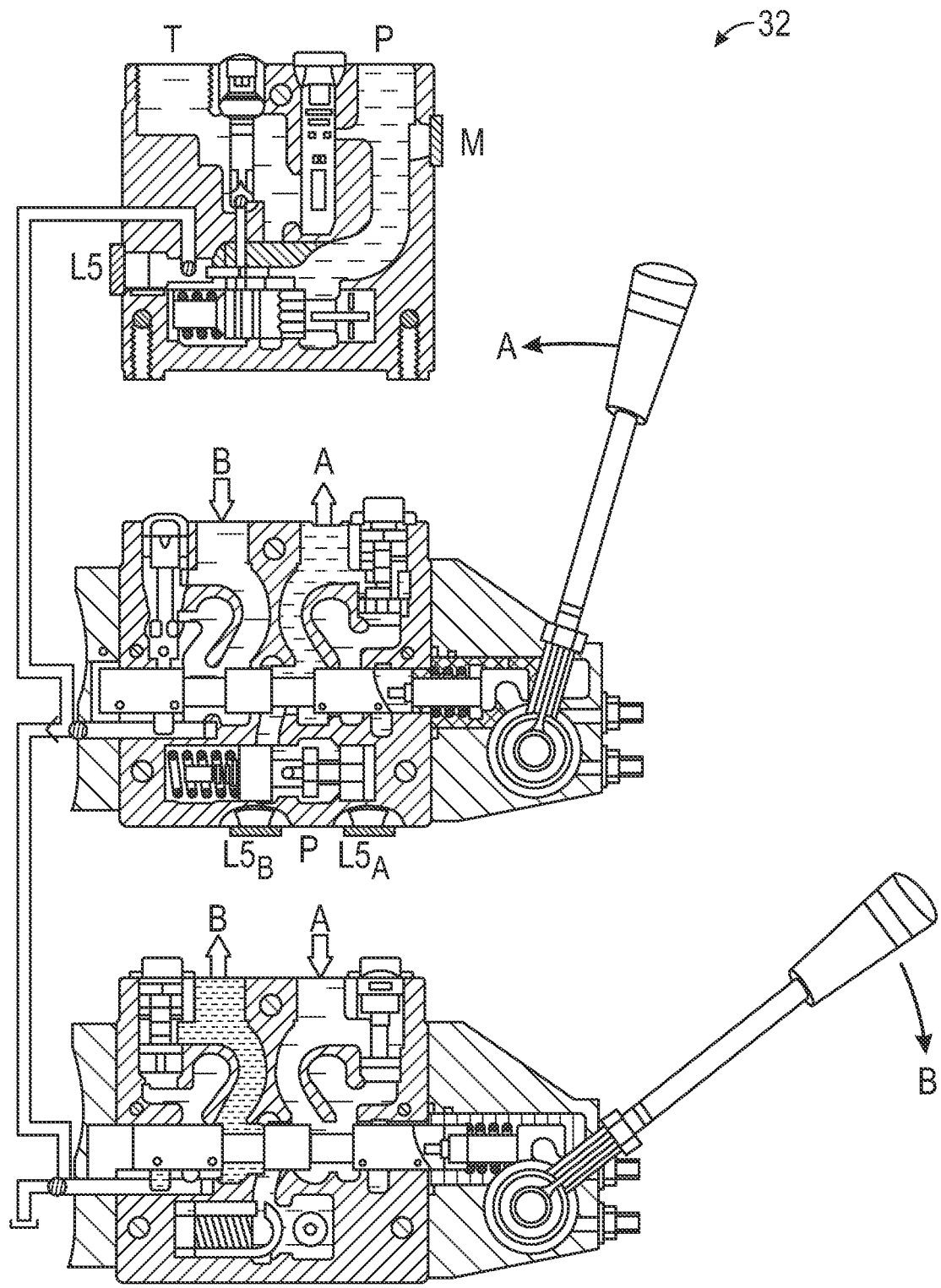
Figures 2, 8C:
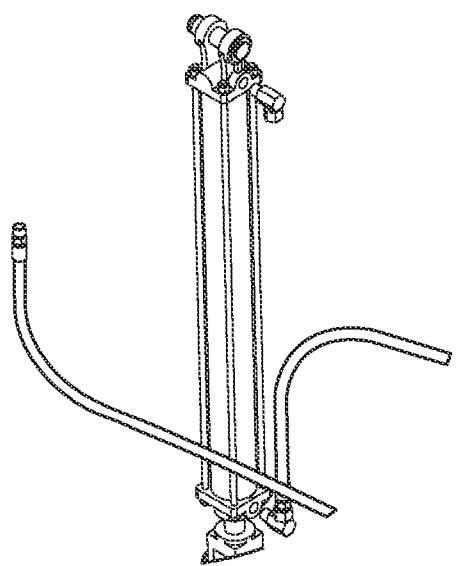
Figures 3, 8C:
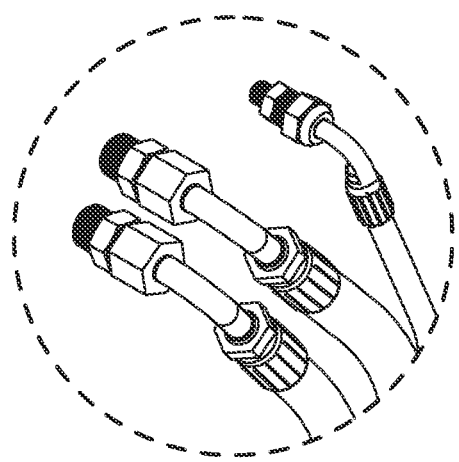
Figures 4, 8C:
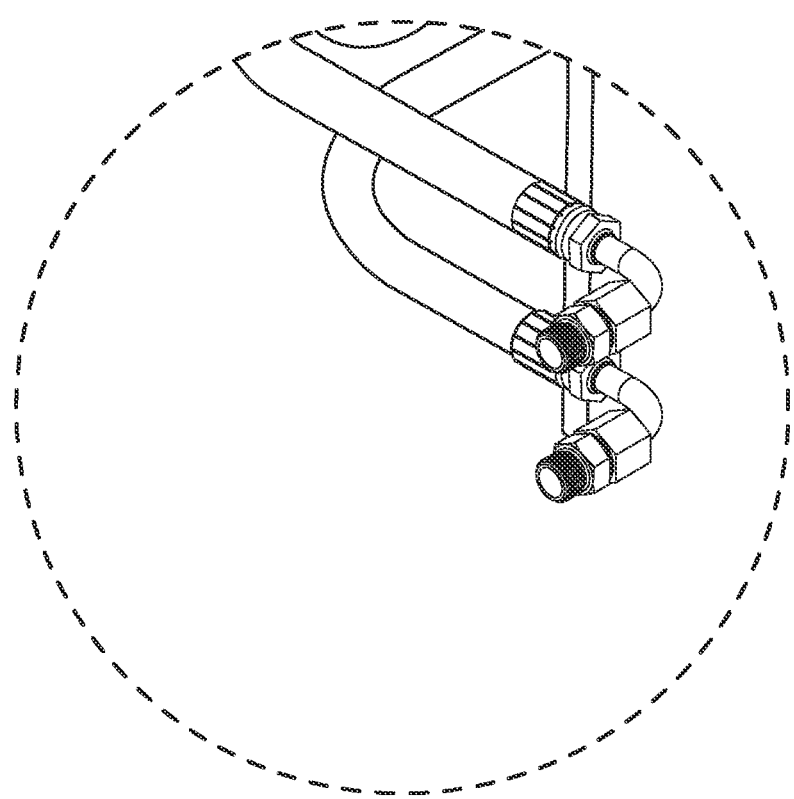

FIGS. 8A, 8B-1 to B-3, C-1 to C-9, and D-1 to D-2 are diagrams and illustrations of one example of a hydraulic subsystem for use with the system of FIGS. 2A-D. FIGS. 8D-1 and D-2 are intended to give the reader an idea of one non-limiting set of parts to build a hydraulic sub-system as shown in FIGS. 8C-1 to C-9.

Figures 1, 9A:
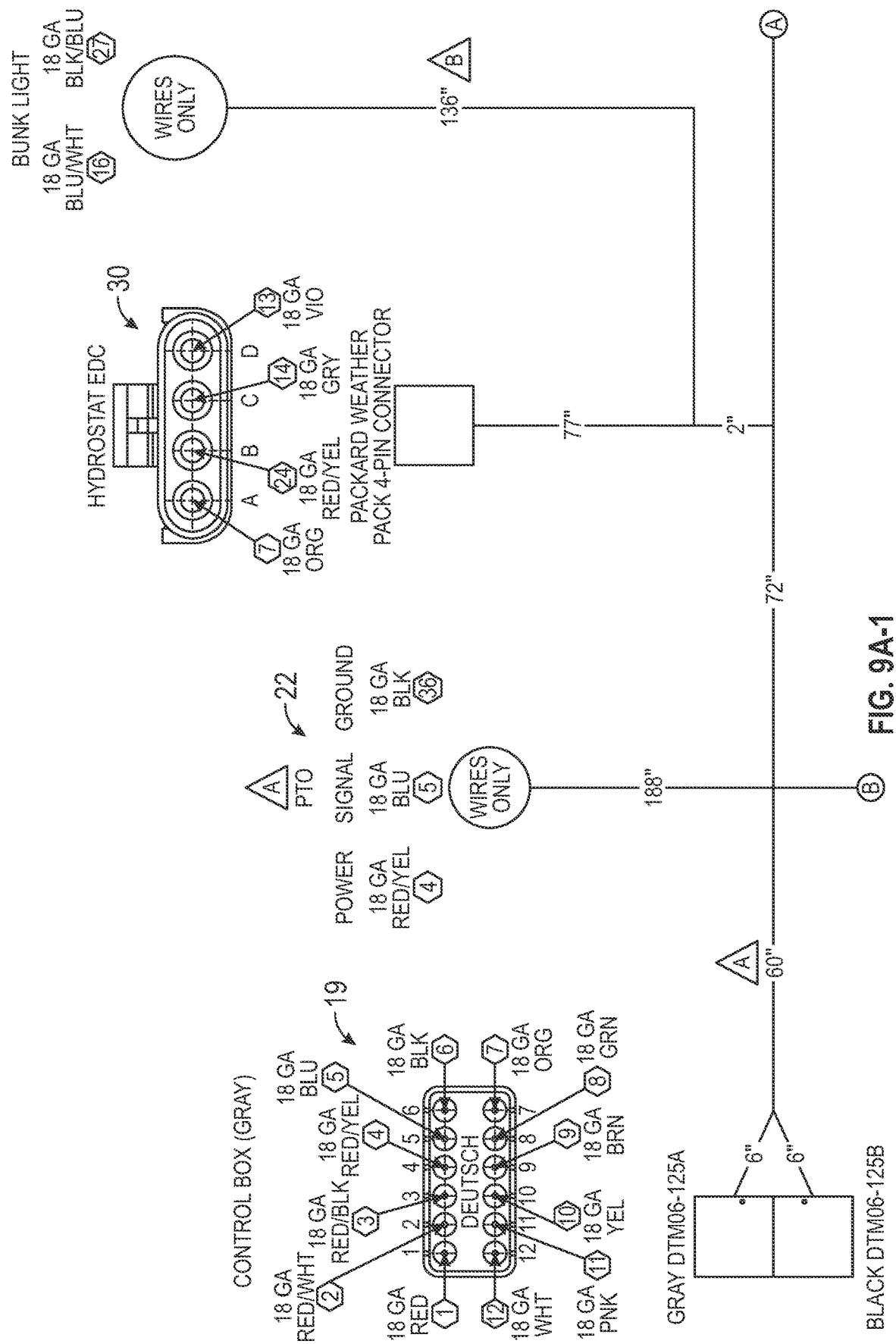
Figures 2, 9A:
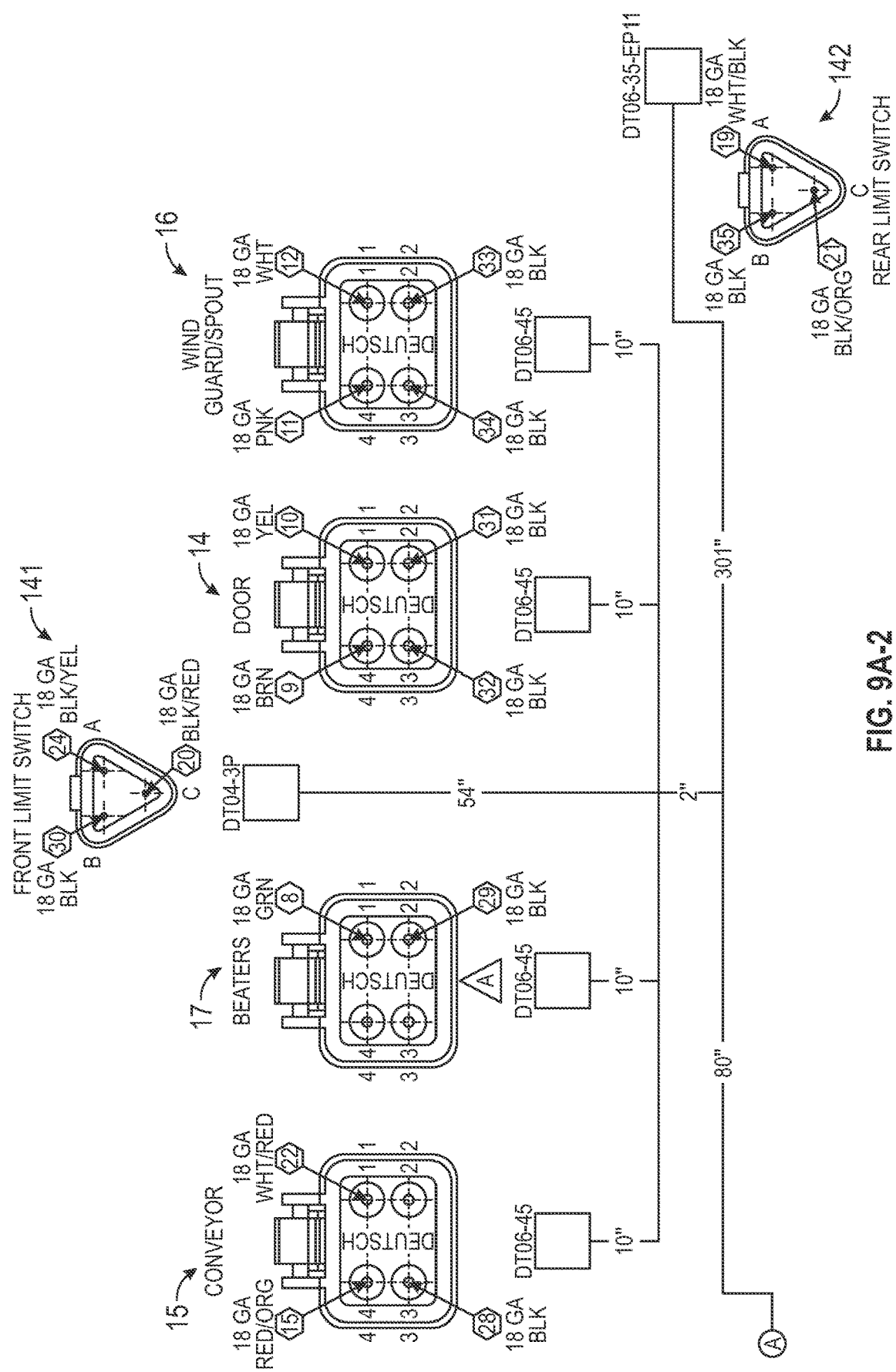
Figures 3, 9A:
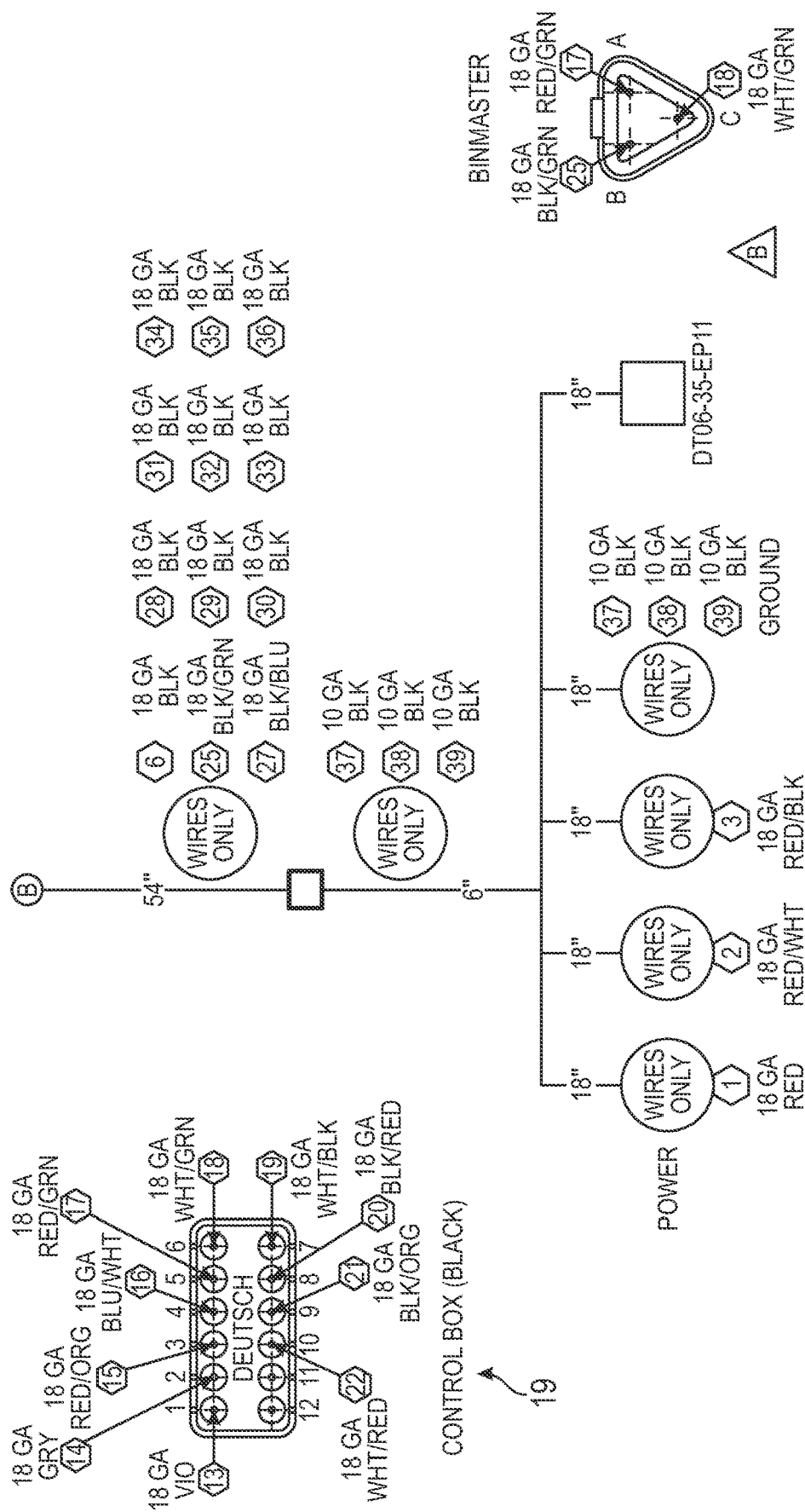

FIGS. 9A-1 to A-3, 9B, and 9C are diagrams and illustrations regarding one example of a control box and connections for use with the system of FIGS. 2A-D, including optional limit switches that could be used to inform the system of the operating position of components of the dispensing system.

Figure 10A:
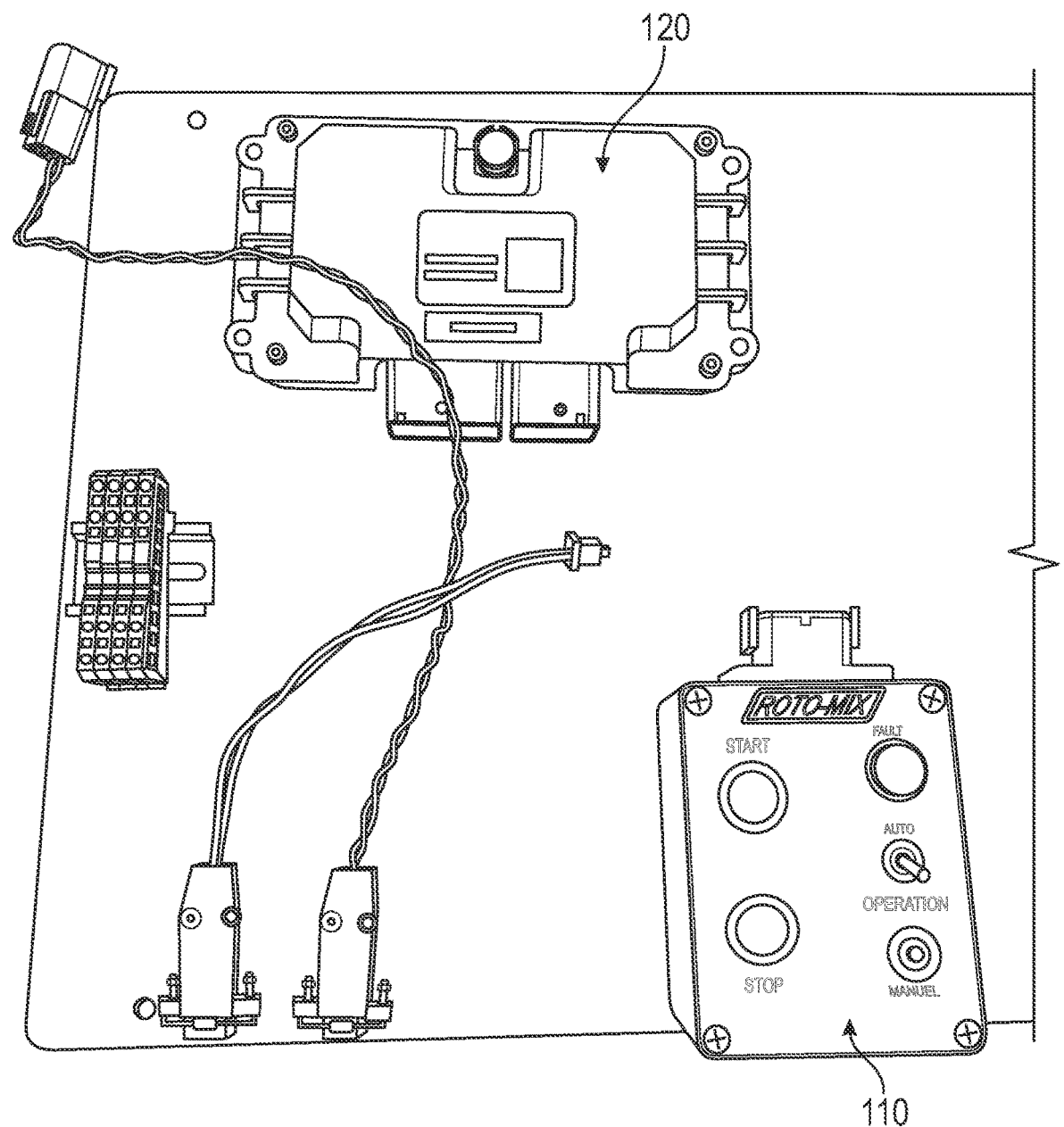
Figure 10B:
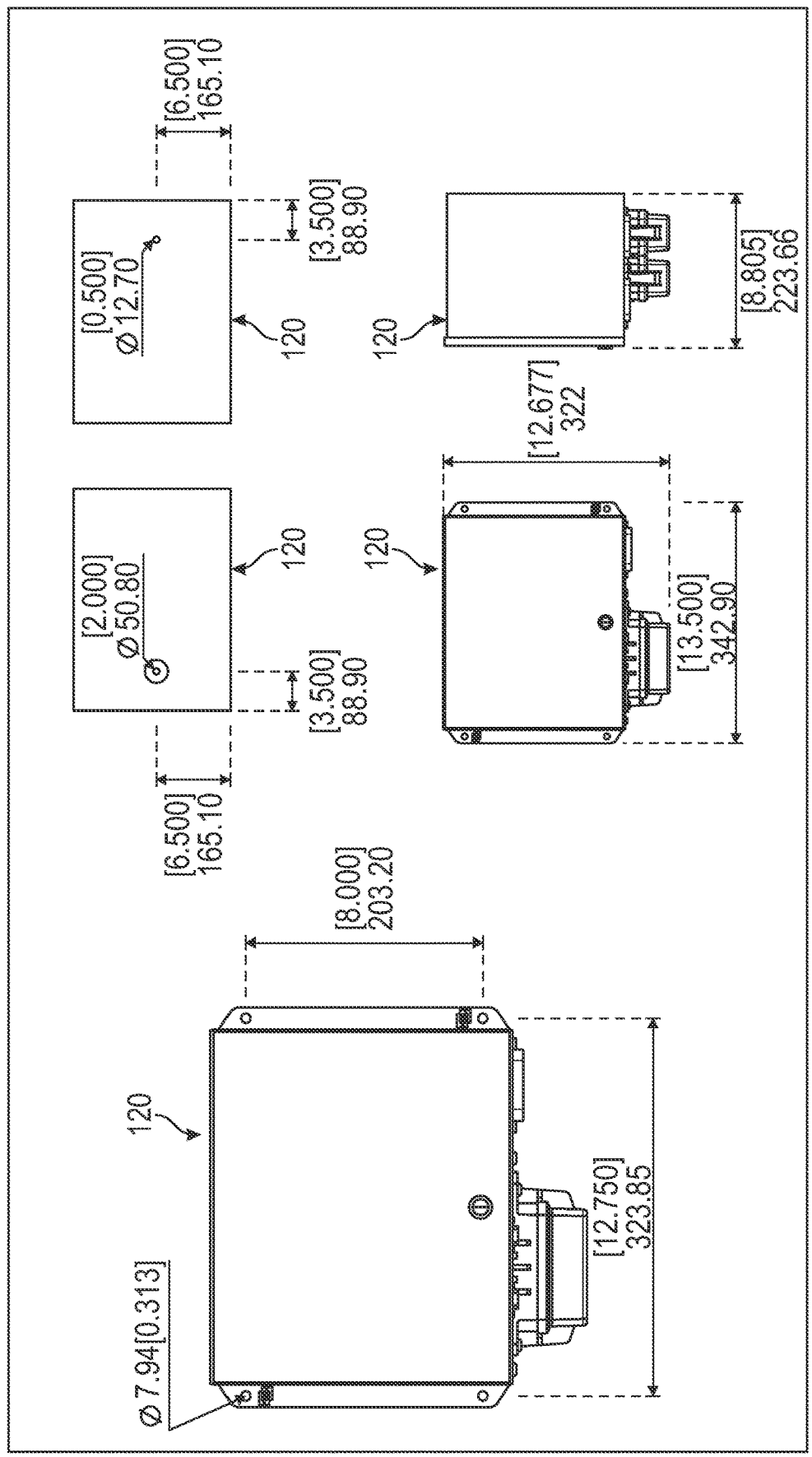
Figure 10C:
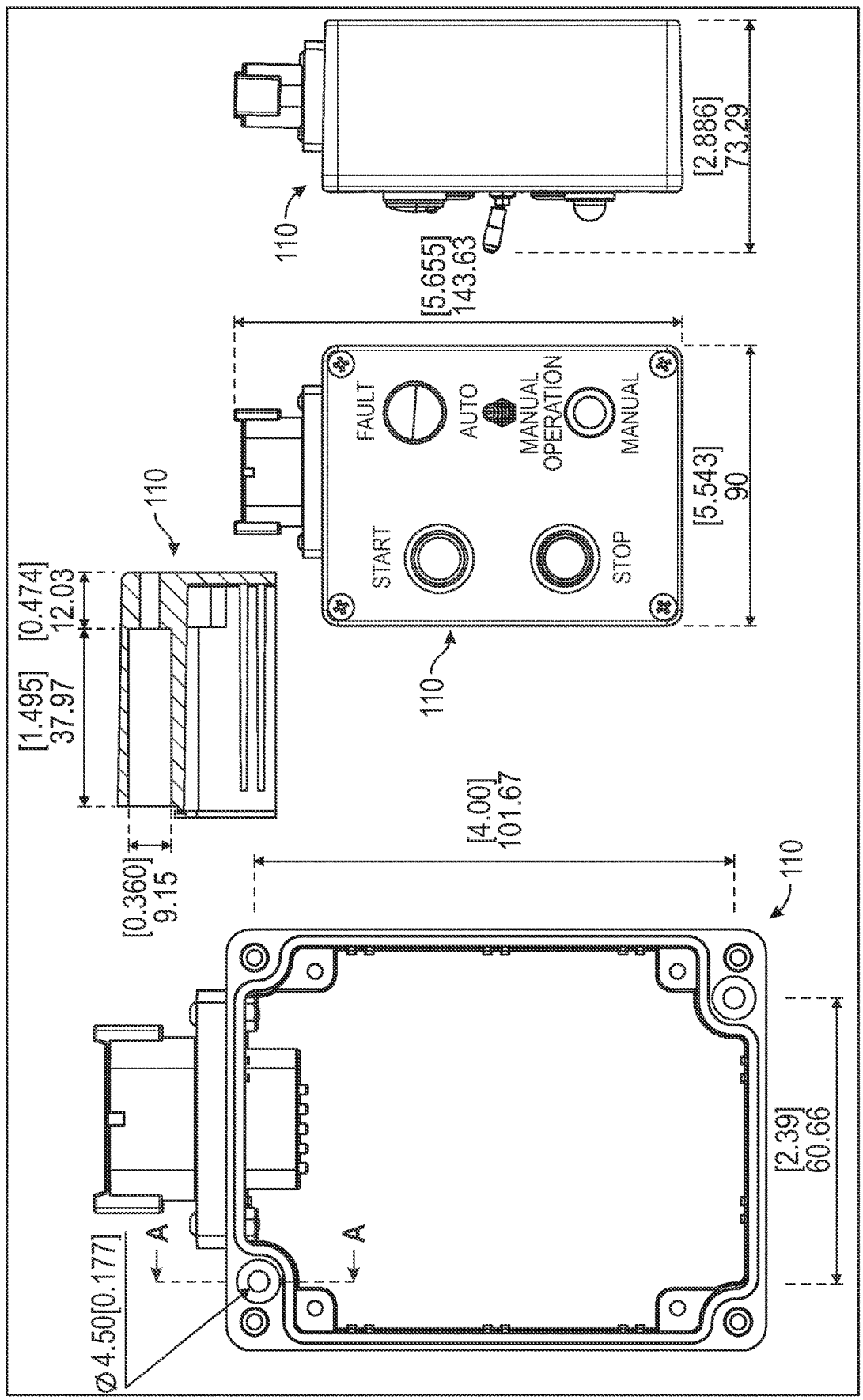

FIGS. 10A-C are diagrams and illustrations of one example of a control box and user interface for use with the system of FIGS. 2A-D.

Load Sense Hydraulics Feature That Can Be Integrated Into The Invention

Figure 11A:
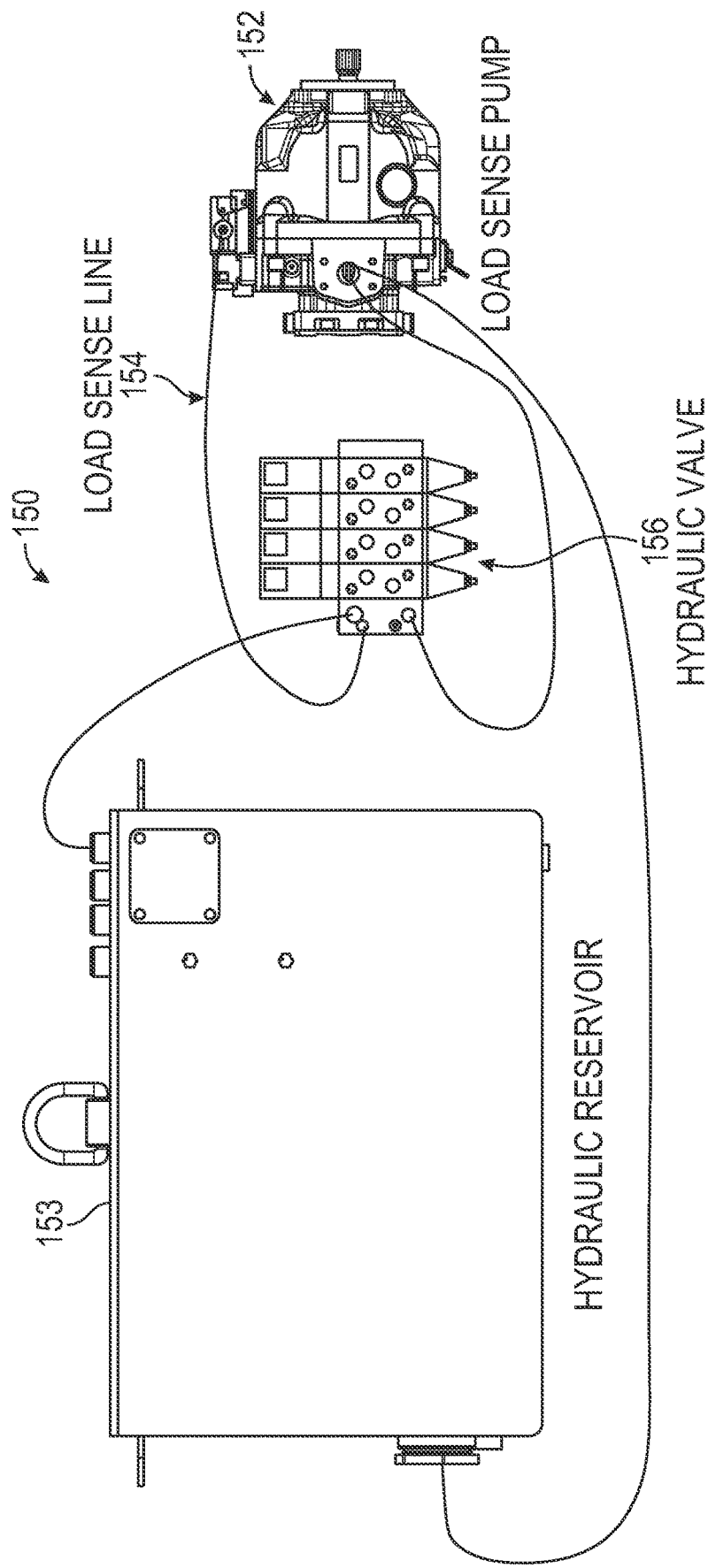
Figure 11B:
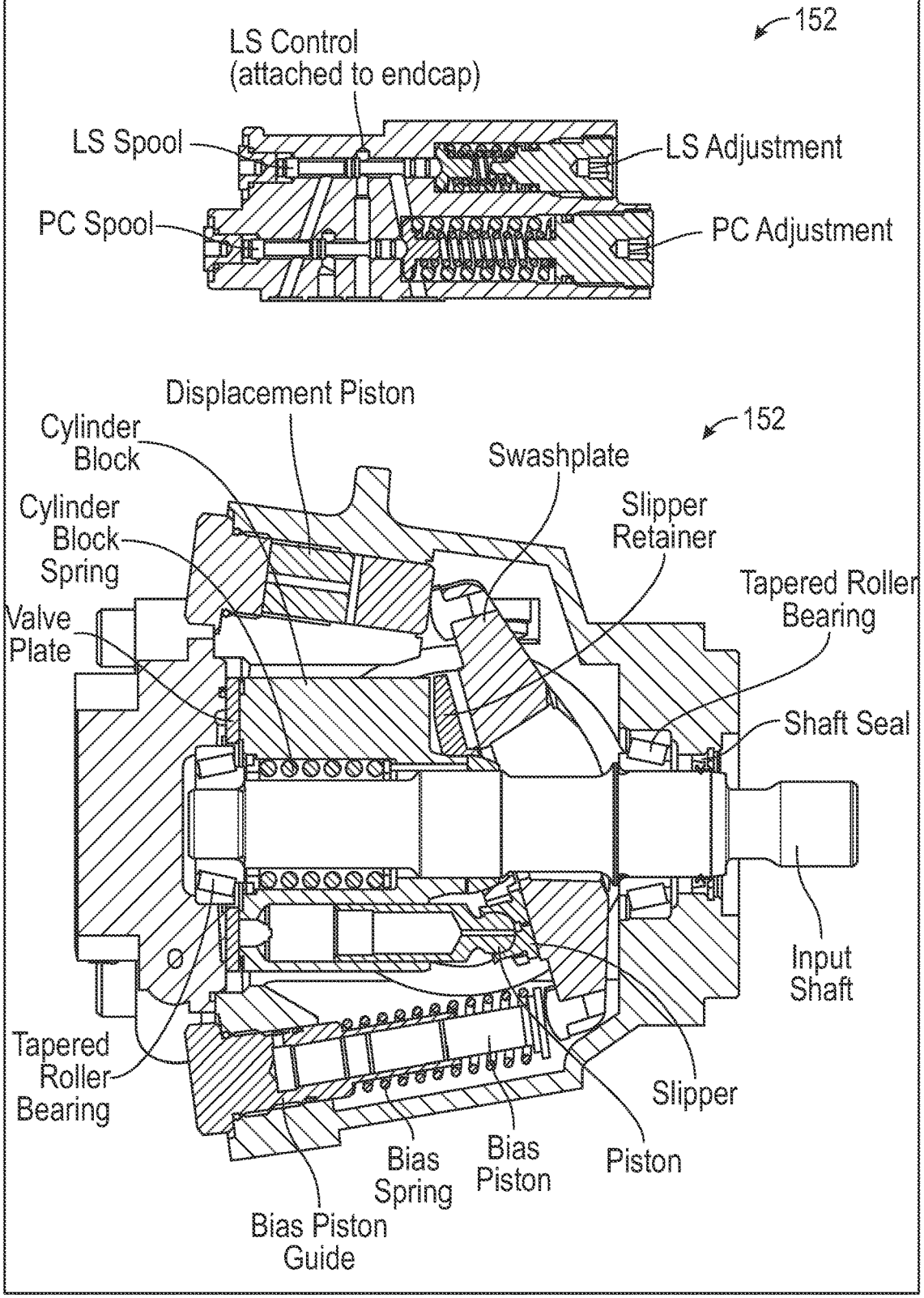
Figure 11C:
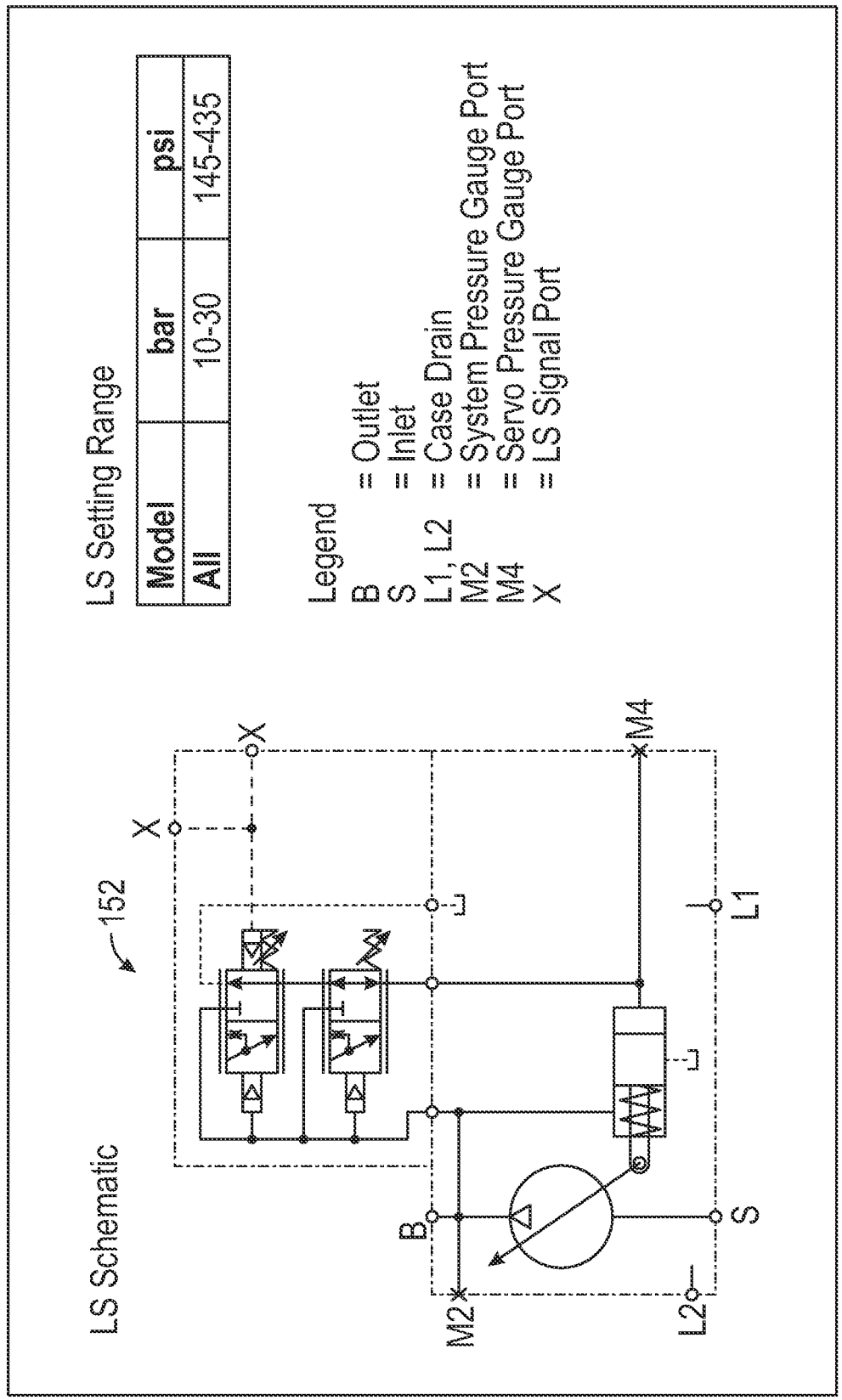

FIGS. 11A-C illustrate additional specifics about a load sense hydraulics feature according to one possible embodiment of the invention.

Ration Delivery Box Overload Interrupter Feature

Figure 12A:
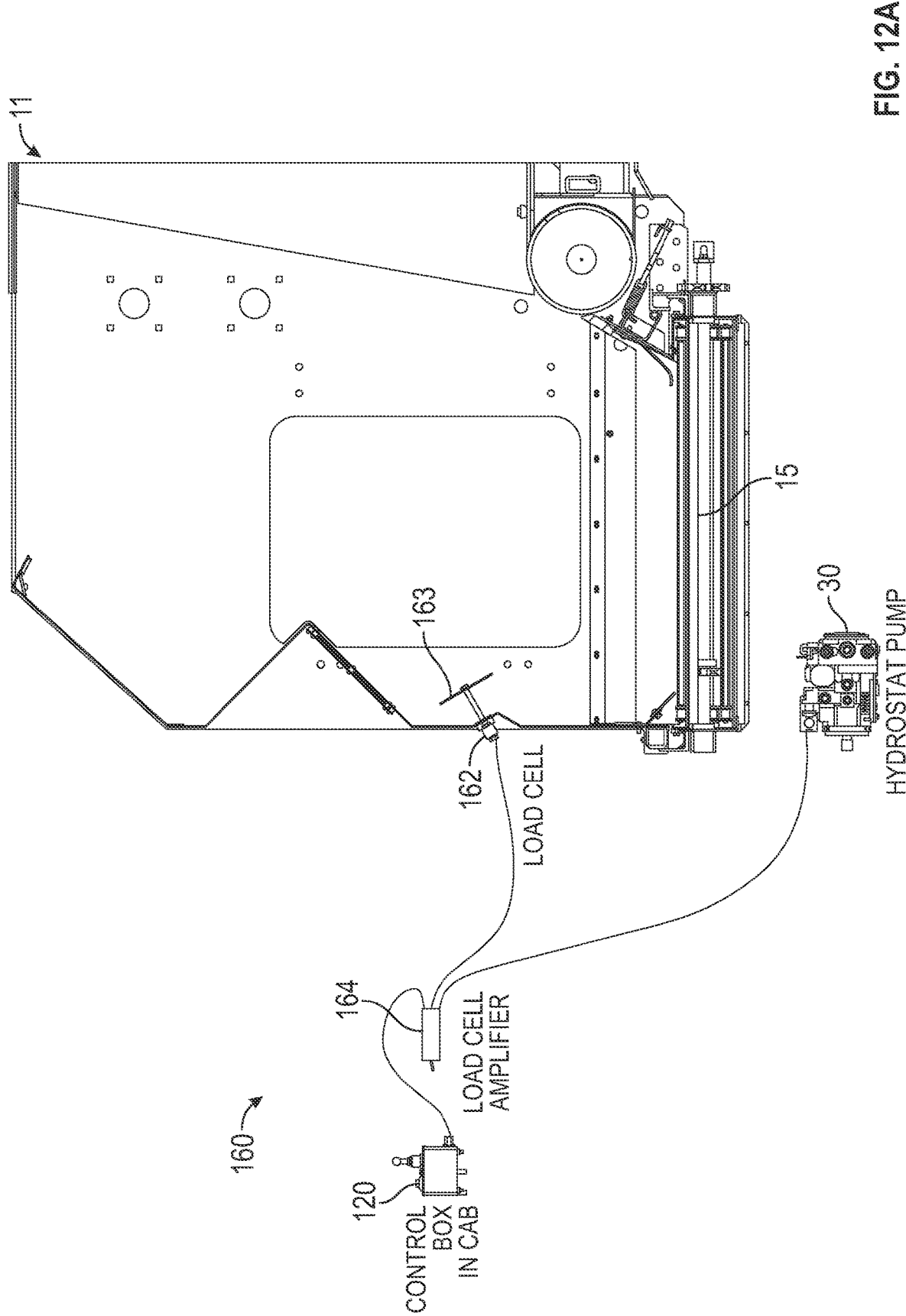
Figure 12B:
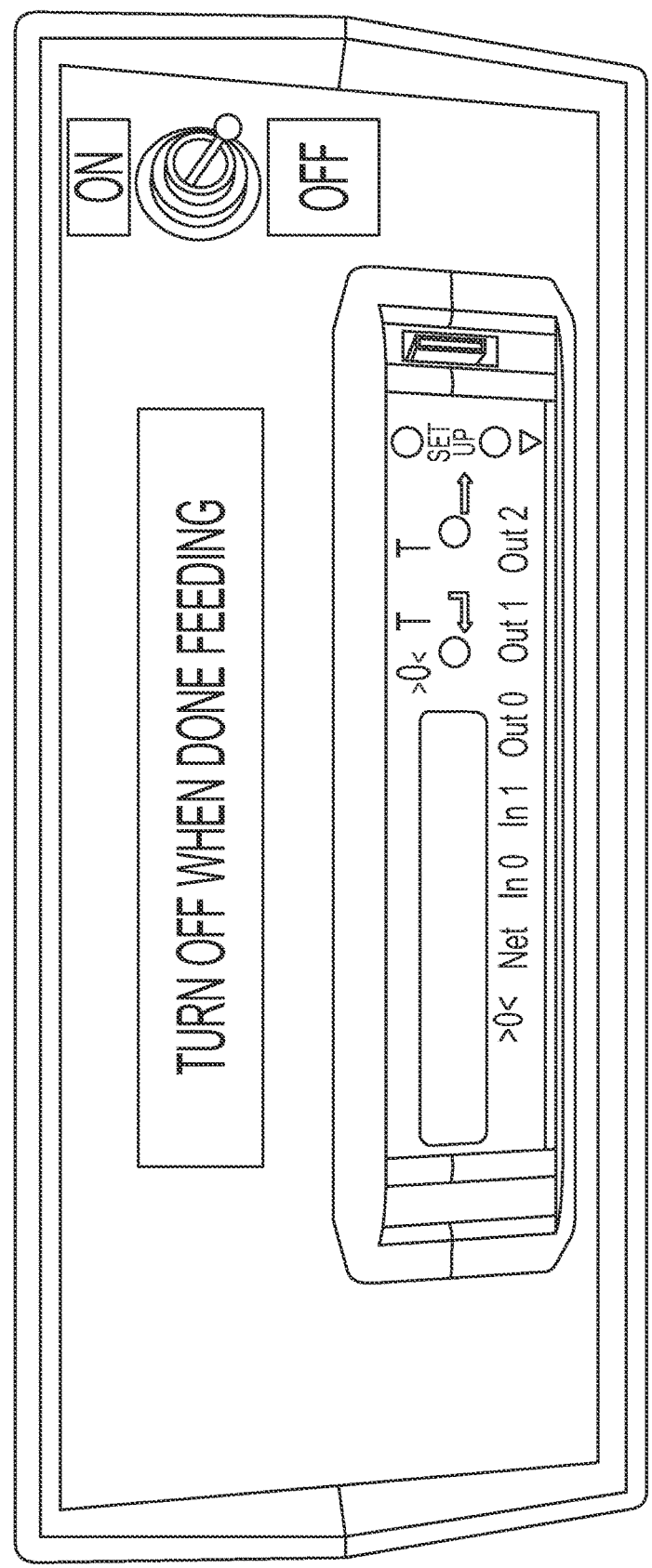
Figure 13:
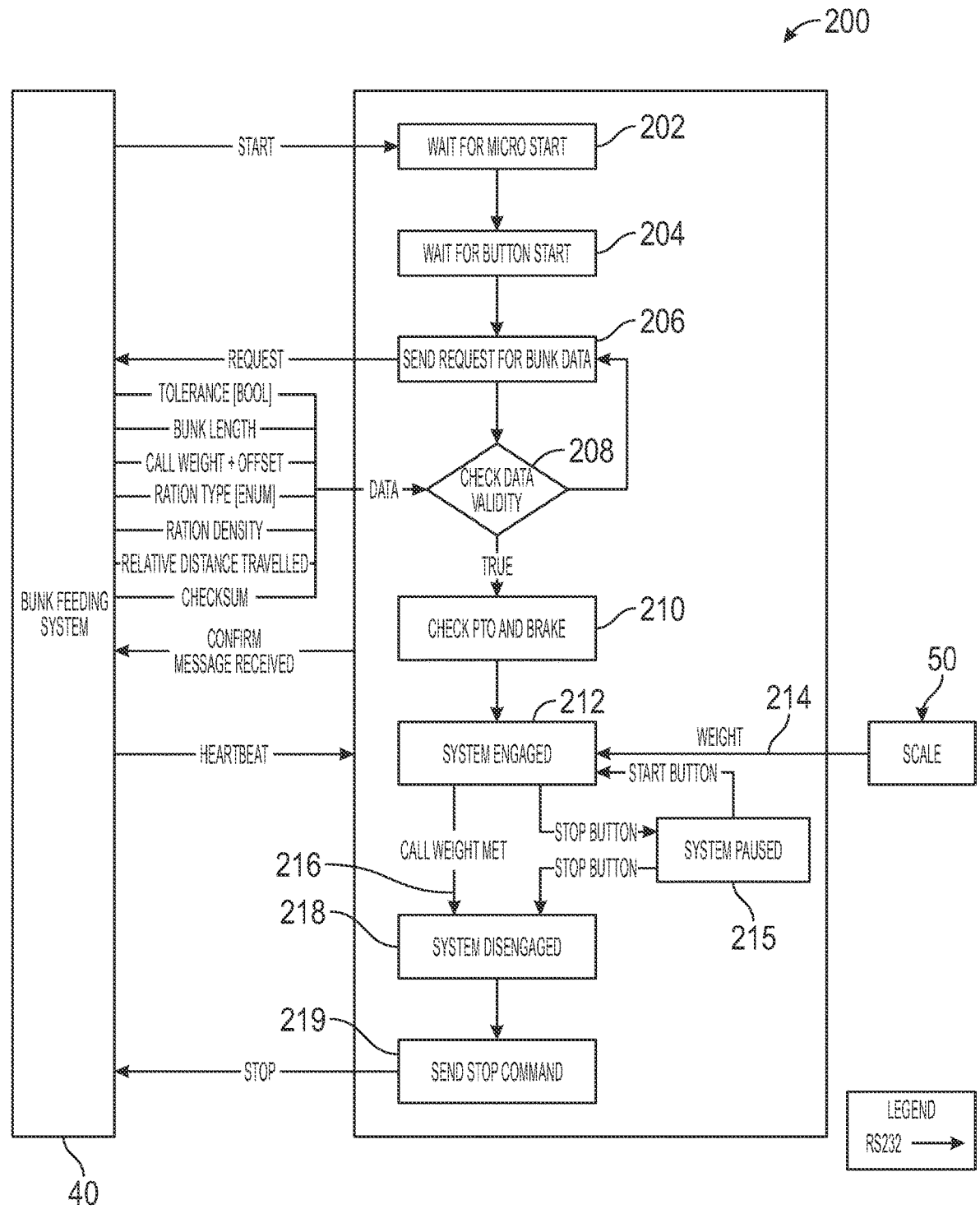
Figure 17A:
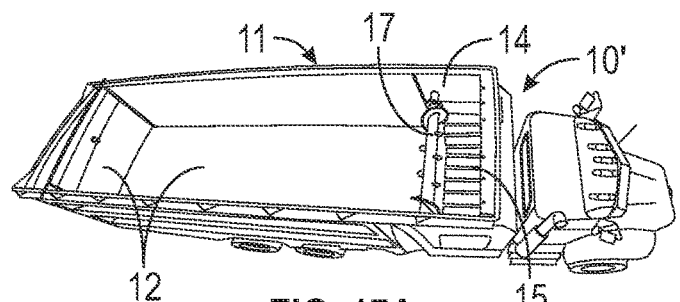
Figure 17B:
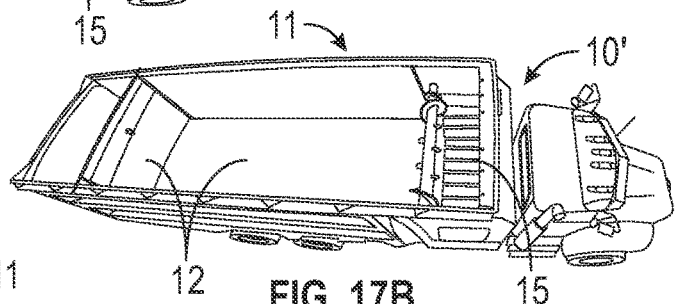
Figure 17C:
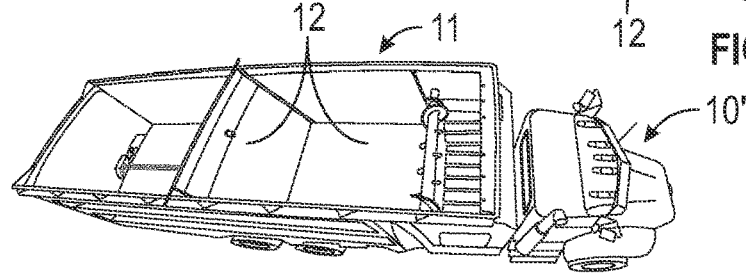
Figure 17D:
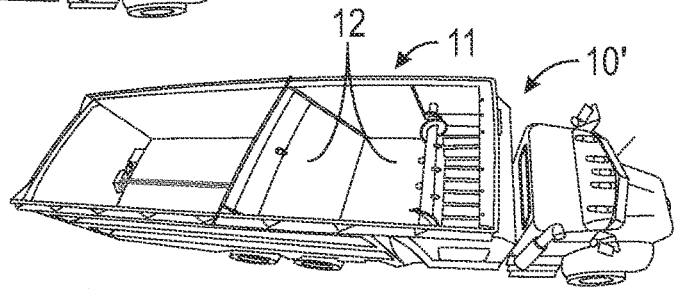
Figure 17E:
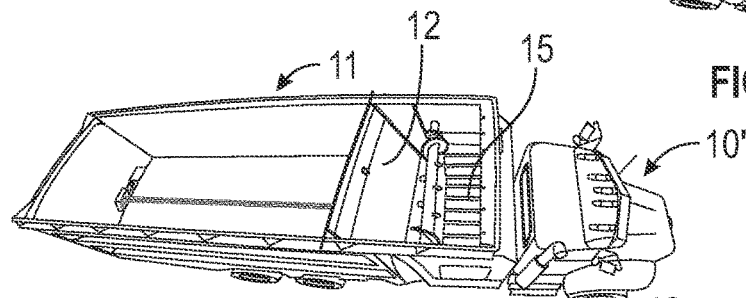
Figure 17F:
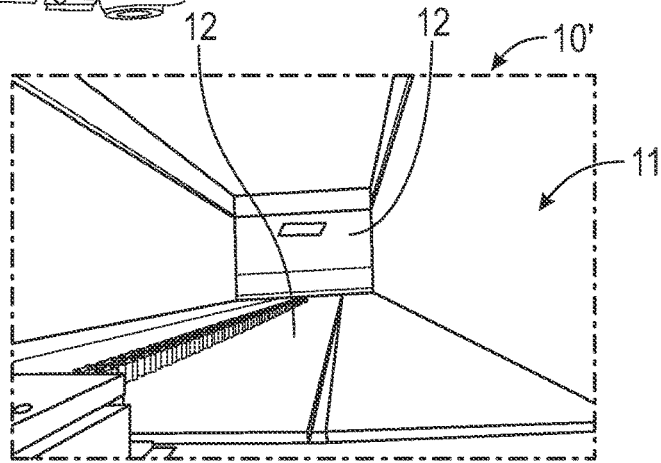
Figure 18A:
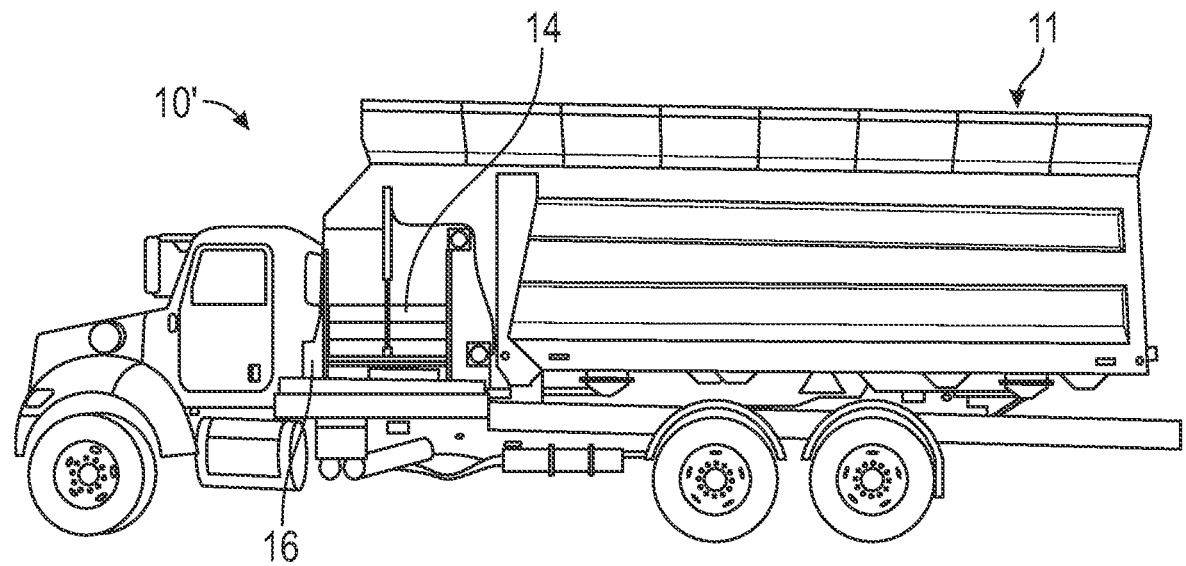
Figure 18B:
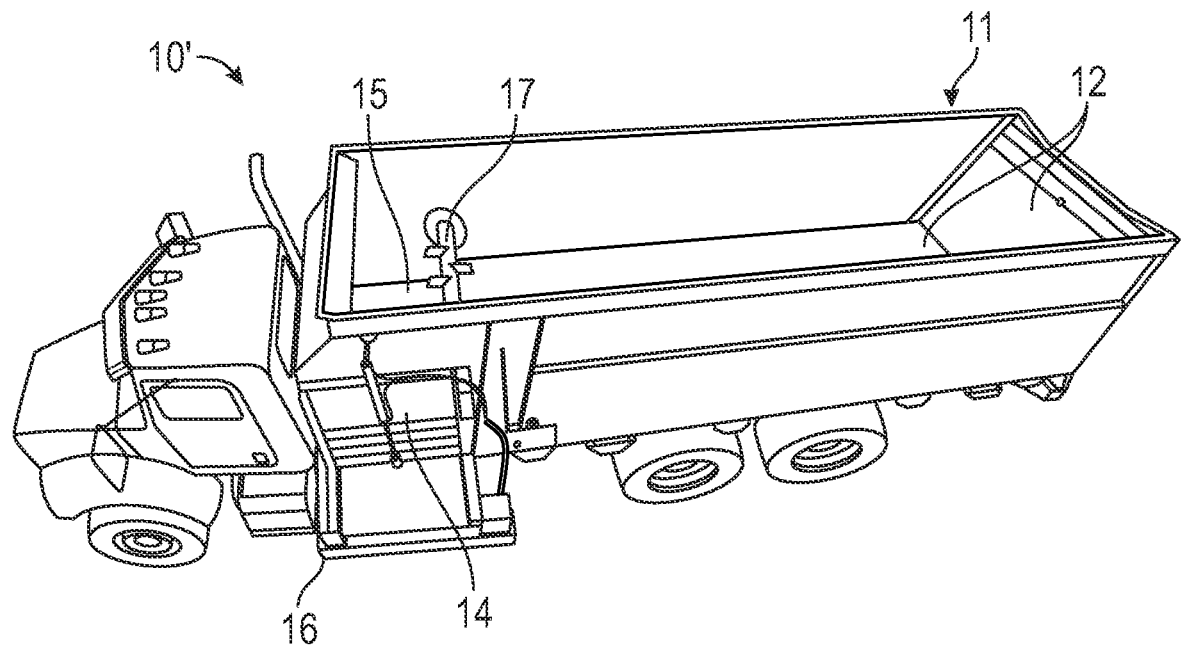
Figure 18C:
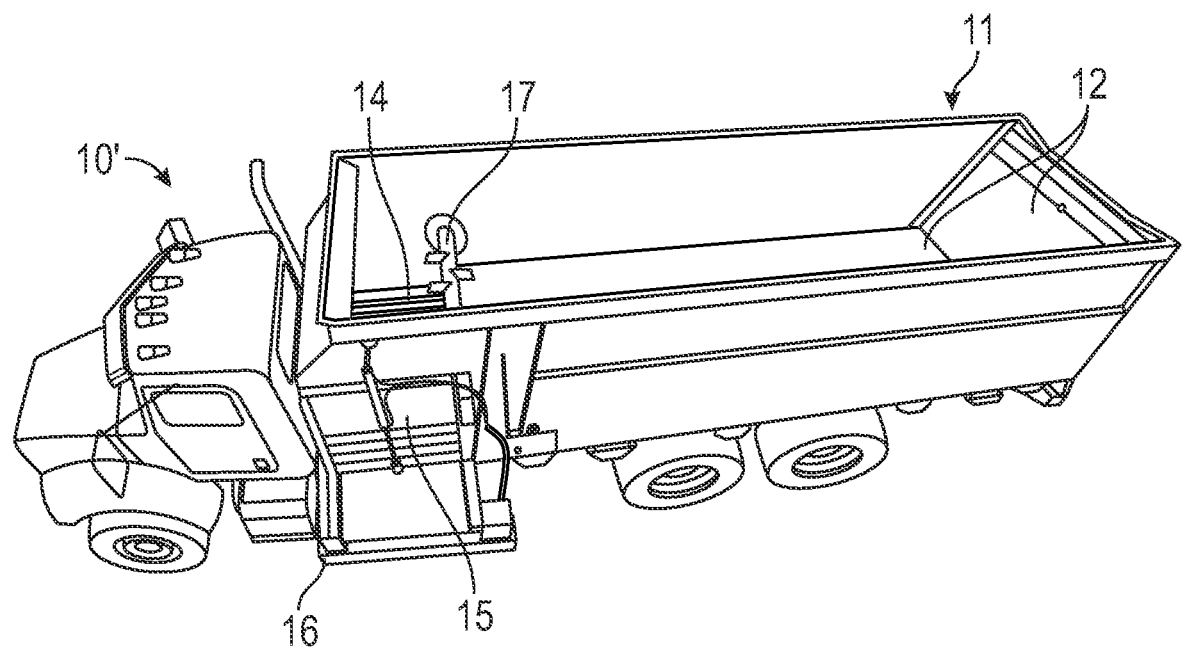
Figure 18D:
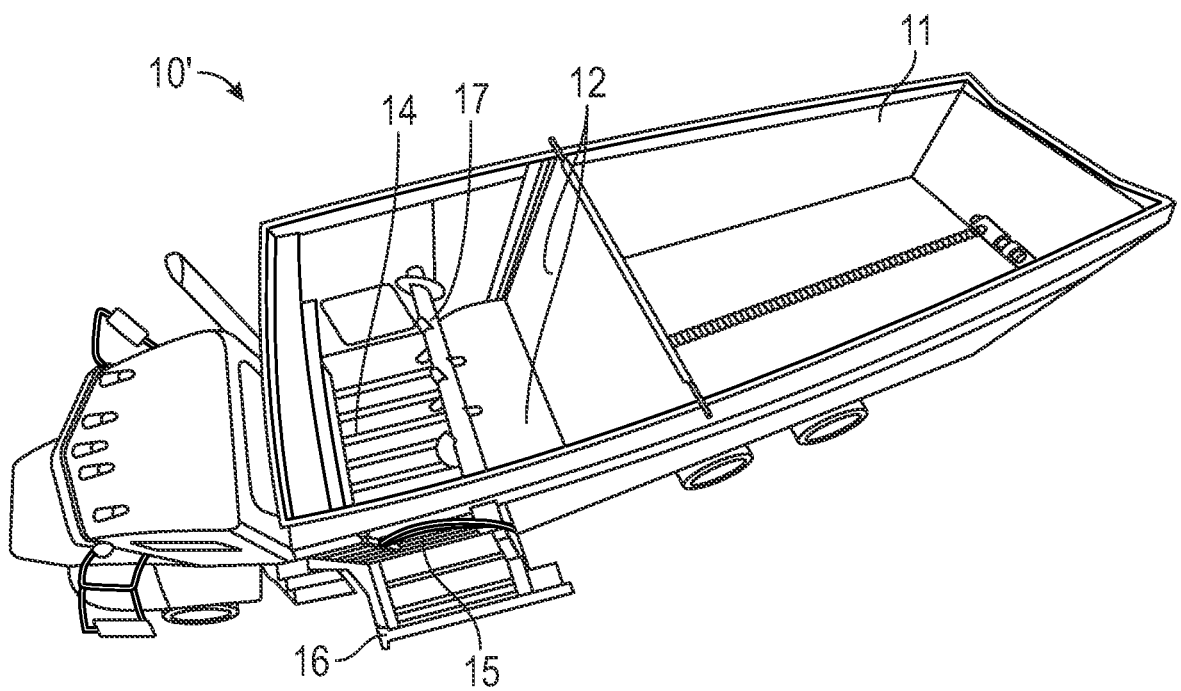
Figure 18E:
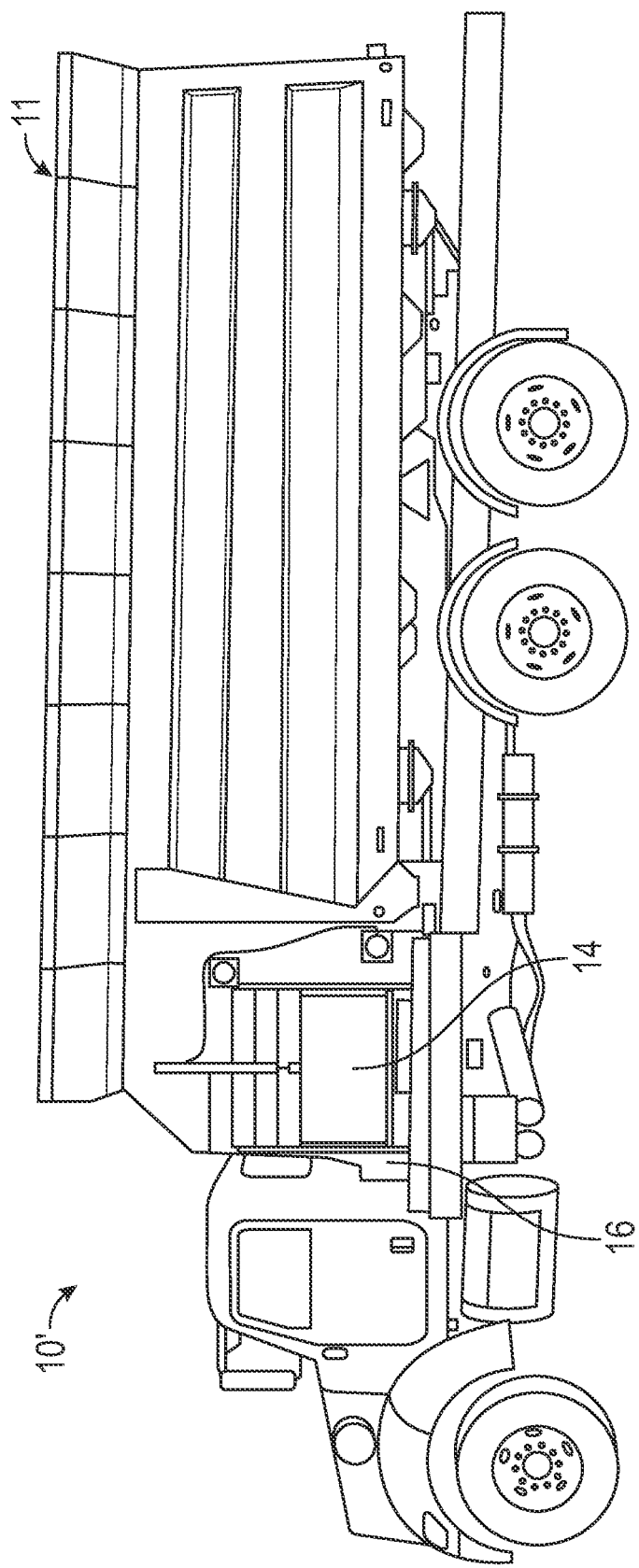

FIGS. 12A-B illustrate additional specifics about a ration box delivery overload interrupter feature.

Automatic Mode State Diagram and Functionalities

Figures 5, 8C:
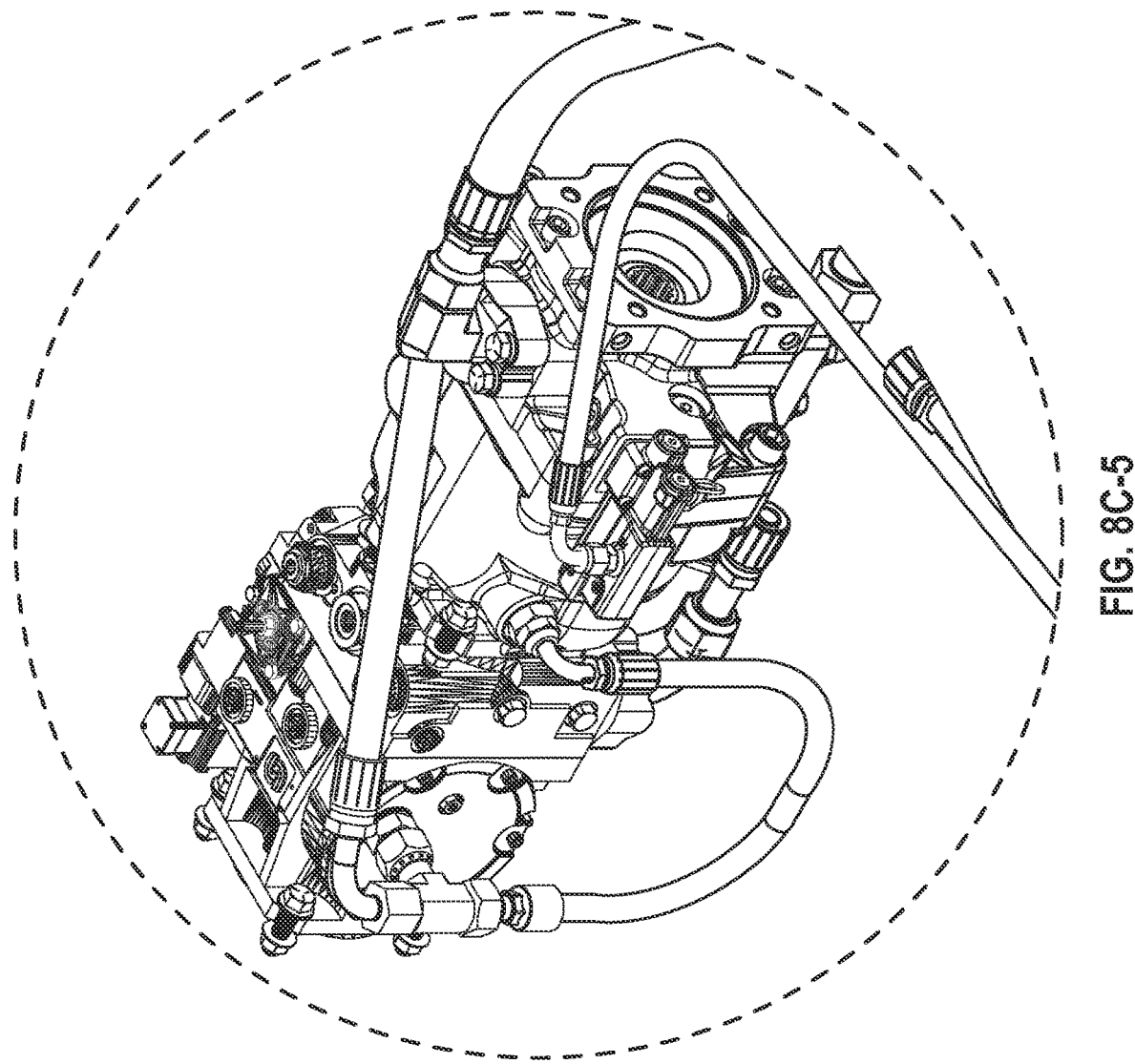
Figures 6, 8C:
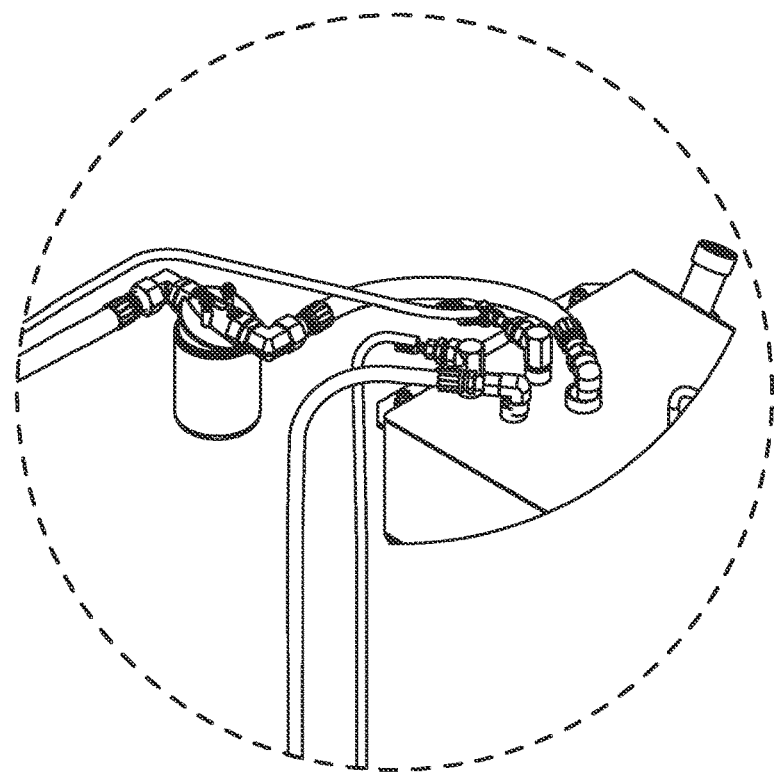
Figures 7, 8C:
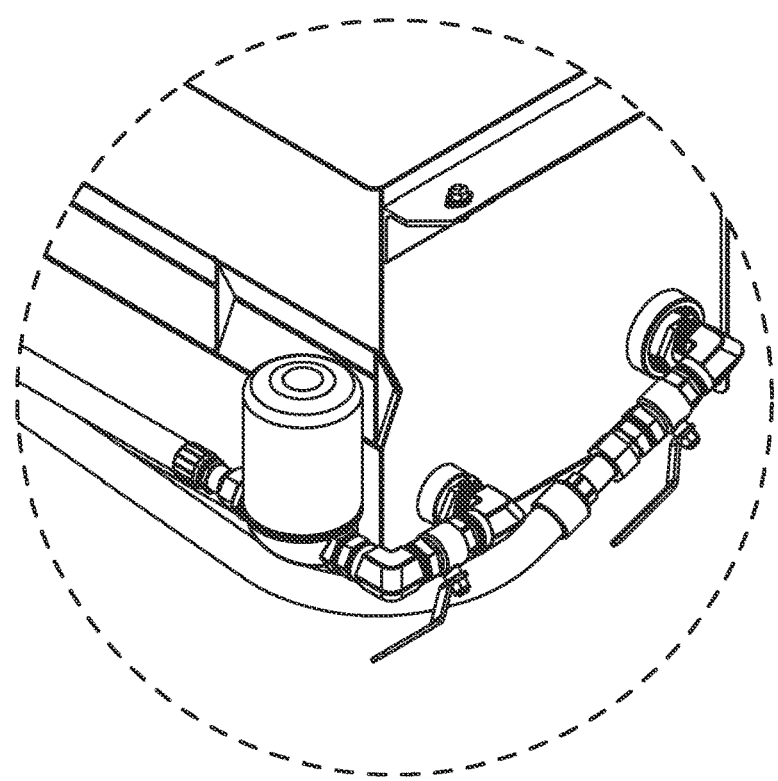
Figures 8, 8C:
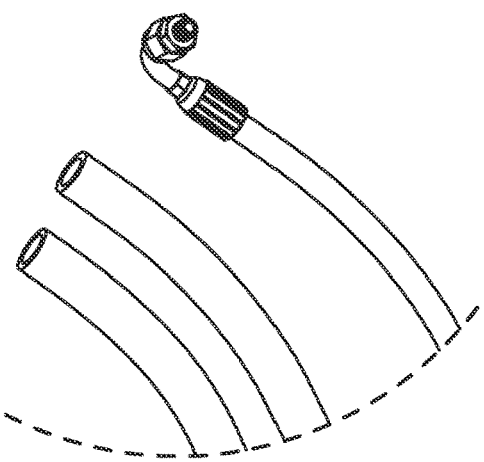
Figures 8, 8C, 9:
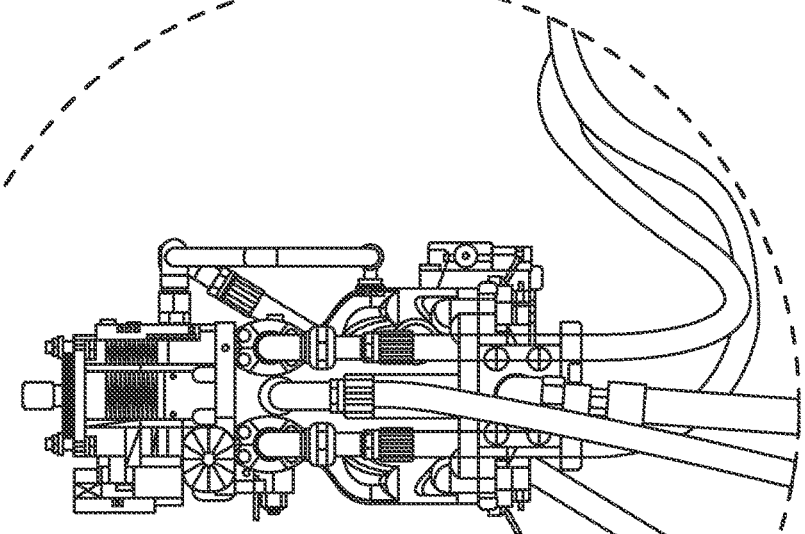
Figures 8, 8C, 9, 10:
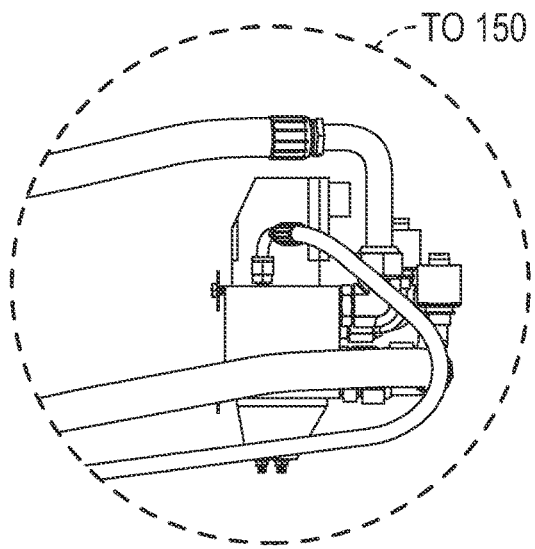
Figures 8, 8C, 9, 10, 11:
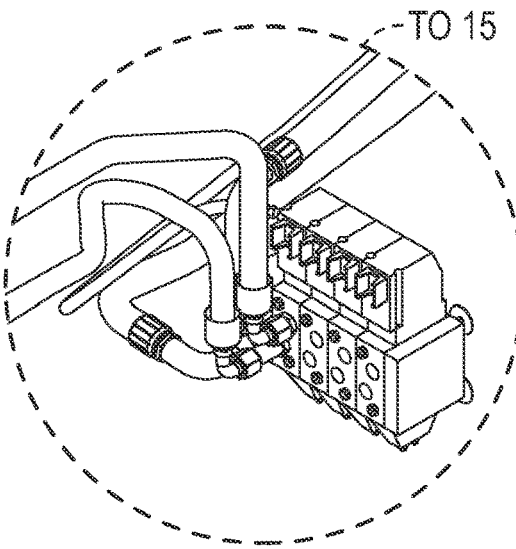
Figures 8, 8C, 9, 10, 11, 12:
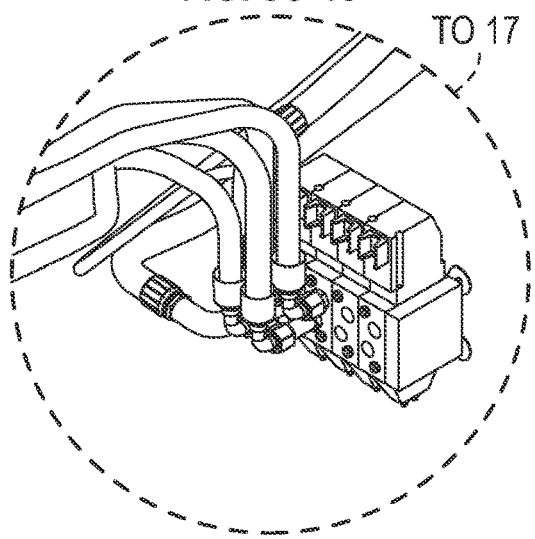
Figures 8, 8C, 9, 10, 11, 12, 13:
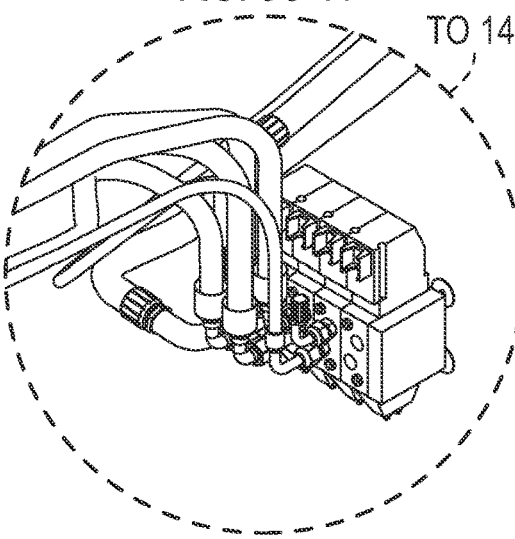
Figures 8, 8C, 9, 10, 11, 12, 13, 14:
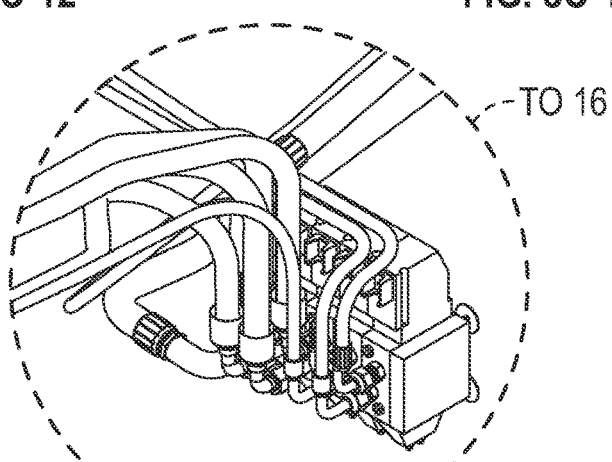

FIG. 13 is a state diagram of one example of the automated mode according to invention.

FIGS. 14A-D set forth high level system requirements and functionalities accomplished by the state diagram using the set-up of FIGS. 2-12 to make and use an exemplary embodiment of the invention.

FIGS. 15A-E and 164-1 to A-2, 16B and 16C are illustrative examples of communication protocols and programming that can be used to facilitate operation of an exemplary embodiment of the invention.

Pictures of Truck Dispensing Components Operation

FIG. 17A-F are pictures illustrating how bulk feed is moved from the bulk feed box to the ration delivery box according to one example of the invention.

FIGS. 18A-E are pictures illustrating how the door and spout of the ration delivery box are controlled to dispense feed from the vehicle according to one example of the invention.

Figure 19:
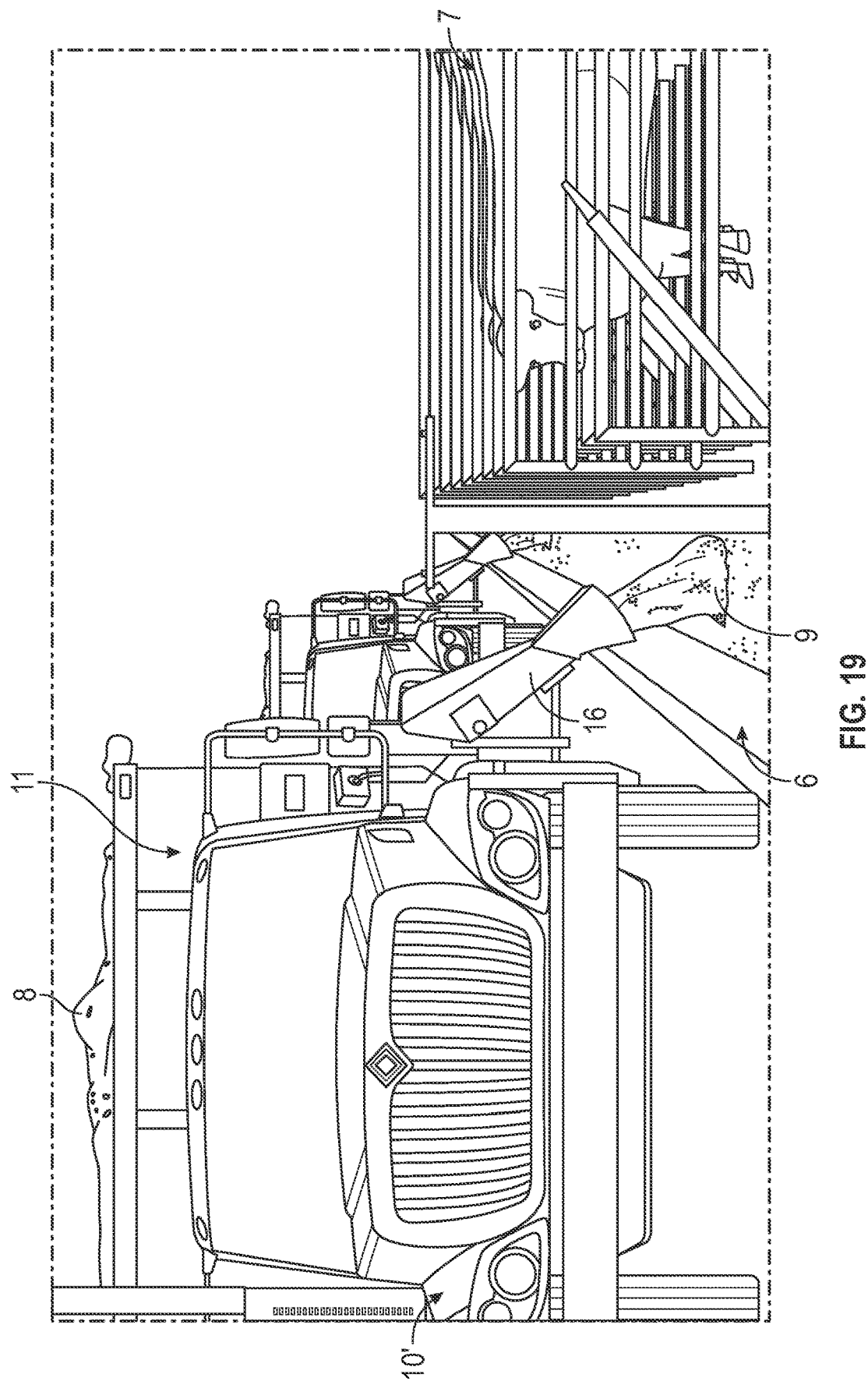

FIG. 19 is a picture of how a vehicle according to the invention would dispense feed to a bunk of a feedlot.

Optional Dual Discharge Feature

Figure 20:
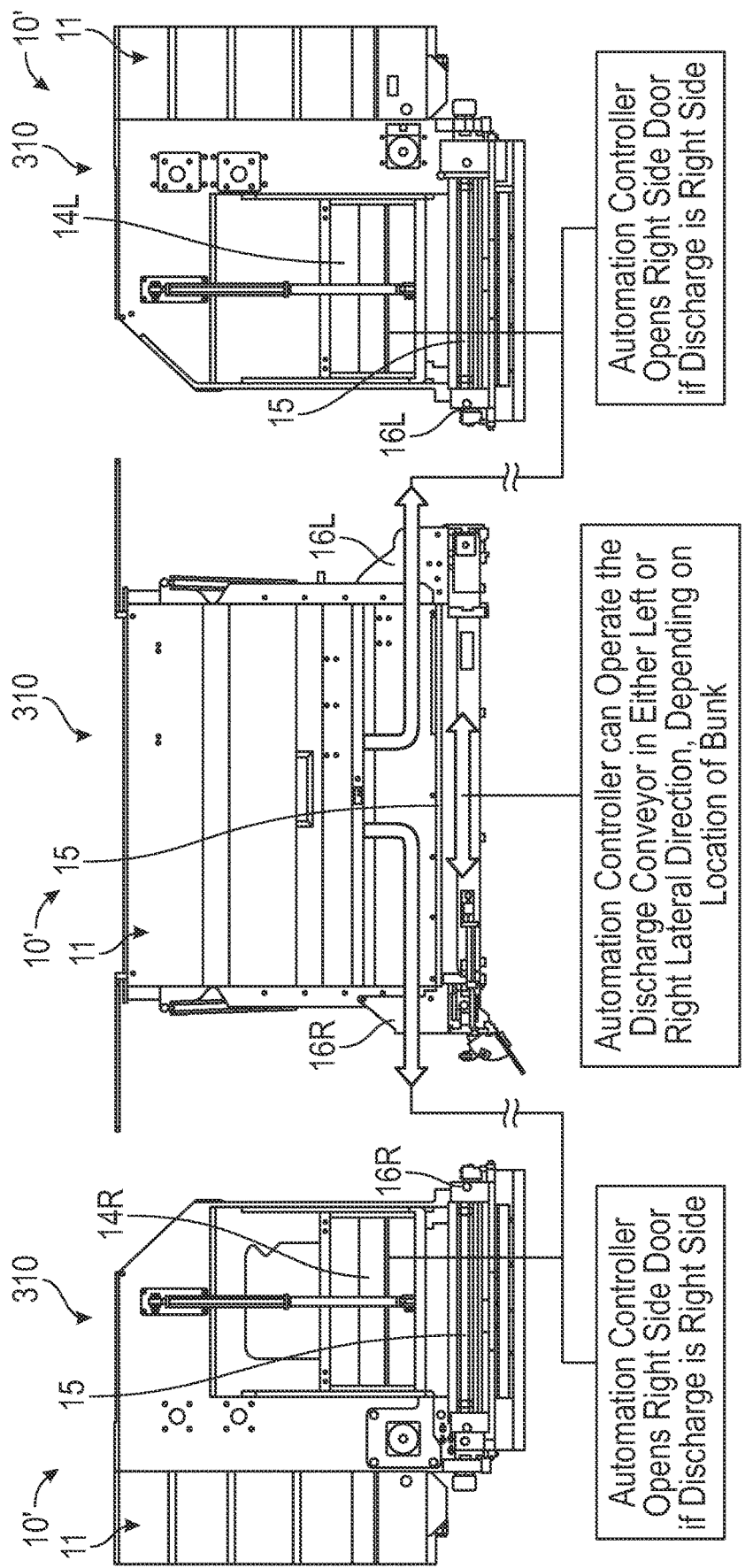

FIGS. 20A-C illustrate an optional feature, namely, one way to make and use the invention to dispense from opposite lateral sides of the vehicle.

Optional Partial Ration Feature

Figure 21:
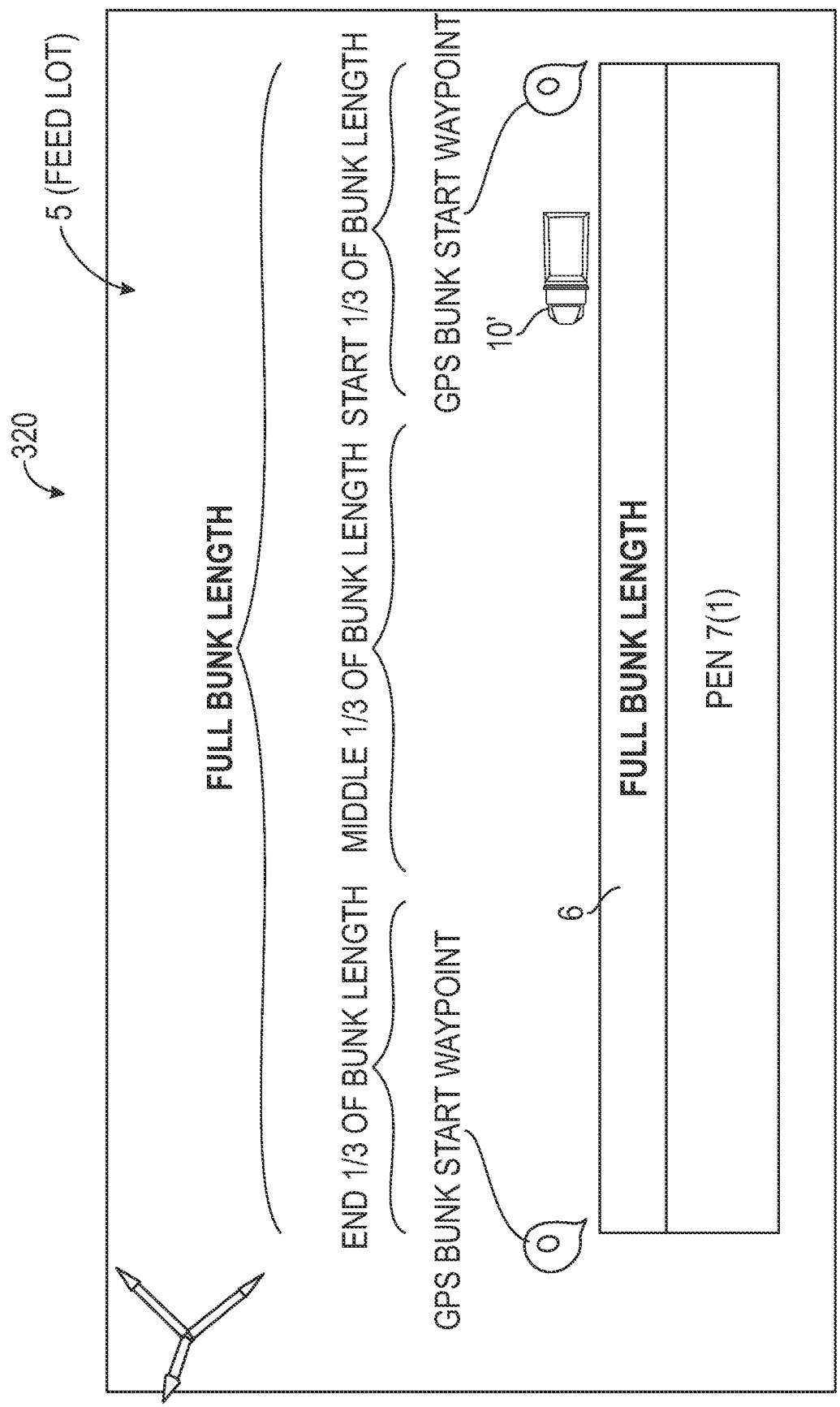

FIG. 21 illustrates an optional feature, namely the ability to automatically dispense a partial ration to a feed bunk.

Optional Telemetry Feature

Figure 22:
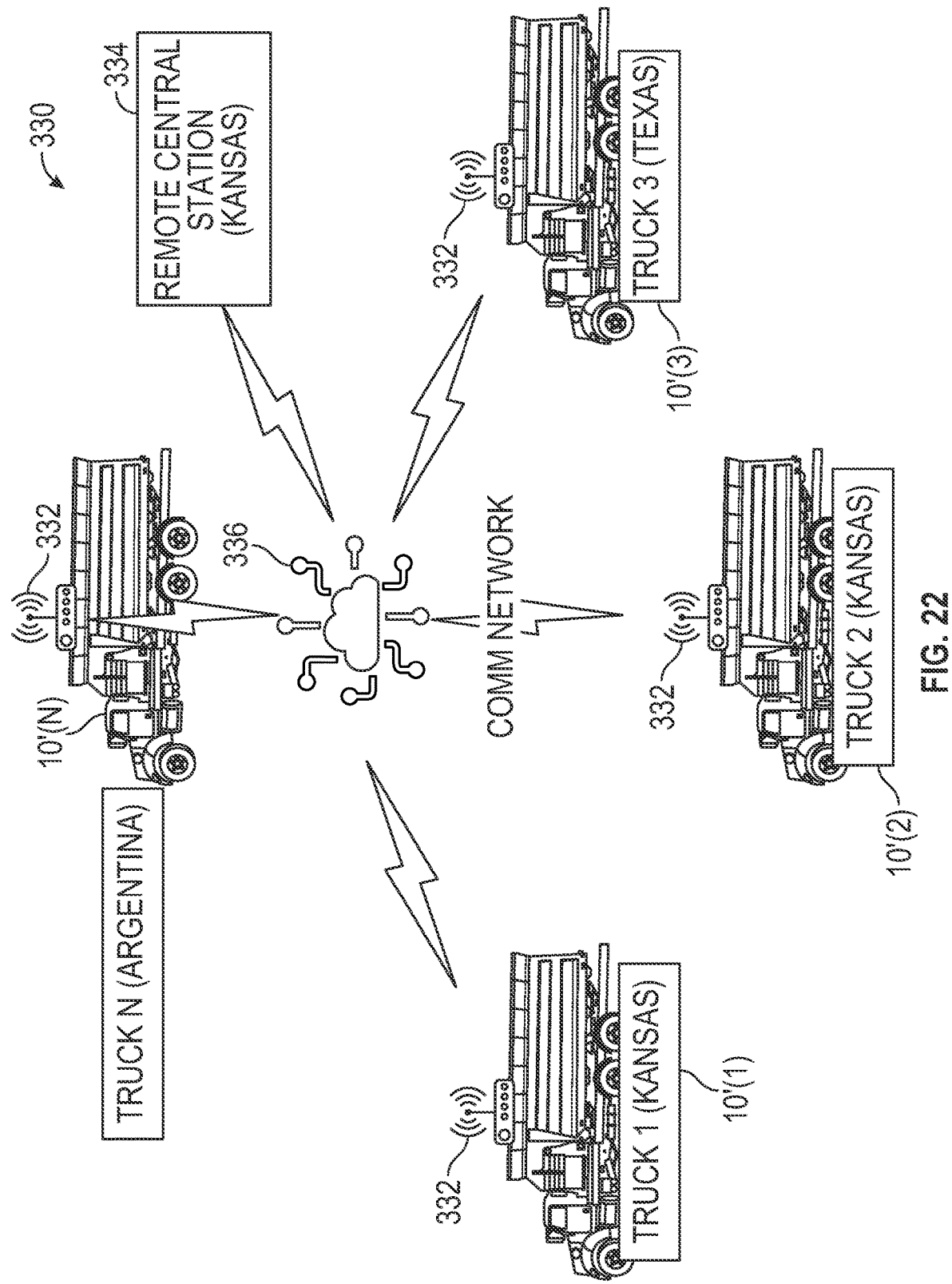

FIG. 22 illustrates diagrammatically an optional feature, the ability to communicate between a vehicle according, to the invention with one or more remote sites for purposes such as data acquisition and storage, or remote monitoring, diagnostics, or other functions for a fleet of vehicles around the world.

Optional Machine-Learning Feature

Figure 23:
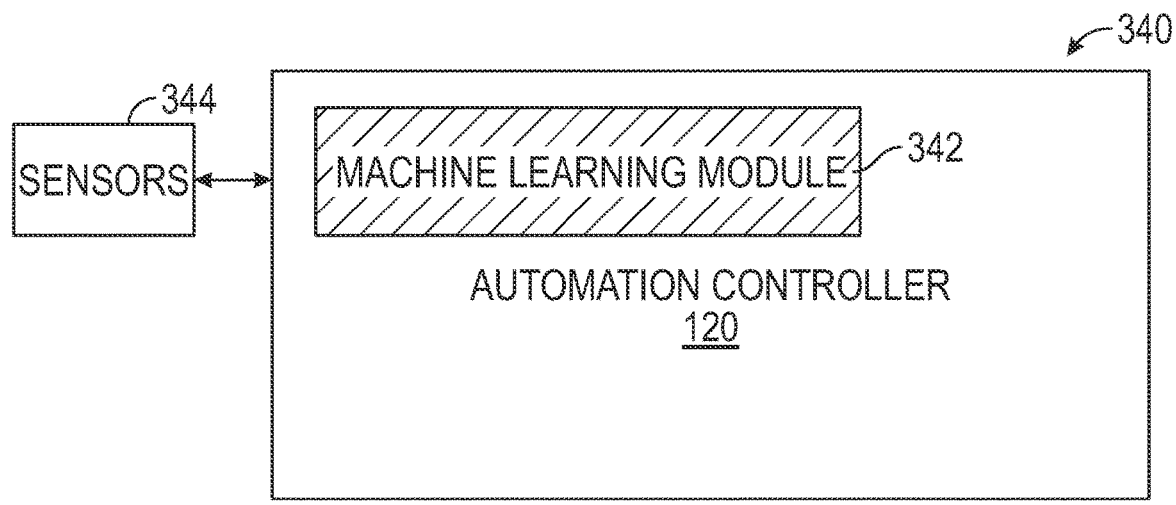

FIG. 23 illustrate diagrammatically an optional feature, namely, the ability to utilize machine learning techniques to optimize operation of a vehicle according to the invention.

Optional Fully Autonomous Feature

Figure 24:
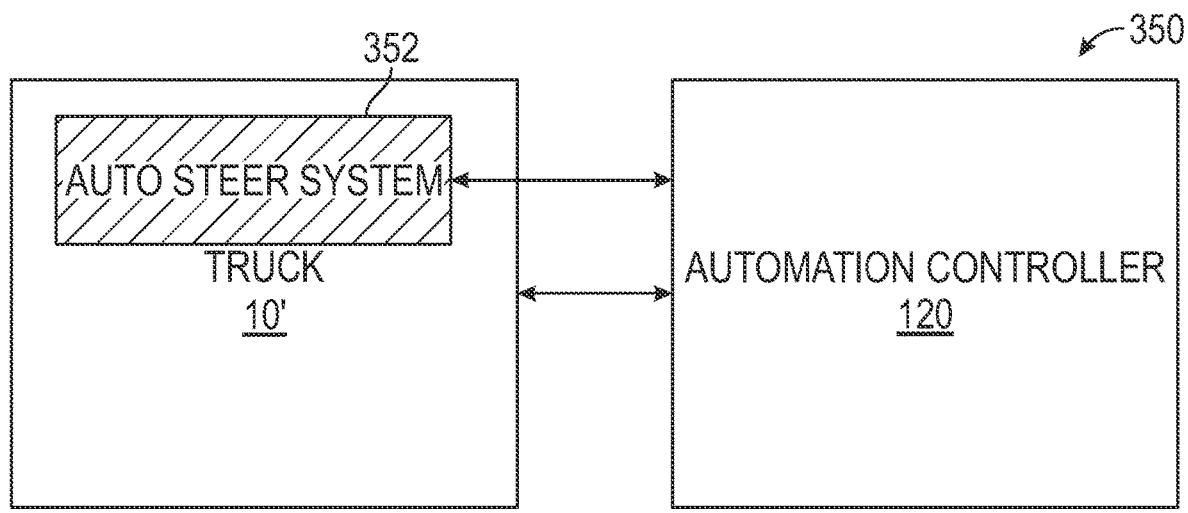

FIG. 24 illustrates diagrammatically an optional feature, namely, making a vehicle according to the invention fully autonomous.

Optional Discharge Door Control Feature

Figure 25:
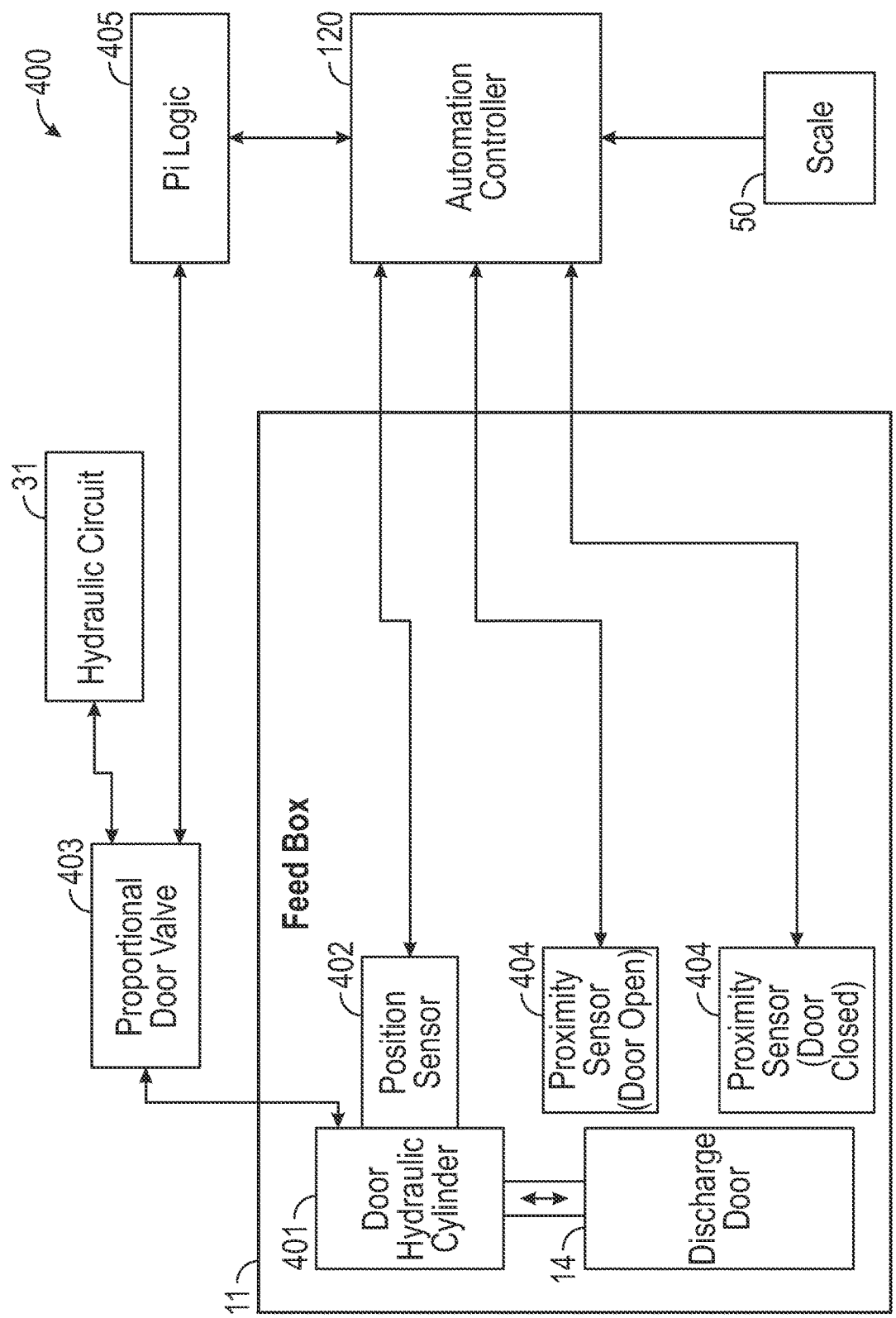

FIG. 25 illustrates diagrammatically an optional feature, namely, providing more accuracy in feed dispensing by monitoring position of the feed discharge door.

Optional Discharge Door Control Feature

Figure 26:
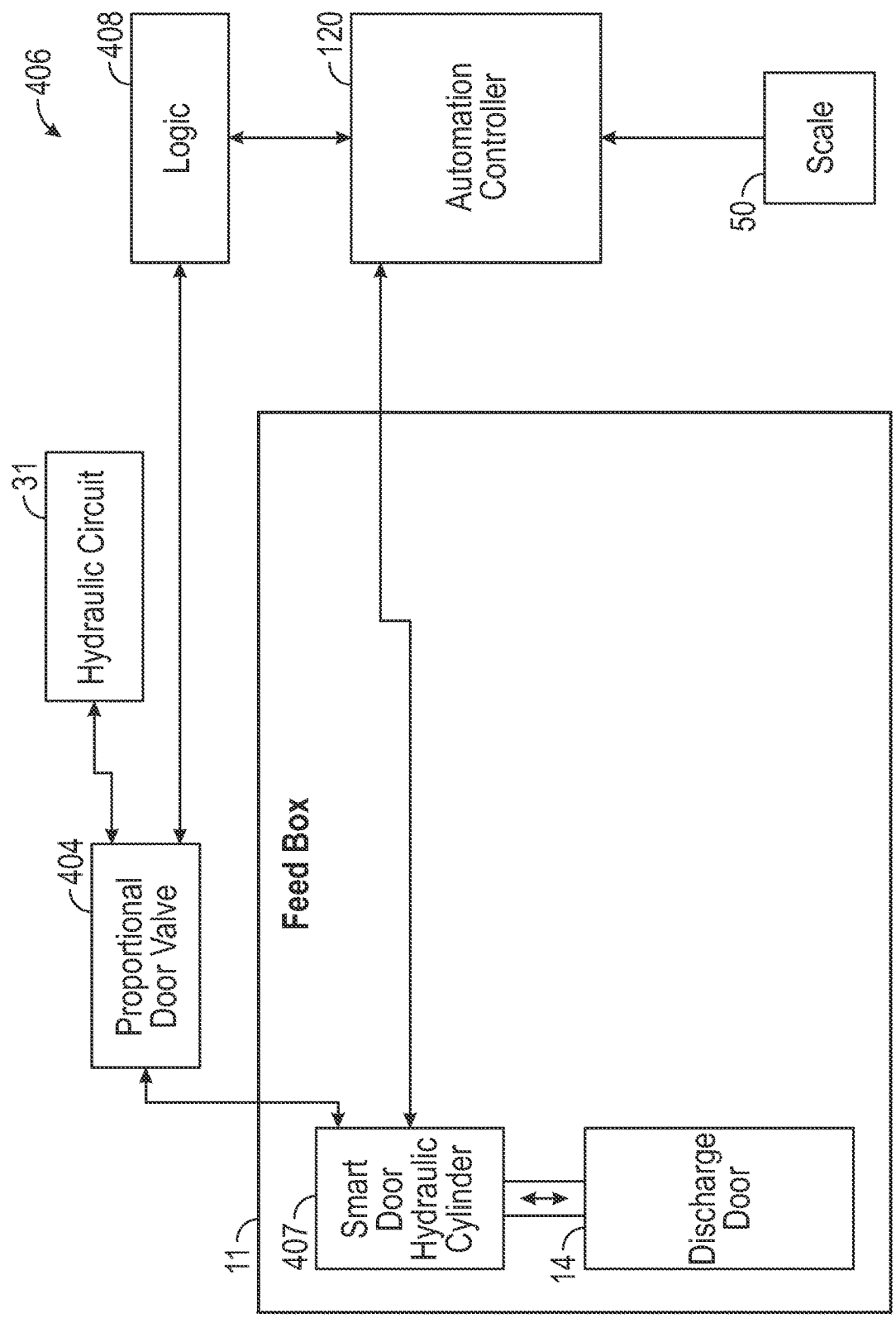

FIG. 26 illustrates diagrammatically an optional feature, namely, providing more accuracy in feed dispensing by using a smart hydraulic cylinder to control the feed dispensing door.

Optional Compensation for Potential Data Errors Because of Vehicle Travel

Figure 27:
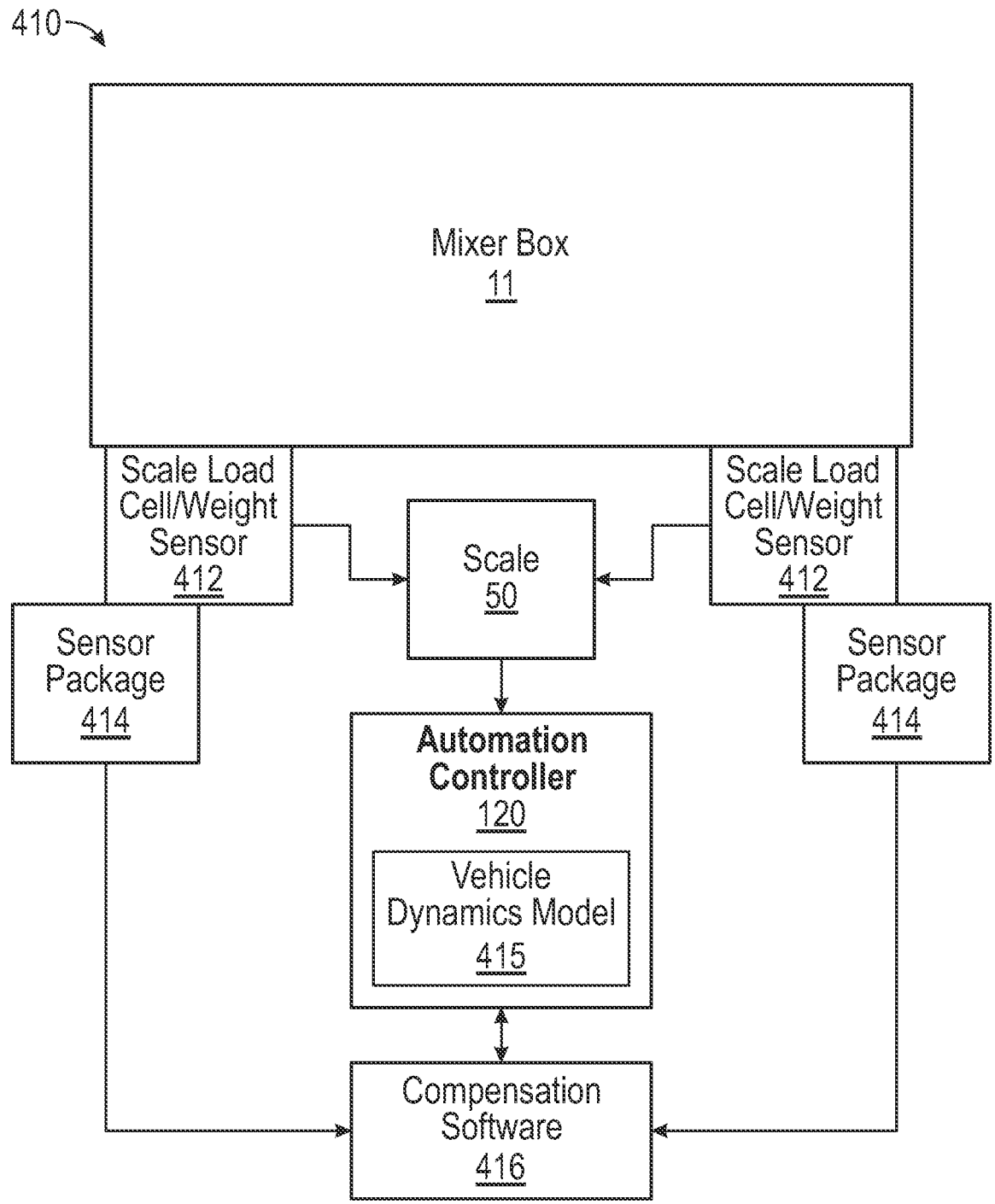

FIG. 27 illustrates diagrammatically an optional feature, namely, techniques to compensation for sensor measurement errors because of bouncing, vibration, or tilting of the vehicle while moving over the ground, especially rough or uneven ground.

Optional Conveyor Speed Monitoring Feature

Figure 28:
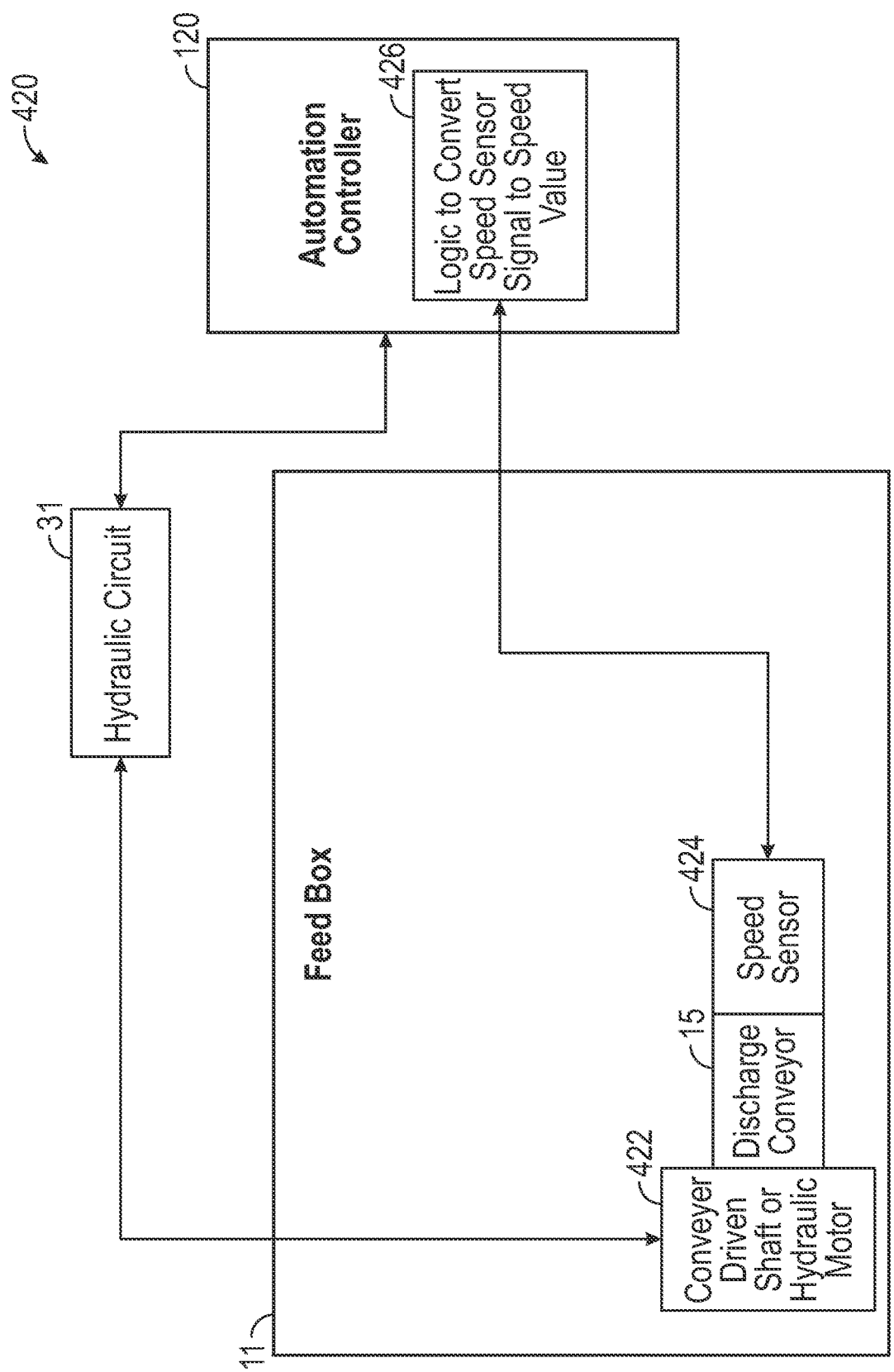

FIG. 28 illustrates diagrammatically an optional feature, namely, sensing discharge conveyor speed to help improve accuracy of dispensing rate.

Optional Additional Drive Display Feature

Figure 29:
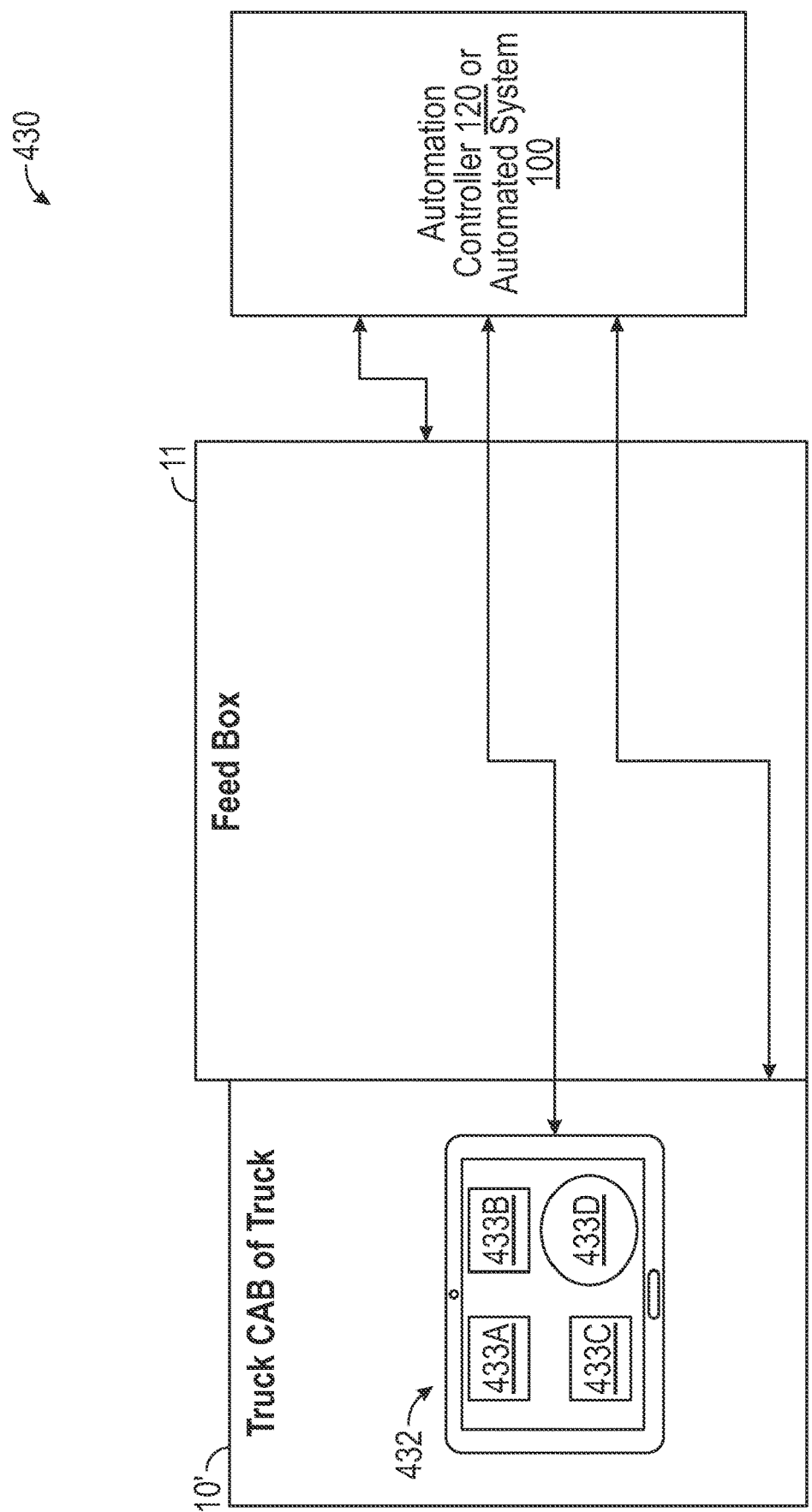

FIG. 29 illustrates diagrammatically an optional feature, namely, possible additional displays available to the driver to give more options to the driver.

Optional CAN Bus Feature

Figure 30:
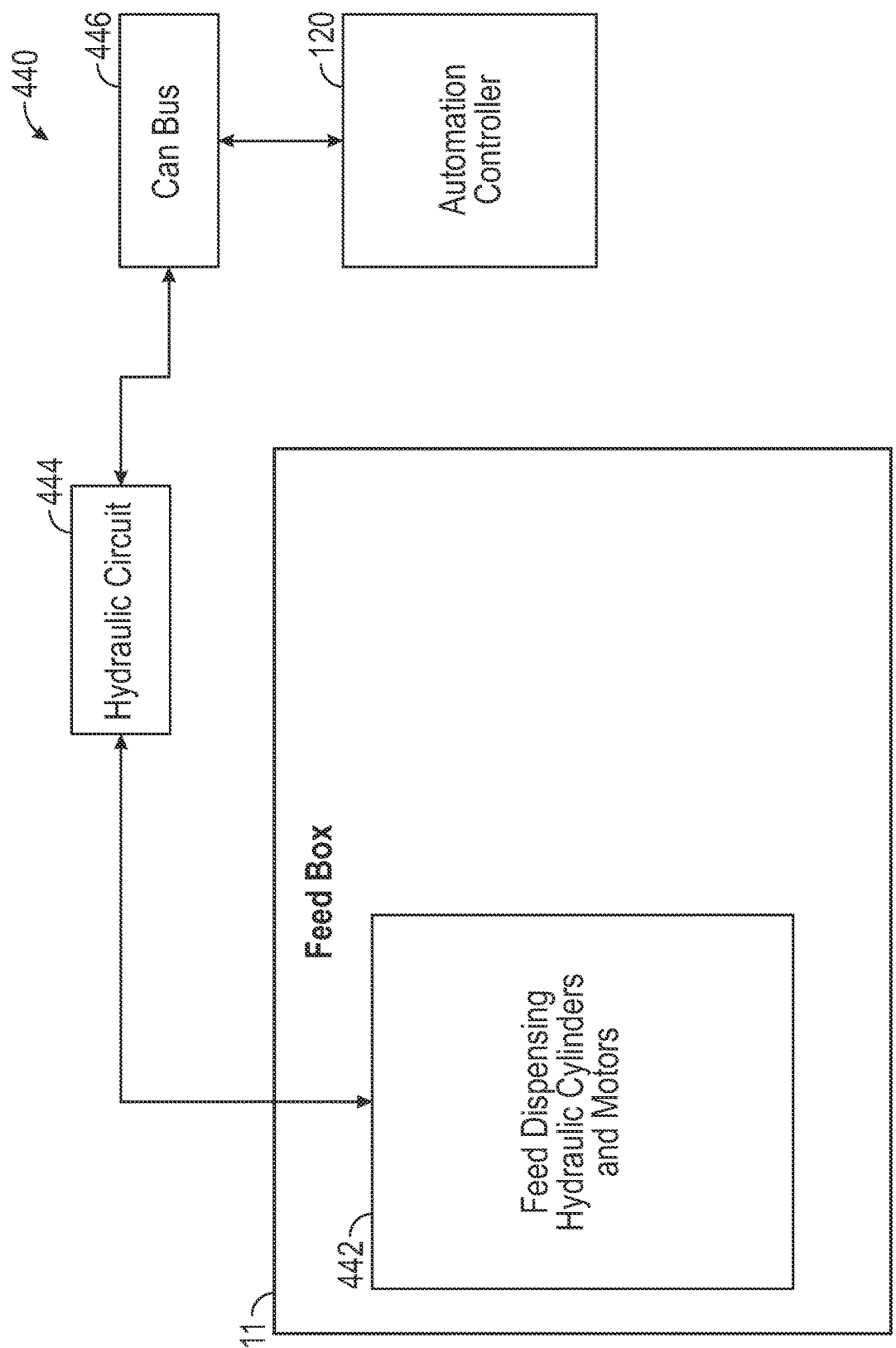

FIG. 30 illustrates diagrammatically an optional feature, namely, use of a CAN bus to simplify wiring and communication between system components.

4 DETAILED DESCRIPTION OF EXEMPLARY EMBODIMENTS ACCORDING TO THE INVENTION

For a better understanding of the invention and its aspects, the following will provide exemplary embodiments in detail. It is to be understood that the exemplary embodiments are neither inclusive nor exclusive of all forms and embodiments the invention and its aspects can take. For example, variations obvious to those skilled in this technical art will be included within the invention or its aspects.

These embodiments will be primarily described in the context of a feedlot for livestock such as cattle, with multiple feeding stations or bunks spaced apart in one or more areas of land, whether indoors or out of doors, with the spacing sufficient to allow a motorized feed delivery/dispensing vehicle to maneuver along. As will be appreciated by those skilled in this technical art, the invention and aspects of the invention can be applied in analogous ways to other bulk product dispensing vehicles or for other purposes.

These embodiments will, from time to time, mention specific vendors or manufacturers of sub-systems or components that can be used in the exemplary embodiments, but it is to be understood that alternative vendors or manufactures of such sub-systems or components with analogous functions can be substituted and used. This includes building in the sub-systems, components, or functionalities as original equipment into the vehicle.

4.1 General Embodiment 4.1.1 Overview

As stated above, the invention is an autonomous feed delivery system for evenly dispensing a specified amount of feed into a specified distance such as a feed bunk. This results in a concisely controlled rate of discharge per linear distance which is critical to achieving an even and accurate delivery of the specified amount of feed into the feed bunk.

One example of how such a system can be made and used will now be set forth with particular reference to the indicated drawings. It is to be understood by the reader that this is one non-limiting example. Variations obvious to those skilled in the art can be substituted or added according to the designer's need or desire for a given application.

The following description is provided to a reader that is skilled in this technical art. It provides details to make and use at least one embodiment of the invention. It is to be understood that the invention can take different forms and embodiments, as will be further discussed below.

In this exemplary embodiment, the focus relates to providing a motorized vehicle that carries a system that provides an at least almost entirely automated vehicle and feed discharge control for each feed bunk or drop location. A comparison of FIG. 1C (manual control) and FIG. 2C illustrates at a high level this feature. Sometimes referred to as automated mode, one way to make and use such a system is set out in the following description as follows:

> An example of a truck and feed dispenser and automated mode. FIGS. 2A-D show one example of a truck 10' and on-board dispensing system 100 and the relevant components of each that can be configured for automatic mode according to the invention, including an automation controller 120 and user interface 110.

An example of high-level architecture of automated mode integration into the truck and dispenser. FIGS. 3A-F provide diagrams of a specific implementation of an automatic mode system for the truck of FIGS. 2A-D, including interconnections of components for overall understanding of the exemplary embodiment. FIGS. 4A-D, 5A-D, and 6A-E provide additional details of one way to make the automated mode system, including controllers, inputs/outputs, and connections.

Specifics of feed box and ration delivery box. FIGS. 7A-1 to C-2 provide mechanical drawings of one example of a specific bulk feed box and belt to move on-board bulk feed to a ration delivery box.

FIGS. 7A- to D-2 provide one example of a specific ration delivery box, including side discharge door, spout, and conveyor.

Specifics of overall hydraulic system. FIGS. 8A to D-2 provide specifics about a hydraulic system that can be used in the embodiment.

Overall automated mode wiring. FIGS. 9A-1 to C-2 provide specifics about a wiring configuration for the embodiment.

Control and User Interface Boxes. FIGS. 1.04-C provide specifics about one way to fabricate a control box and user interface for the embodiment.

Load sense hydraulics feature. FIGS. 11A-C and 12A-B provide specifics about load sense hydraulics and ration delivery box interrupt features which can be integrated into the automated mode system.

Example of Automatic Mode State Diagram and programming features. FIGS. 13, 14A-D, 15A-F, and 16A-1 to C then give specific examples of the overall automated mode system design and functionalities that can implemented with the truck and dispensing sub-systems of FIGS. 2-12.

Illustrations showing operation of truck dispensing features. FIGS. 17A-F, 18A-D, and 19.

In this embodiment, the truck can be engaged by the driver to either the manual control mode of FIG. 1C if automatic mode of FIG. 2C is not desired, or to automatic mode of FIG. 2C.

4.1.2 the Truck and its Major Sub-Systems and Controls

In the examples of the invention, the motorized vehicle begins with the Roto-Mix Ration Delivery Box feed delivery truck 10' with, inter alia, feed box 11, floor belt and movable rear door 12, side discharge 13 with side door 14, side door conveyor 15, side spout 16, and beater 17, to move bulk feed 8 forward in box 11 and then dispense it out the side door and spout 14/16. See, e.g., FIGS. 2A and 2B. It includes the truck and feed dispensing features of FIGS. 1A-H. Note that sensors at ref. nos. 50 in FIG. 2B between the truck frame and box 11 allow sensing of weight of box 11 and any feed 8 in box 11, which allows estimation of how much feed 8 is in box 11 at any given time. The main differences between truck 10 of FIGS. 1A-G and truck 10' of FIGS. 2A-12 are as follows.

FIG. 2B illustrates that the feed box 11 is suspended or otherwise operably connected to a digital scale (see ref. nos. 50). A digital weight valve can be continuously available to the system from which, indirectly, the amount of a ration dispensed can be derived. This is a way to automatically inform the system as to how much of each ration is dispensed. Mechanical limit switches 141 and 142 (see FIGS. 9A-C) at the front and back of the bulk feed box 11 are tripped with the belt 12 that moves bulk feed 8 forward by pulling rear door 12 to the side discharge inform system 100 when the rear door 12 is either fully hack or fully forward. This allows the system to know if it has a full load of bulk feed, or it needs replenishing.

FIGS. 2A-D illustrate that this truck 10' includes a hydraulic sub-system with appropriate hydraulic motors, valving, and connections (see especially FIG. 2C, as well as FIGS. 8A-C. The truck PTO 22 powers a hydrostatic pump 30 which provides hydraulic pressure to the hydraulic circuit 31 and motors or cylinders for moving bulk feed box belt and rear door 12, side discharge conveyor 15, discharge door 14, beater 17, and discharge spout 16.

FIG. 2C shows how the truck 10' of FIGS. 2A-B can be set-up according to one non-limiting exemplary embodiment of the present invention. Differences from that of FIG. 1C are highlighted in FIG. 2C at the box 100 entitled "Automated Delivery System". FIG. 2D illustrates the numerous components that are referenced in other drawings that can be involved in the automated mode of the embodiment. This can optionally include a dispense interrupt load cell and controller sub-system 152, 153, and 154 that can monitor and interrupt dispensing in certain sensed conditions, as will be explained further below. As can be seen in FIG. 2D, the automated control according to aspects of the present invention requires a technical solution to balancing a number of factors and operating a number of different components in a coordinated fashion for effective accurate and reliable at least substantially autonomous control of feed rationing.

Several integrated Rib-systems will control the functions of the truck 10' and the delivery unit to disperse a predetermined amount or ration 9 of feed 8 into the bunk line 6 of a designated pen 7 of cattle or other livestock. The system 100 will also positively identify that the feed ration 9 is delivered to the specified pen 7. The system 100 will control at least the following functions of the truck 10' (throttle 26 position, engine 20 rpm, PTO 22 engagement, vehicle 10' speed). The system 100 will also control the following functions of the delivery unit 11 (hydraulic pump 30 operation, discharge door 14 position, conveyor belt/rear door 12 speed and movement, discharge conveyor 15 speed and movement). Vehicle control can be extended to braking 27/28, transmission 24, and even steering (see FIG. 24).

The driver 60 will be responsible for positioning the truck 10' at the starting point of the hunk 6 for the specified pen 7, then the system 100 can be activated ("START" button on user interface 110 pushed by driver 60, see FIGS. 10A and 10C) to begin the feeding process. When the process begins, the driver 60 will only need to steer the truck 10' along the bunk line 6. If needed in an emergency situation the driver 60 can immediately stop the truck ("STOP" button on user interface 110, FIGS. 10A and 10C) which will terminate the feeding process. The system WO would then have to be restarted to complete the feeding process for that pen or bunk. In order to precisely position the truck, the feed yard facility will be GPS mapped to identify the beginning and ending coordinates of each pen or bunk. See, e.g., FIG. 1F). The system 100, in this example, will only activate if the truck 10' is positioned within these defined parameters by controller 120 comparing present geolocation of truck 10' relative to knowledge of geolocation of each pen or bunk. This is another fail-safe to prevent inadvertent loss of feed.

This exemplary embodiment of the system 100 according to the invention will interact with several existing subsystems contained on the vehicle:

Electronic Control Modules or Units (ECM(s) or ECU(s)) 29 for the Truck Systems and Engine (Kenworth and International trucks with Cummins engines are non-limiting examples). Operative connection to automated delivery system 100 allows system 100 to control operation of various operating parameters of truck 10' by sending instructions to ECU(s) 29.

Bunk Feeding System Computer 40 (Micro Beef, including ACCU-TRAC® or Animal Health International are the non-limiting examples). Operative connection to automated delivery system 100 allows system 100 to obtain geolocation information of pens 7 and bunks 6, as well as prescribed feed ration 9 for each.

Electronic Scale Systems 50 (TopCon Digi-Star and Precision Feeding Suite is an example, available from Digi Star for Fort Atkinson, Wisconsin, USA). Operative connection to automated delivery system 100 allows system 100 to obtain weight information that can be used to derive available estimated feed in box 11 and also other estimates, such as to confirm whether an accurate ration has been dispensed (by comparing weight of box 11 before the ration is dispensed to weight of box 11 after the ration is dispensed.

Roto-Mix Delivery Unit Control 40, available from Roto-Mix of Dodge City, KS (USA). Operative connection to automated delivery system 100 allows system 100 to then control operation of various operating parameters of the dispensing components on feed box 11 of truck 10' by sending instructions to the hydraulic subsystem that operates them individually.

4.1.3 How to Make

As will be appreciated by those skilled in the technical art, the functionalities of the exemplary embodiment can be accomplished in different ways. To assist the reader with further understanding, details about one non-limiting way is now set forth.

4.1.3.1 the Automated Mode Set-Up for the Truck

Figure 3A:
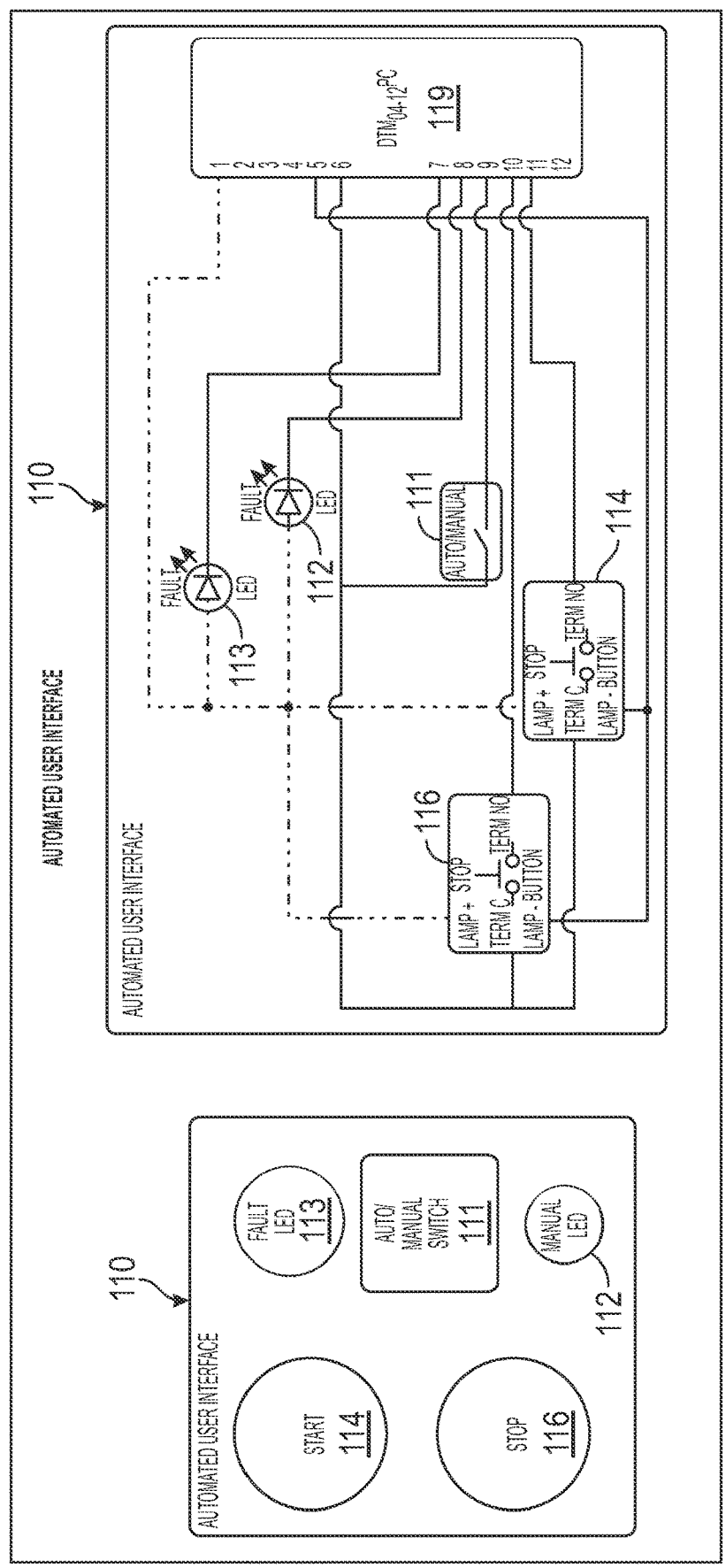

FIG. 3A illustrates one example of a user control 110 for the driver of the truck 10' of the invention. As indicated, this cab-mounted box (see, e.g., FIGS. 10A and 10C, which give one non-limiting example of possible dimensions to show it can easily and non-obtrusively mounted in the truck cab and easily reached and viewed by the driver) is straight-forward and clear about what the driver can control and what is automated. The driver can manually select with a toggle switch 111 between "manual" and "auto" modes. If "manual" is selected, an indicator light 112 illuminates to alert the driver. If "auto" is selected, the driver merely has to manually depress the "START" push button 114 to put truck 10' into the at least substantially autonomous feed dispensing mode. The automation controller 120 (see, e.g., FIG. 3C) takes over most operating parameters of truck 10' and the feed dispensing components of feed box 11. As mentioned earlier, user interface 110 also allows the driver to manually interrupt "auto" mode by depressing the "STOP" push button 116 if needed or desired. The "auto" mode can be resumed by again pushing "START" 114. This straight-forward and non-complex user interface 110 further contributes to not only deterrence of human error but also provides flexibility of using either "manual" or "auto" modes, and the safety aspect of ability to use the "STOP" button once in "auto" mode. A fault light 113 can be included on interface box 110 to alert the driver if any malfunction or fault condition is sensed by automation controller 120. As indicated in FIG. 3A, an electrical connector 119 can be configured to allow easy electrical connection of user interface 110 to automation controller 120.

The driver drives the truck 10' to what the driver believes is a feed dispensing position relative a feed bunk. The driver has one-button 114 "start" to begin feeding. The pre-stored feedlot map (e.g. from ACCU-TRAC®) is accessed by the system 100. If the truck 10' is correctly placed per the map's bunk ID, pushing "START" 114 begins automated feed dispensing of a ration per the bunk ID. This includes movement of the truck 10' along the bunk, control of engine, and control of hydraulics.

Importantly, there are fail-safes and overrides. As indicated in FIG. 3A, at any time the driver could push "STOP" 116 to discontinue automated operation. This could be the result of a "fault" indication light 113 on the interface. There could be some other indication to stop automated dispension. In this example, the driver could also decline to start automated dispensing and simply rely on manual control by selected "manual" with toggle switch 111 (e.g. like that of FIG. 1C).

FIGS. 3B-F illustrates diagrammatically one way in which the components and sub-systems can be selected and inter-connected to effectuate automated mode of operation. As will be appreciated by those skilled in the art, the automation controller 120 (a commercially-available programmable digital controller, one non-limiting example is GCM80 family of controllers, including model numbers GCM-5607B-080-1901, 1903, or 2001 from New Eagle of Ann Arbor, Michigan, USA, 48108) is operatively connected to the digital scale 50 of the feed box 11, sensors associated with operation of the feed deliver belt/door 12 and discharge components 13-17, and the truck operation, as well as the user control interface 110. One or more connections 81 to communication buses (e.g. CAN bus) is also possible. This can allow a number of additional features. These figures also include additional details. Examples are how different wiring combinations (e.g. splice A or B of FIGS. 3D and E) can be selected for use in the automation controller 120 (FIG. 3C), as well as one way of connecting to the vehicle functions (e.g. via a pedal emulator 126 and the vehicles electronic control module or unit 29 (EMU)). See also information at https://wiki.neweagle.net index.php?title=Controllers, which includes information about the programmable controllers and components (one non-limiting-example) indicated in the FIGS. 3-6, including inputs and outputs to the controller 120, and the website also includes information about hydraulic control modules (HCM) model HCM-563-48 (HCM48), engine control modules (ECM) model ECM-563-48 (ECM48) or ECM-5554-112 (ECM112), and DBW PWM to Analog Pedal Emulator model numbers PWM-DBW-024-2201 or PWM-DBW-024-2002, all from New Eagle, that can be used with the GCM80 controller. In combination with the other drawings, the automation controller and its interconnection and operation for one exemplary embodiment, can be understood by one skilled in the art.

Figure 3B:
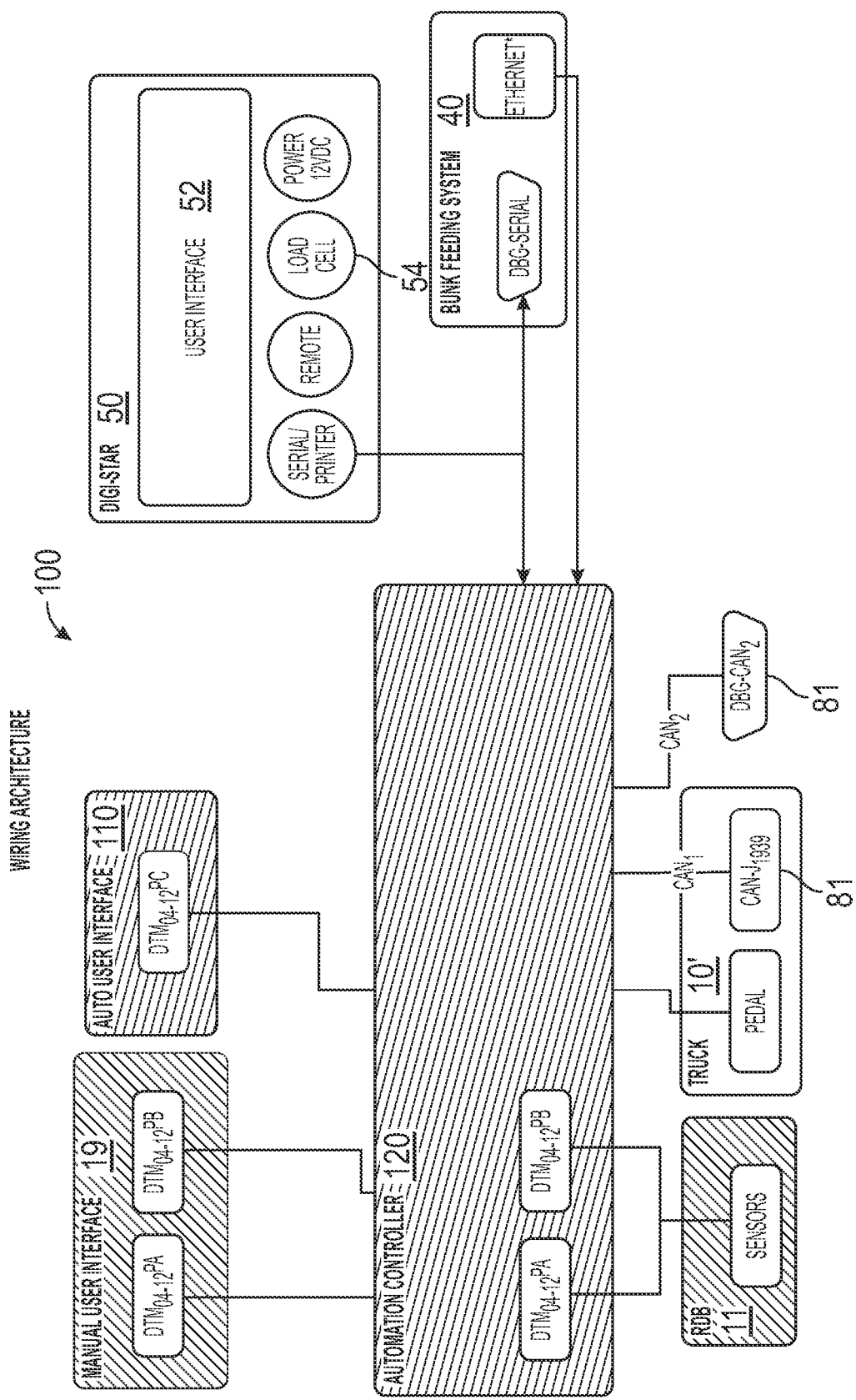

FIG. 3B illustrates how the auto user interface 110 and automation controller 120 of the automation system 100 according to this embodiment of the invention can be operatively electrically connected to other components of truck 10'. By appropriate electrical connector 119, auto interface controller 110 can be connected to automation controller 120. Likewise can manual user interface 19. Likewise can digital scale 50, which in this example includes a load cell 54 which is calibrated to generate an electrical signal proportional to the force it experiences from the weight of box 11 on it, or otherwise be able to derive estimated weight. Digital scale 50 can also include a display or user interface 52 dedicated to its operation. The bunk feeding system 40 is also operatively electrically connected to automation controller to allow controller 120 to instruct operation in a coordinated by individual manner of the dispensing components on feed box 11.

Figure 3C:
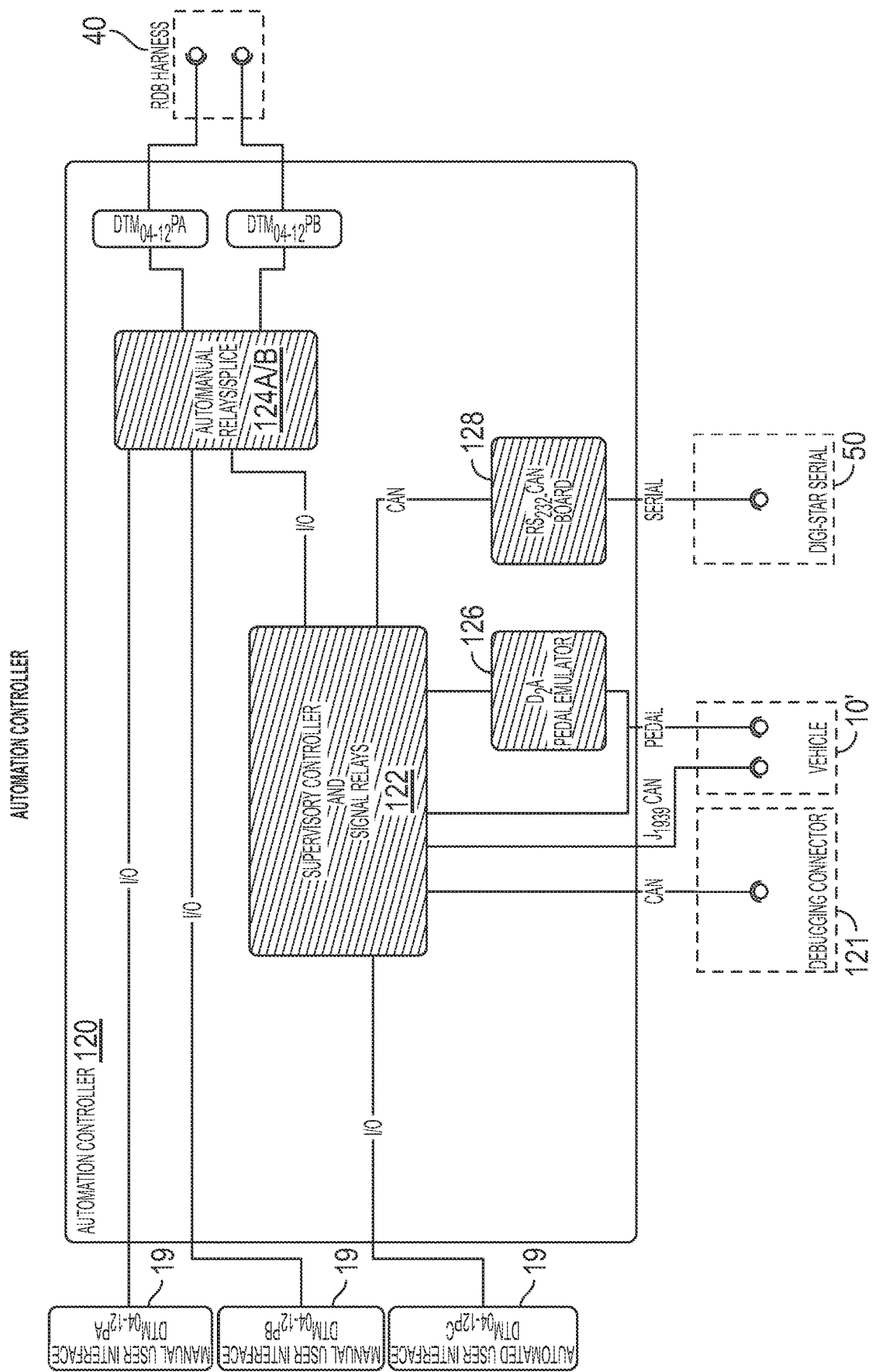

Still further, FIG. 3B illustrates that appropriate operative electrical connections are made to at least the acceleration pedal 27 of truck 10'. As indicated at FIG. 3C, automation controller 120 can include a pedal emulator 126 that can communicate instructions to truck 10' that adjust the engine 20 speed and/or the actual traveling speed of truck 10' along the ground. This can be through the ECU 29 or otherwise, such as is well known to those skilled in this technical art. As discussed herein, this allows for at least several benefits to system 100. One is that the ground speed of truck 10' can be automatically controlled in correlation with the dispensing prescription for any given bunk 6. For example, increased truck ground speed can speed up the delivery of the ration for time efficiency. And with increased truck ground speed, controller 120 then computes side discharge conveyor 15 speed, door 14 opening size, beater 17 speed, and spout 16 position, along with speed of rear door/belt 12; all to regulate the amount of bulk feed 8 supplied per linear foot of bunk 6, matched to truck 10' ground speed, to deliver the whole ration as uniformly as possible along the bunk 6 between its end points. As will be appreciated by those skilled in the art, the controller 120 can quickly compute these things and adjust, as needed, any one or more of those things, to match the prescription for a given bunk 6. This includes quickly changing ground speed and/or any of the dispensing components' speeds or positions. For example, higher ground speed might require higher side discharge conveyor 15 speed and/or larger side discharge door 14 opening and/or higher belt/rear door 12 speed than for lower truck ground speeds. As indicated, controller 120 is also operatively connected to digital scale 50 and can use real-time scale 50 readings to cross-check whether the correct prescription is being applied. The CAN bus connections 81 shown in the drawings are one non-limiting way and protocol for electrical communication between components, and have benefits such as are well-known to those skilled in this technical art.

FIG. 3C also indicates that this configuration of automation controller 120 can include a supervisor controller and signal relays 122, auto/manual relays/splice 124A and B, and pedal emulator 126 and RS-232-CAN board 128. This illustrates how controller 120 can communicate with the various other components of truck 10'.

Figure 3D:
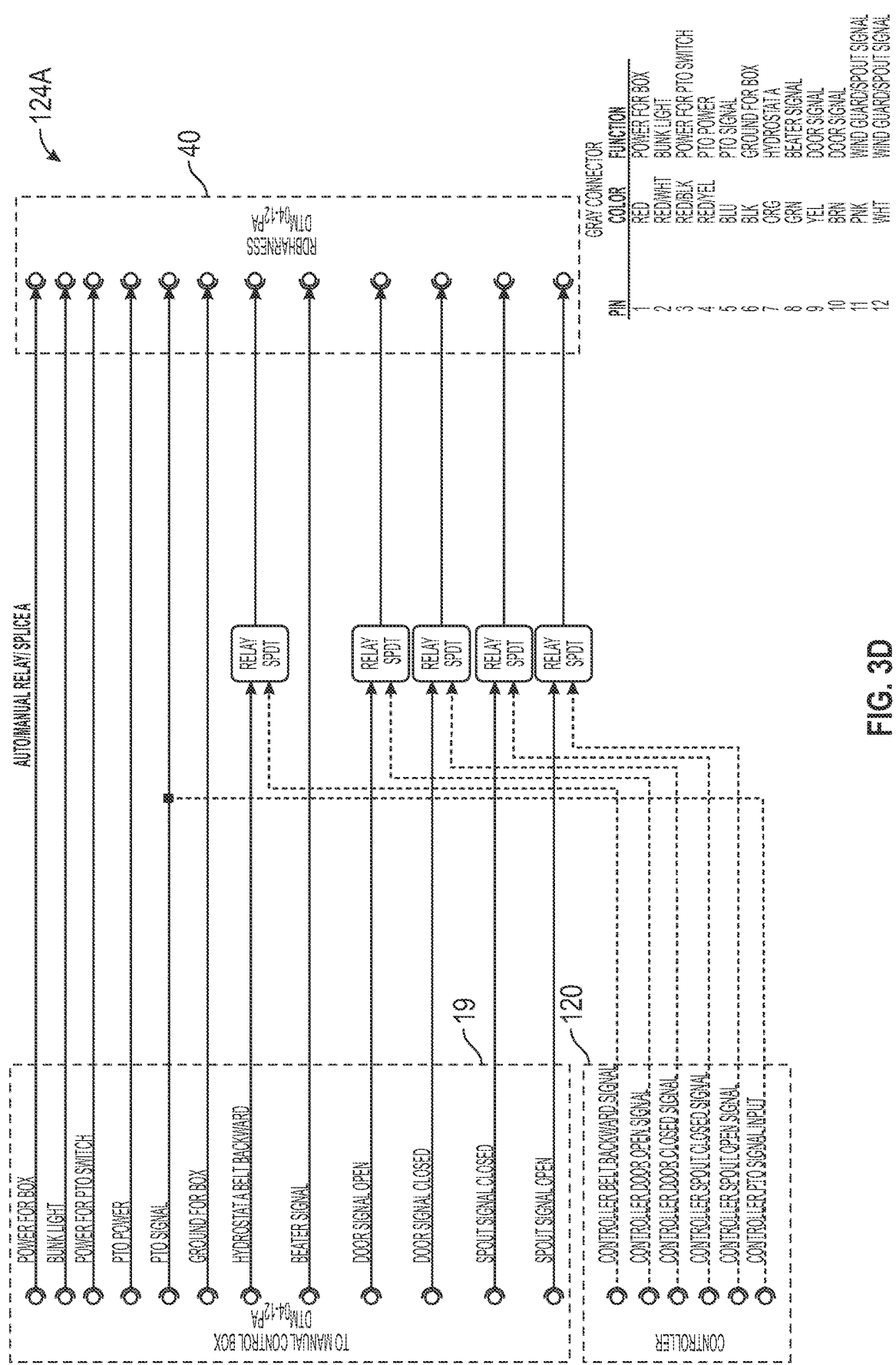
Figure 3E:
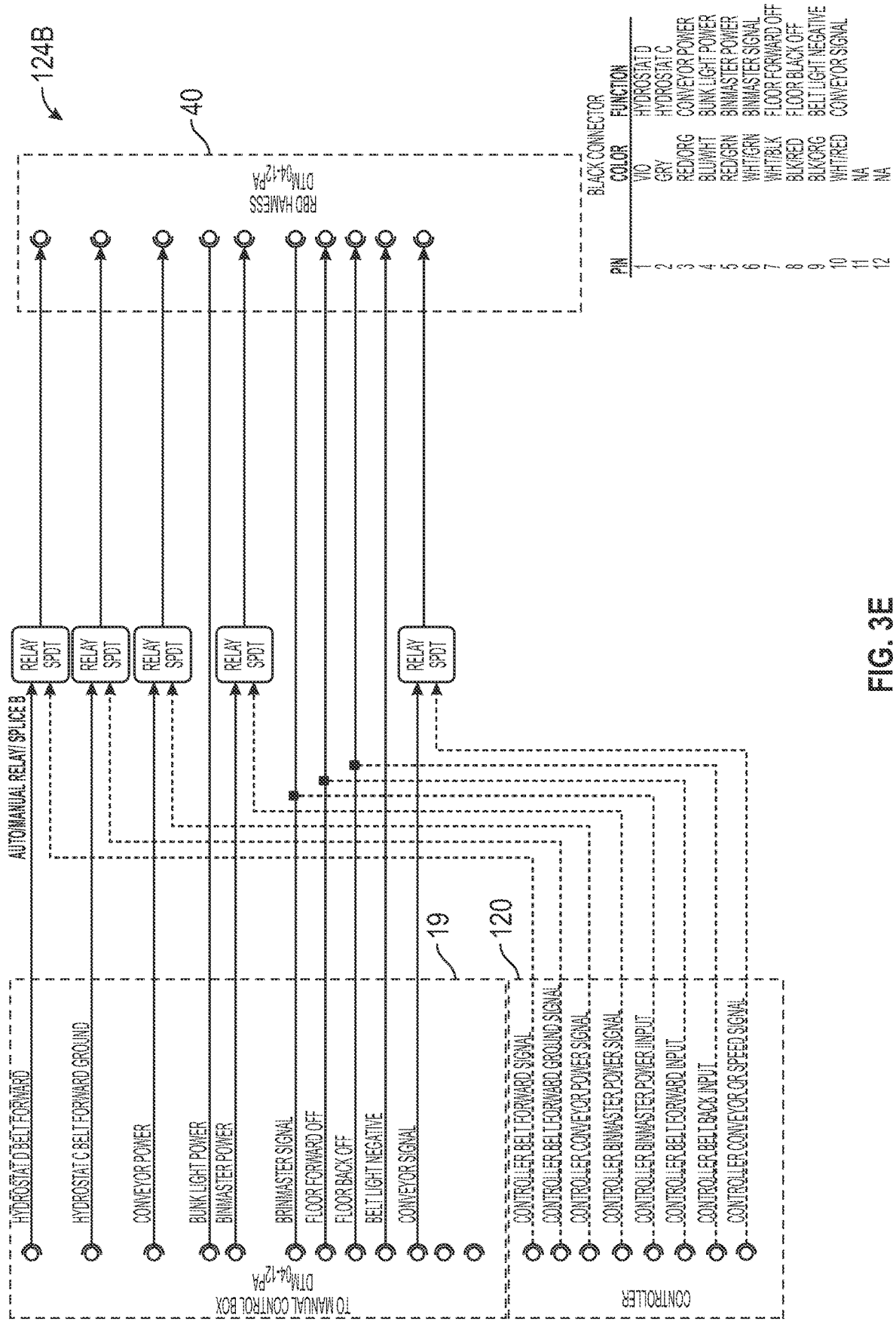

FIGS. 3D and 3E show how auto/manual/relay/splices 124A and B of FIG. 3C are configured in this non-limiting example to communicate controller 120 to the various other components.

Figure 3F:
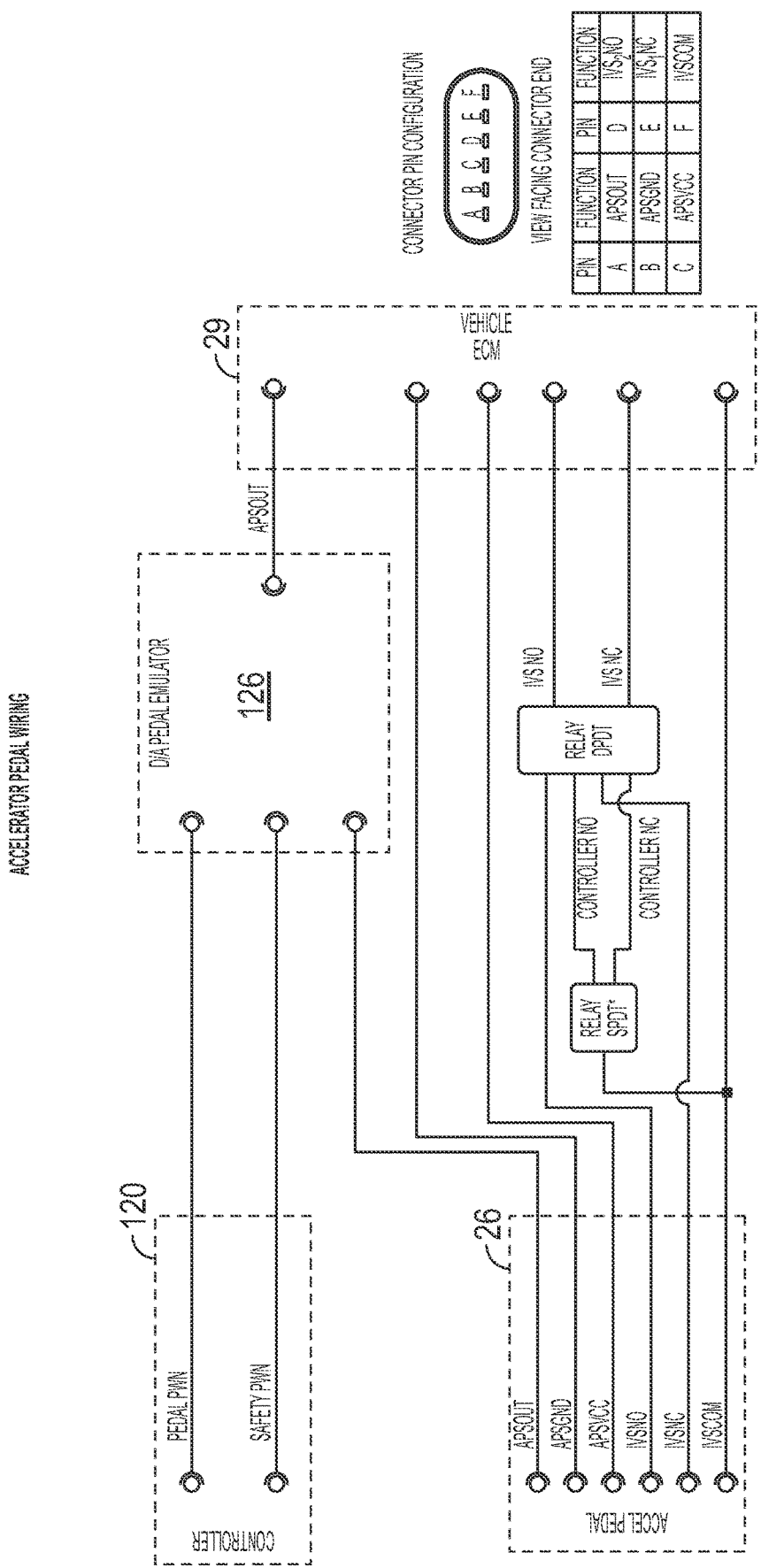
Figure 4A:
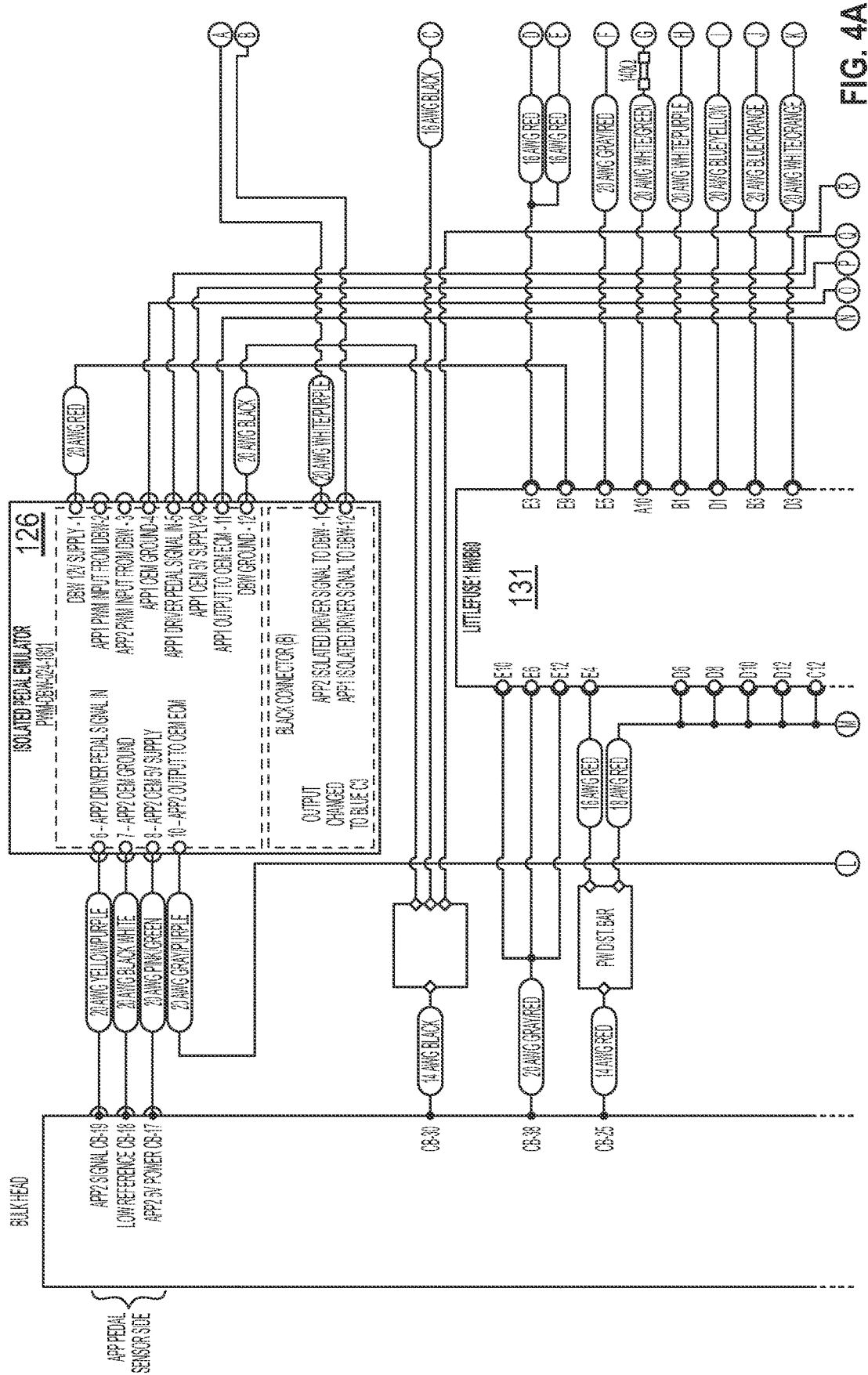
Figure 4B:
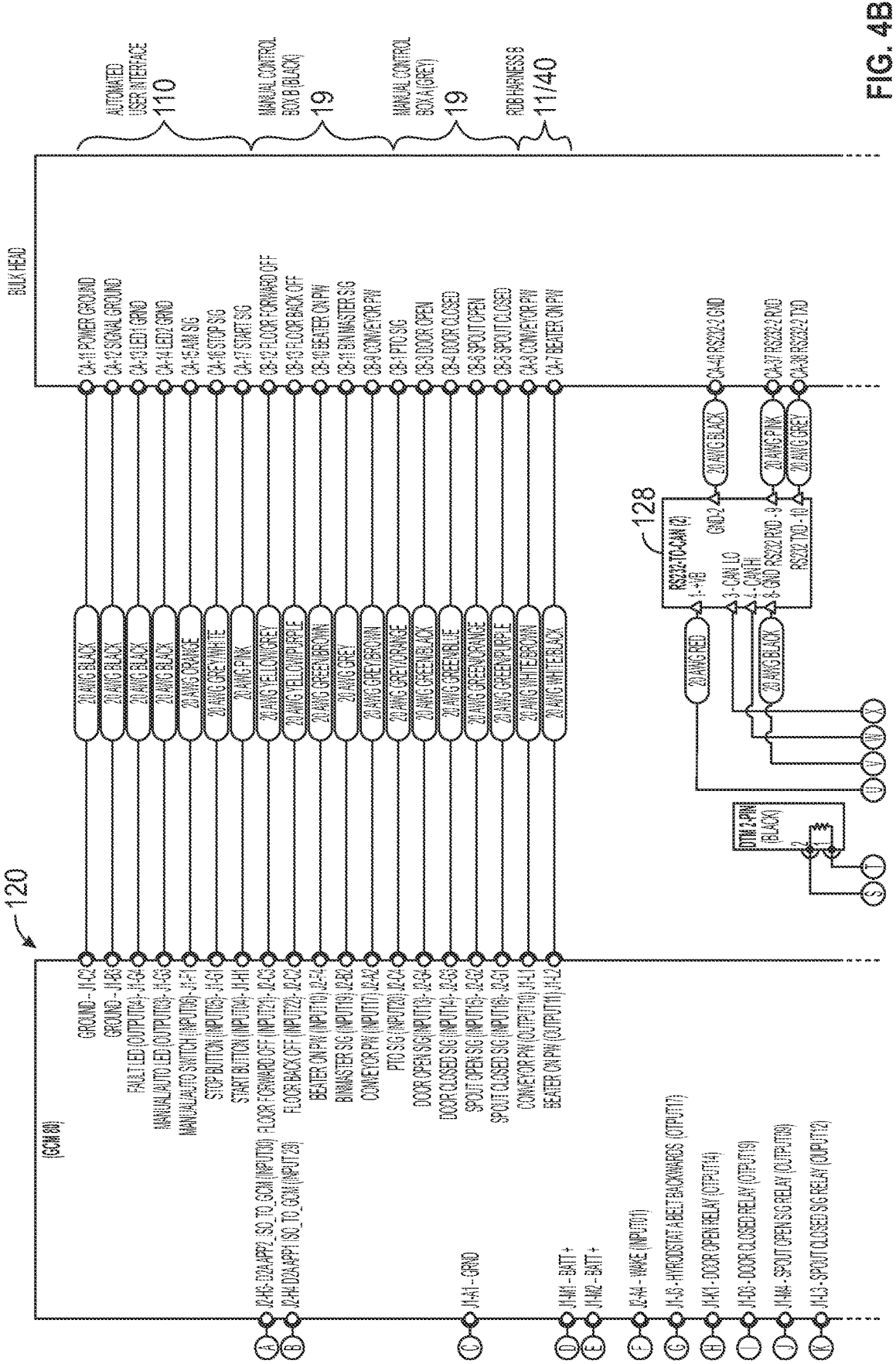
Figure 4C:
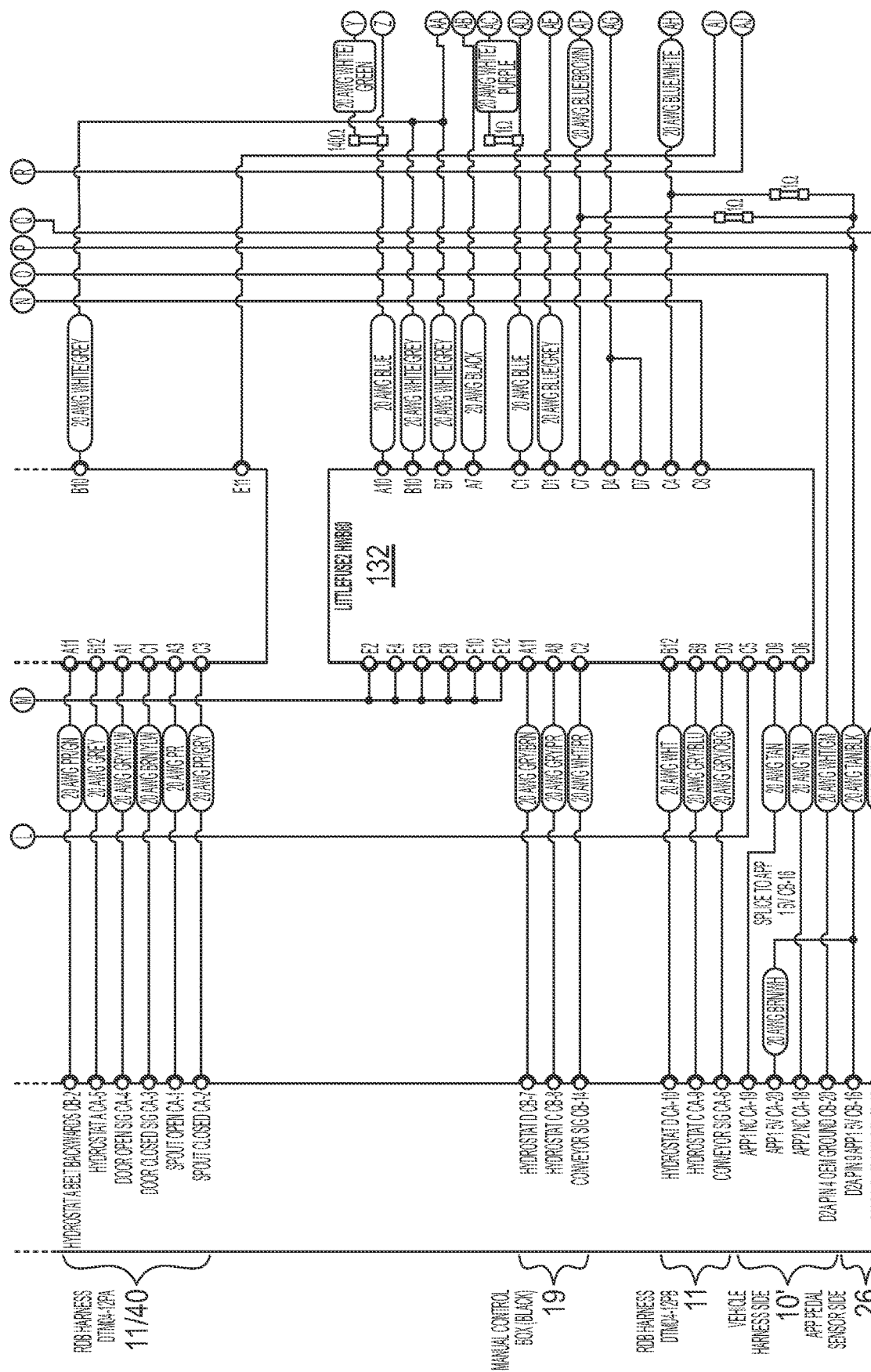
Figure 4D:
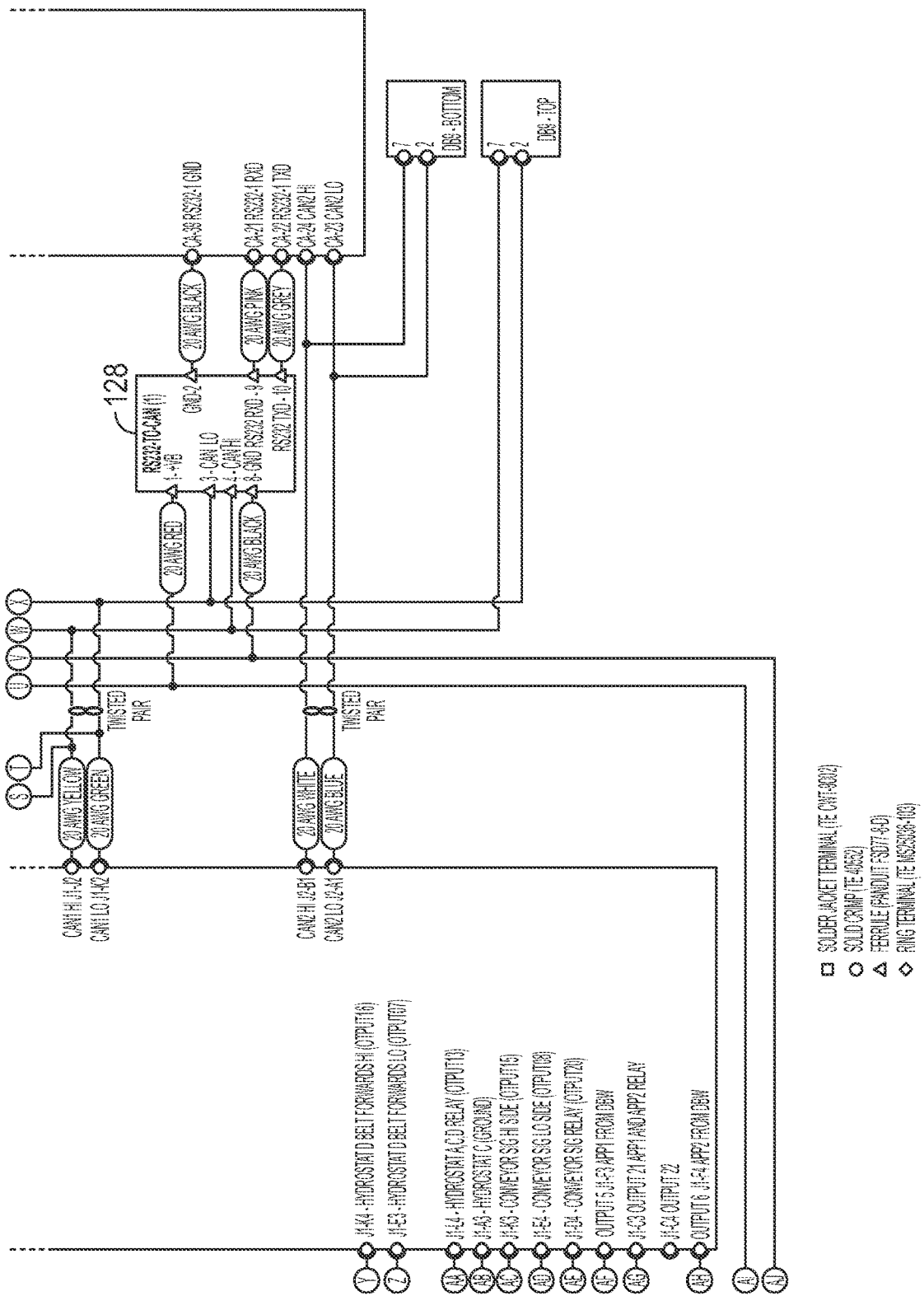
Figure 5A:
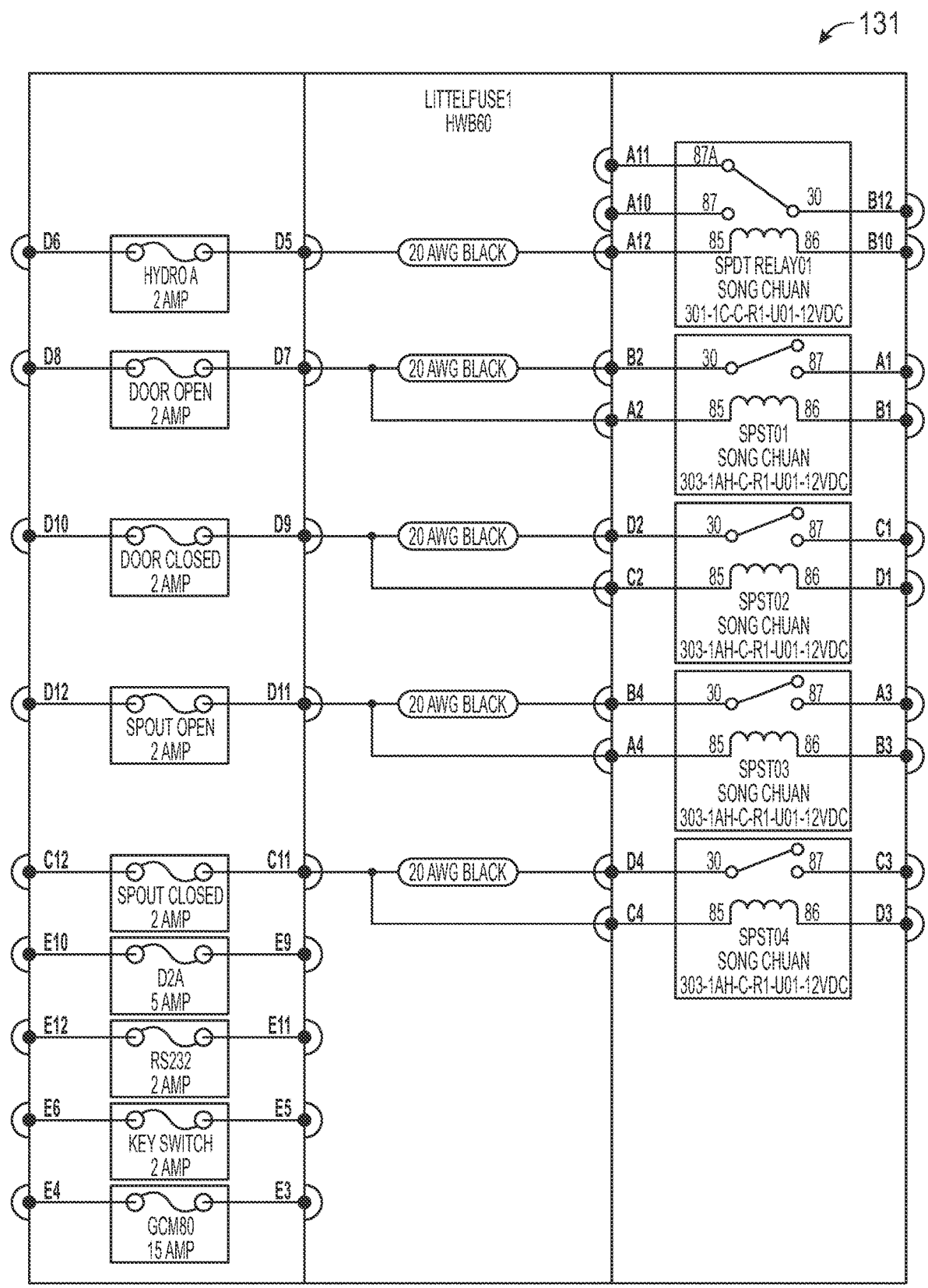
Figure 5B:
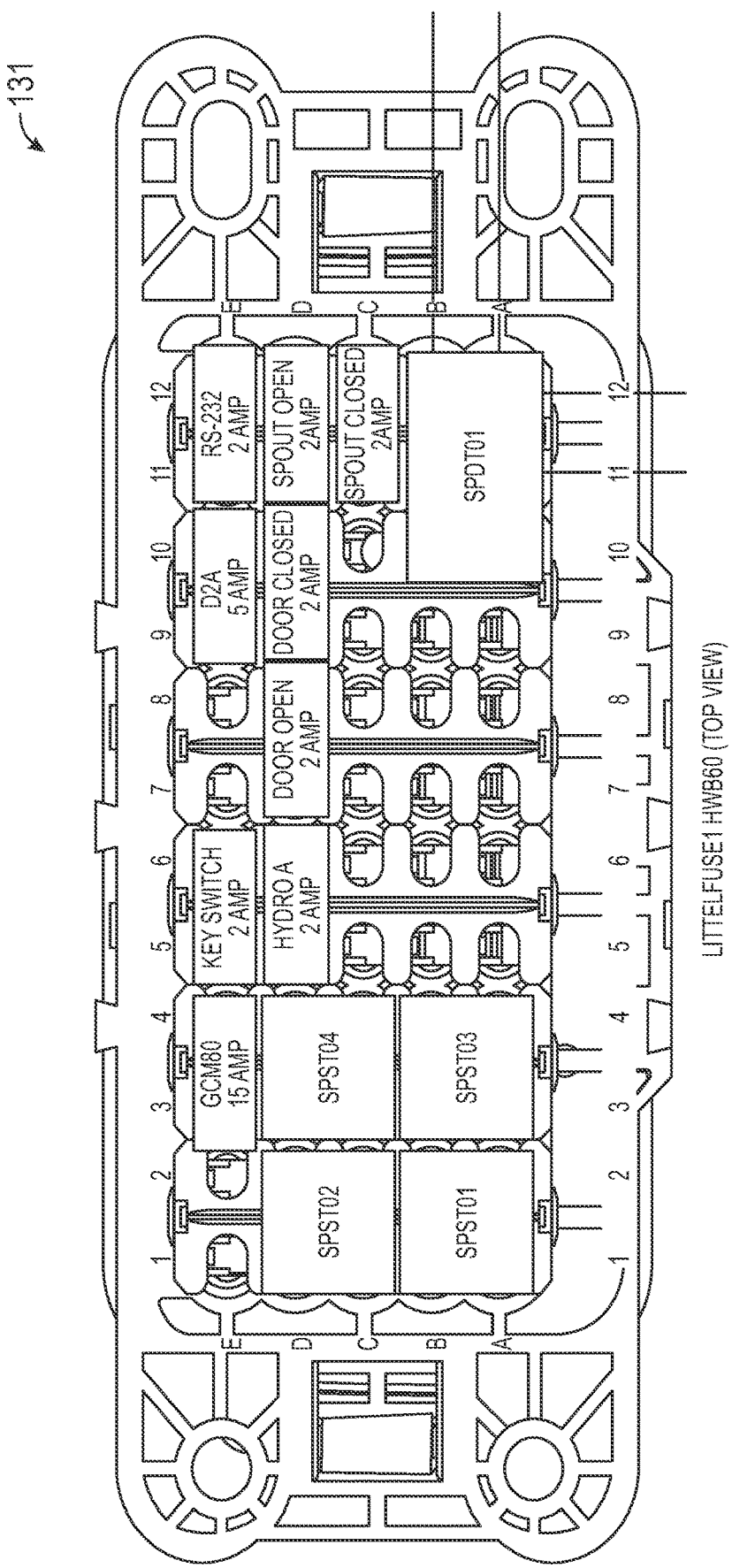
Figure 5C:
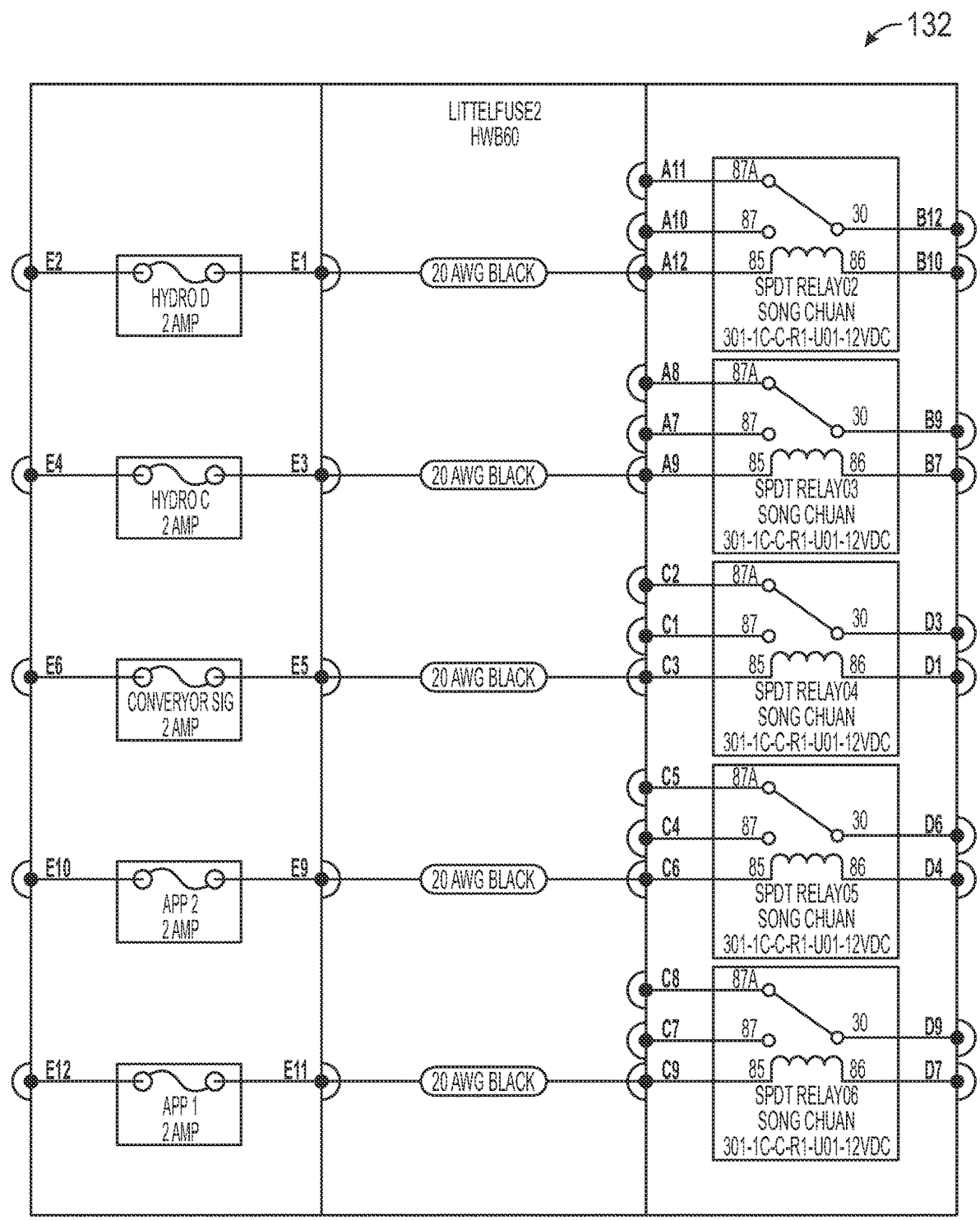
Figure 5D:
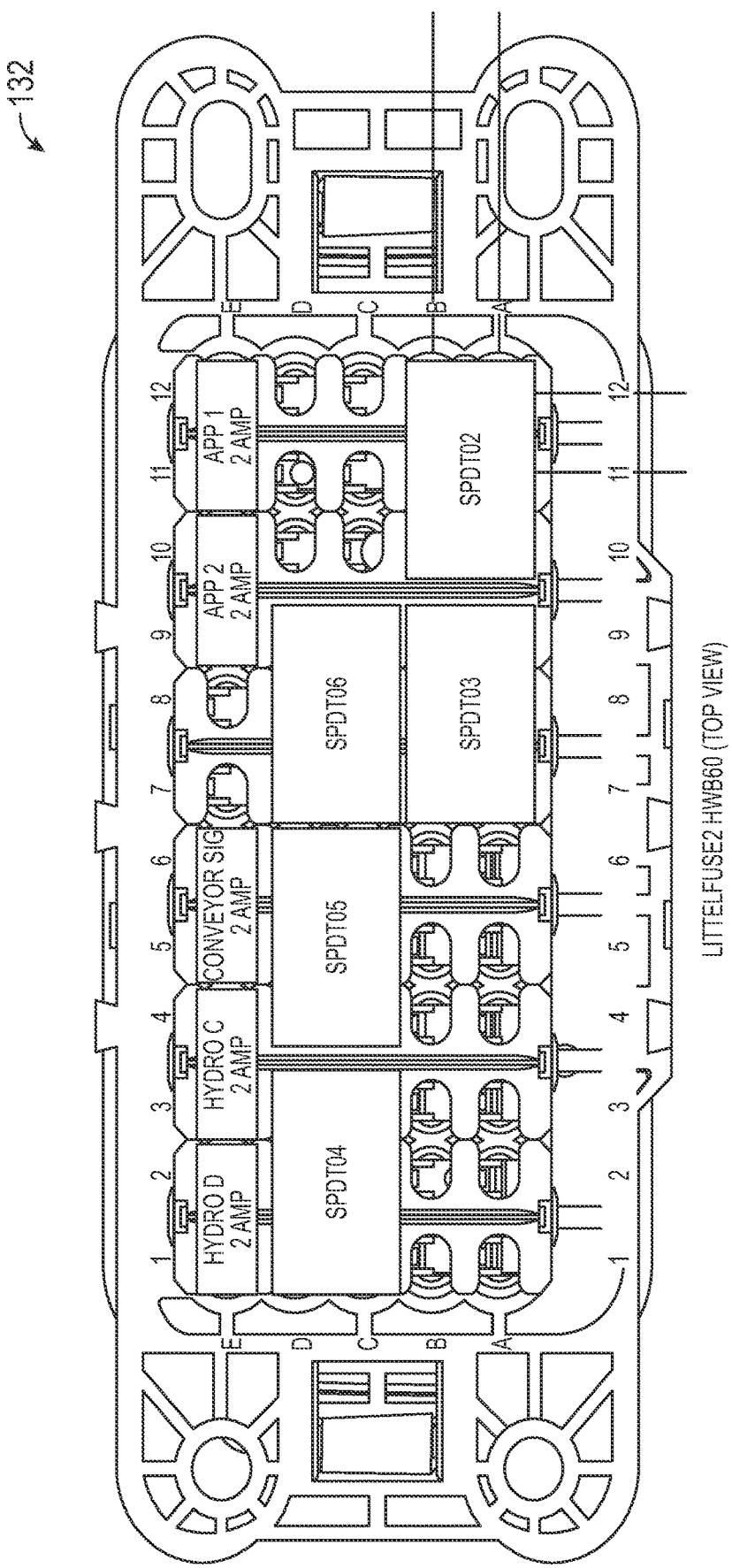
Figure 6A:
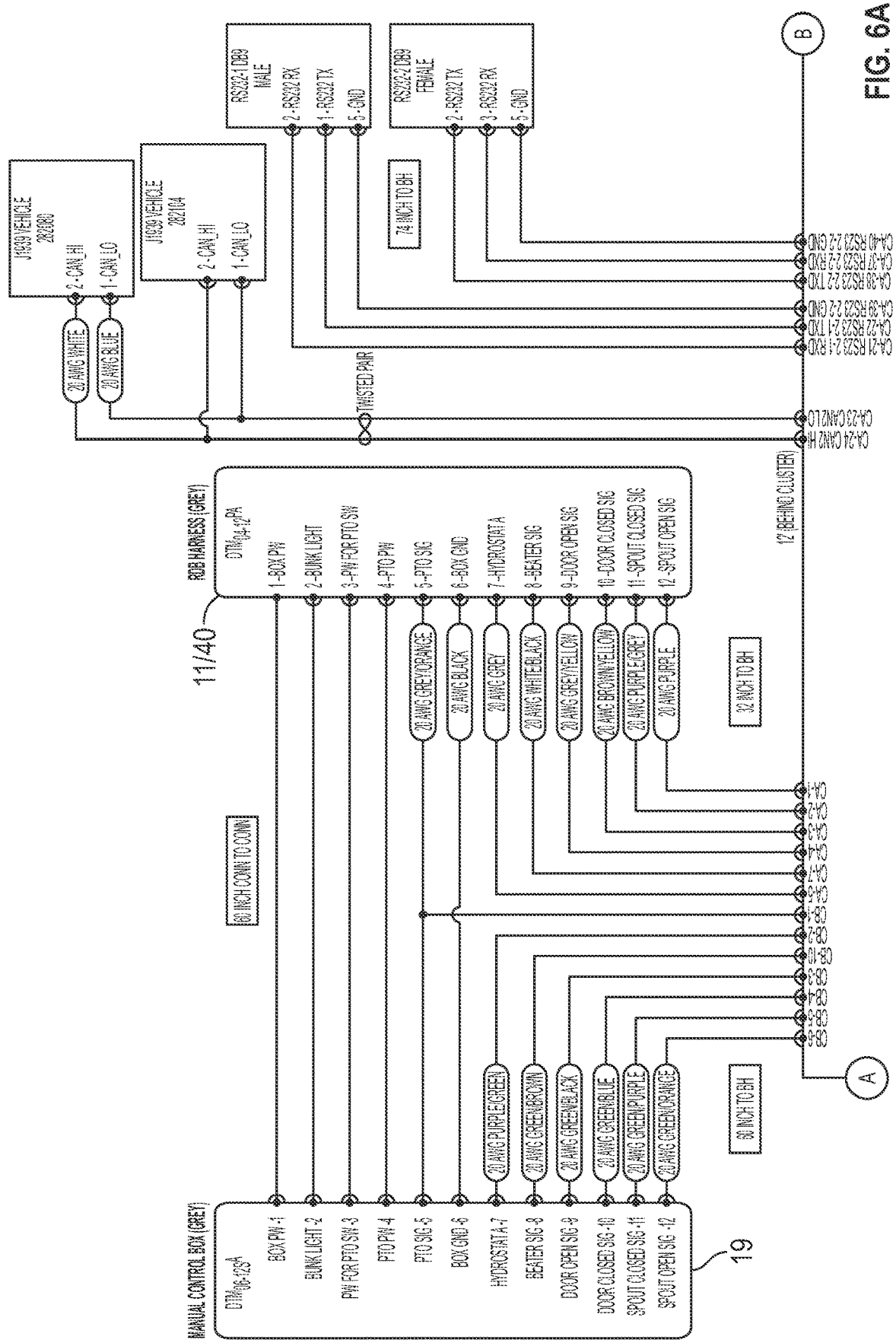
Figure 6B:
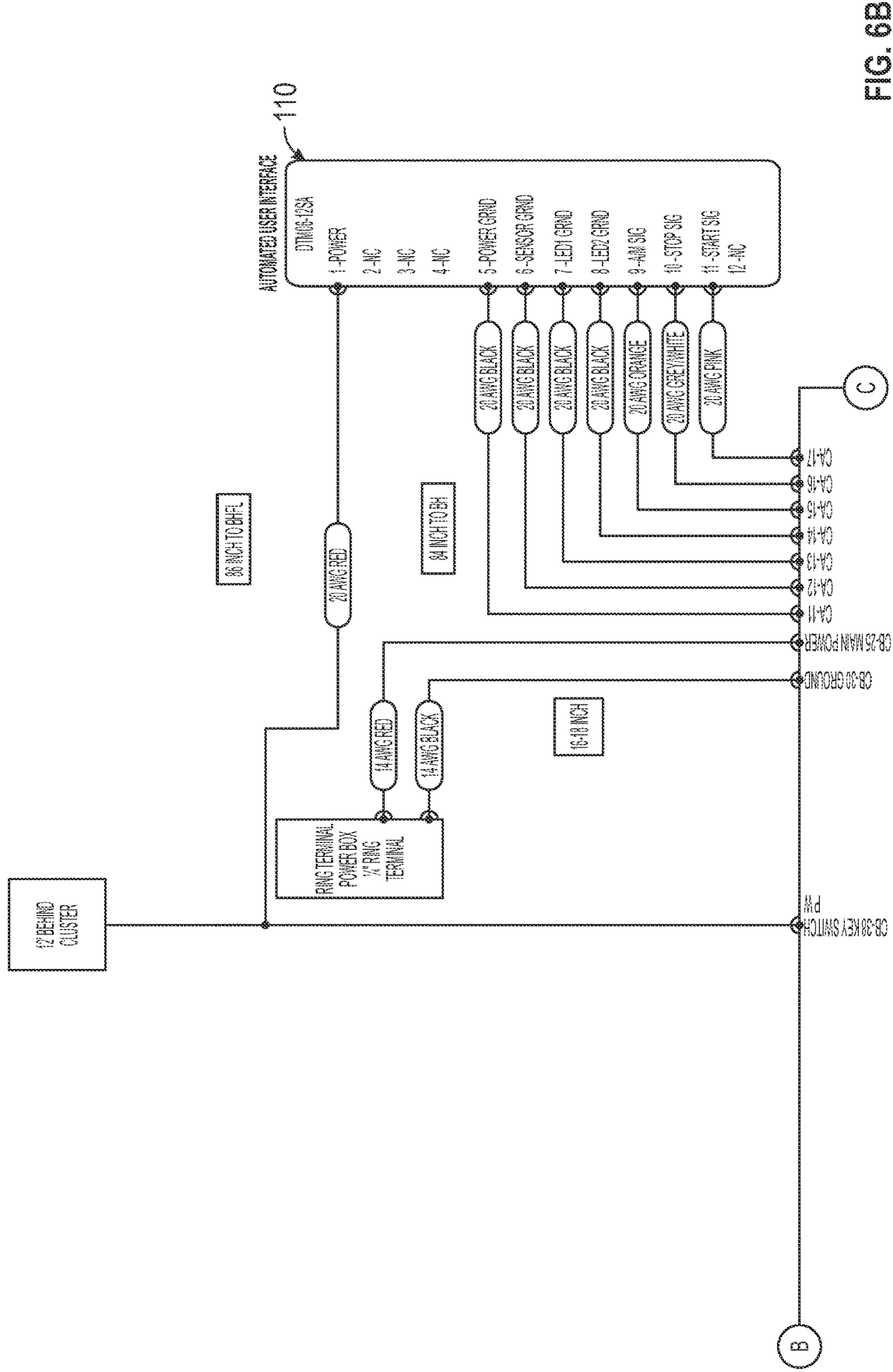
Figure 6C:
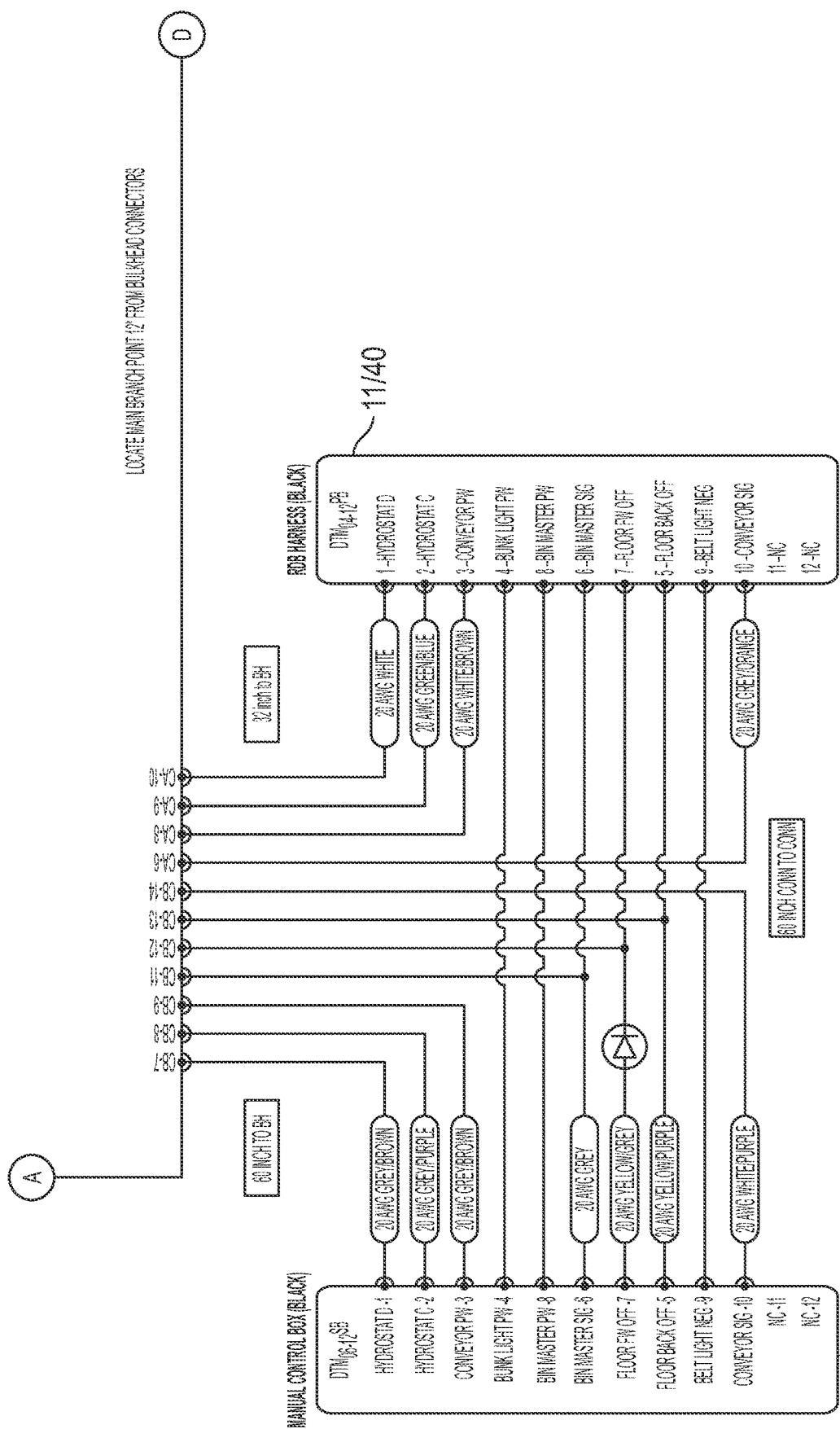
Figure 6D:
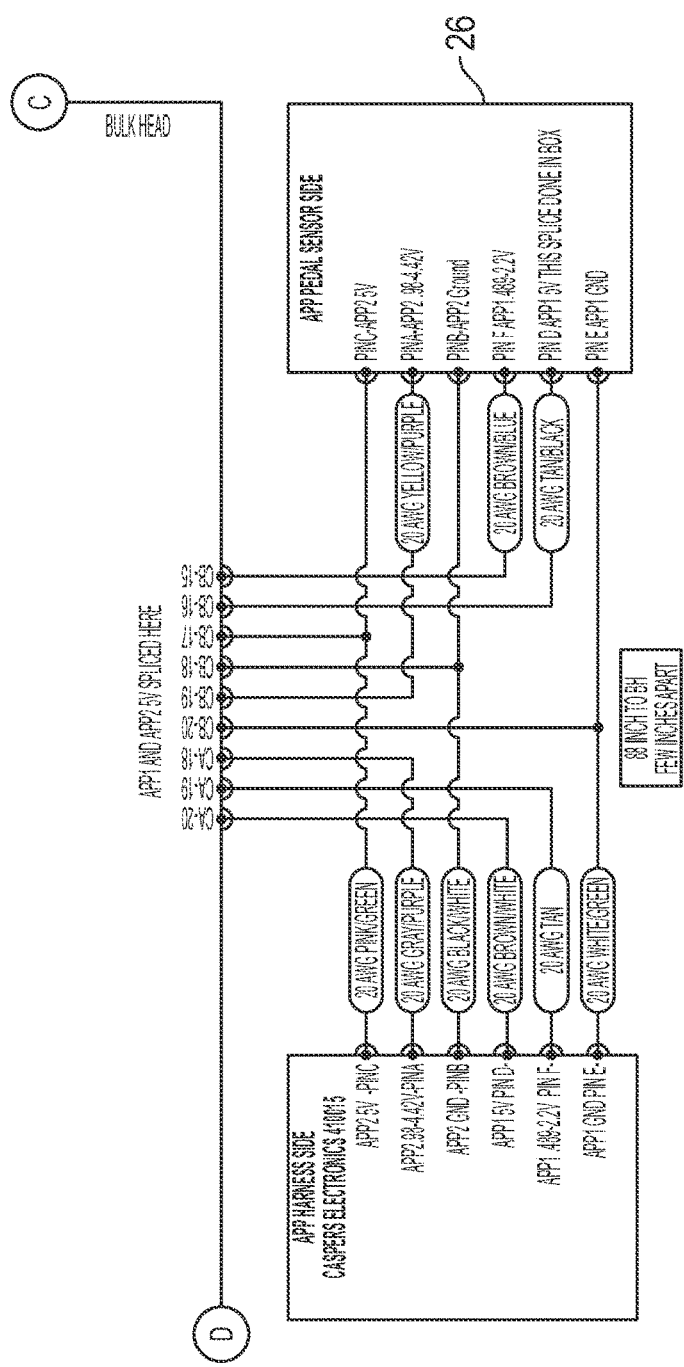
Figure 6E:
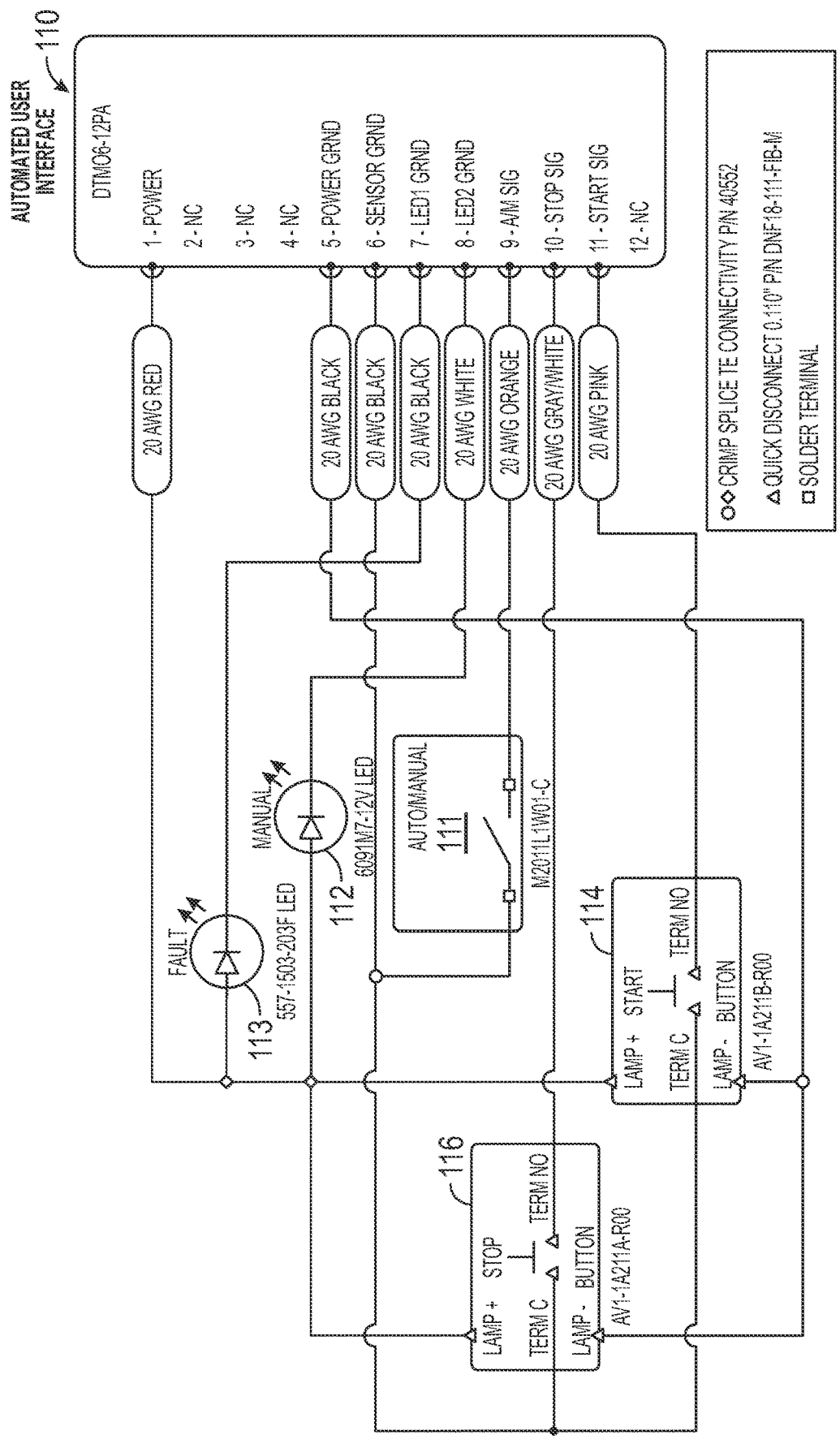

FIG. 3F then gives one non-limiting example of how the pedal emulator 126 of FIG. 3C connects and communicates with controller 120, vehicle ECM or ECU 29, and truck accelerator pedal 26.

Thus, FIGS. 3A-F give one of skill in the art the information about how automated delivery system 100 interfaces with other components of truck 10' and its driver to allow the "auto" mode dispensing to proceed. Once installed and programmed, automated delivery system 100 literally allows a driver to push "START" on in-cab automated user interface 110 and merely steer truck 10' into feedlot 5. System 100 knows the geolocation and prescribed ration 9 of bulk feed 8 of each bunk 6. System 100 will wait until the truck is guided to a starting point of a bunk 6 and will then, automatically, by on-board. GPS or other similar geolocation component, recognize that bunk starting point, retrieve the bunk's prescription, and commence dispensing into the bunk at a dispensing rate correlated to vehicle speed and length of the bunk per ration prescription. System 100 will regulate dispensing towards a uniform dispensing rate per vehicle ground speed with the goal of an even amount of feed per linear foot from bunk starting point to ending point. System 100 will then automatically cease dispensing at the bunk end point.

The above process will repeat from any other bunk 6 designated for dispensing on feedlot 5. Importantly, system 100 can lock out any dispensing of feed unless it confirms truck 10' is between endpoints of a bunk 6 designated for dispensing. This is another feature that can be included to minimize the cost of erroneous dispensing outside a bunk 6 or to a bunk not designated for dispensing.

Other automatic features can be included in system 100, As mentioned, parameters can be sensed could be sensed to alert the driver to stop automatic dispensing. One example is that the feedbox 11 is out of bulk feed. Another is that the rear door 12 has moved to its forward-most position in feedbox 11, Others are possible. These features also provide technical solutions to promoting the accurate and efficient dispensing of bulk feed from a truck.

FIGS. 4-6, and subparts, provide additional details about specific ways the automation controller and system of the invention might be wired and configured relative a truck and feed dispensing sub-system. Those skilled in the art will understand and appreciate these details as non-limiting examples. Variations obvious to those skilled in the art are, of course possible. Reference numbers and annotations allow the reader to match up the wiring connections and components that are discussed and illustrated regarding prior drawings, and build system 100. It is to be understood that these are non-limiting ways to implement the functional features of this embodiment of the invention. Variations are, of course, possible.

FIGS. 7A-C, and subparts, provide additional details of the bulk seed box 11 and movable belt/door 12 to convey bulk feed to the side discharge 13, and the side discharge conveyor 15, door 14, and spout 16.

FIGS. 8A-D, and subparts, provide schematics and details of the types of hydraulic subsystems that can be used in the exemplary embodiment. These figures are annotated with reference numbers to show how the hydraulics interface with certain components of truck 10', and provide the reader with an understanding of one non-limiting way to build the hydraulic circuits to operate those components. FIGS. 8B-1 to -2 shows one non-limiting example of a valve block or body 32 and its relationship to hydraulically powered or controlled components of truck 10'. FIGS. 8C-1 to D-2 provide a non-limiting specific schematic of such hydraulic subsystem, connections, and components to show one way to build it. In this example the PVG valve spool maximum flows are 1. Beater 17 17.2 GPM, Conveyor 15 17.2 GPM, spout 16 6.6 GPM, and door 14 6.6 GPM. Maximum pump flows at 1200 truck engine RPMs is 17 GPM and 40 GPM, respectively, for the 55 cc hydrostatic hydraulic motor and 130 cc LS 40 pump shown at 30 in FIGS. 8B-1 to -3. As will be appreciated, a set-up that allows sufficient engine rpms to power all the mechanical dispensing components effectively at such relatively low rpms (e.g. 1000-1500 rpm) can save truck fuel which is more cost effective and ecologically friendly than at higher rpms.

Figure 9B:
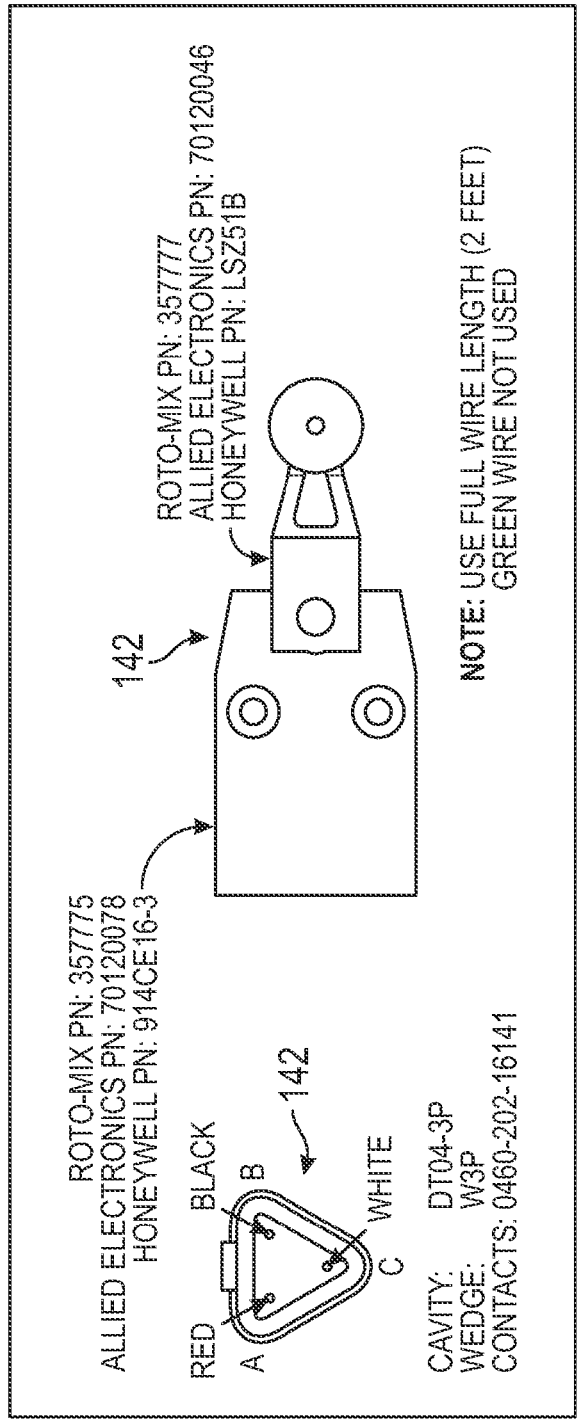
Figure 9C:
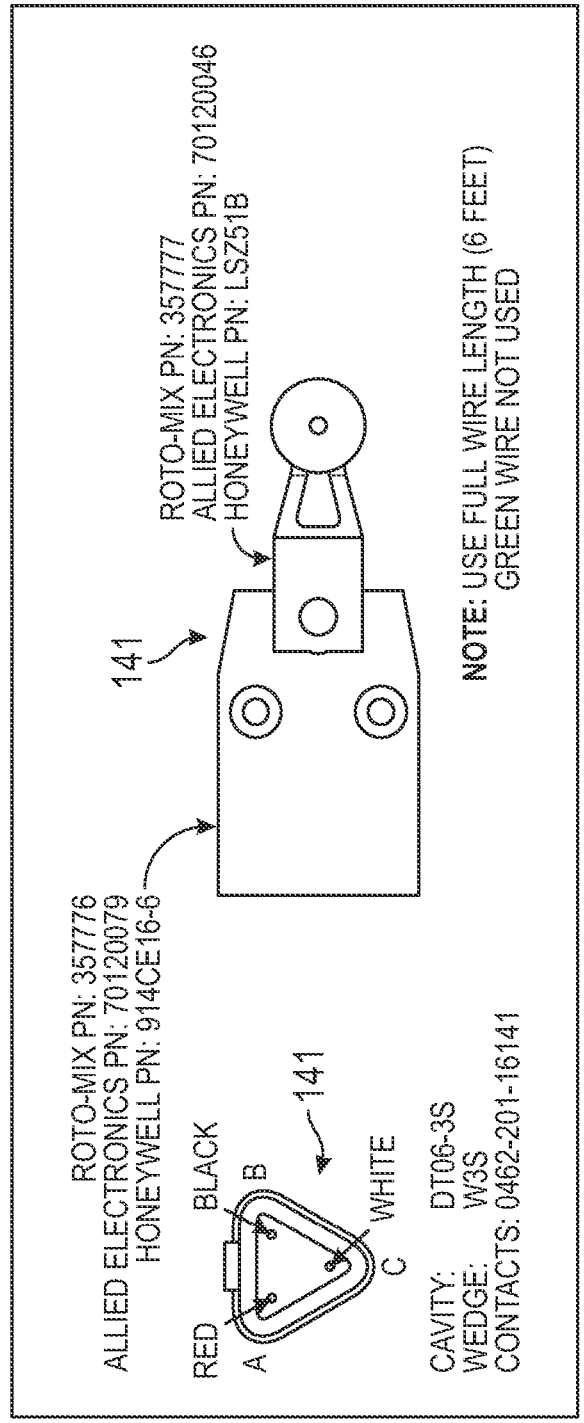

FIGS. 9A-C, and subparts, provide additional details of wiring of the exemplary embodiment, including limit switches used on the bulk feed box. FIGS. 9A-1 to -3 illustrates one non-limiting example of how electrical wiring can be connected to the various dispensing components on feedbox 11, and to components on truck 10' as well as to electrical power in the context of manual control mode with manual user interface 19 of FIG. 2C. This would be modified to also include electrical connection to automated delivery system 100 as shown in FIG. 3C. FIGS. 9A-1 to -3 further shows the optional feature of including limit switches 141 and 142 to that circuit. Specific examples of such limit switches are shown in FIGS. 9B and C. As discussed above, these switches can be placed at the front and rear of feedbox 11 in positions that sense presence of the rear door 12. This allows system 100 to be informed if the rear moveable door 12 is all the way back (e.g. to confirm feedbox 11 is in condition to be loaded with or is loaded with bulk feed 8) or all the way front (e.g. to alert the driver that bulk feed 8 is gone and needs to be loaded into feedbox 11).

FIGS. 10A-C are one illustration of how the automation controller 120 and user interface 110 of system 100 can be fabricated for installation in a vehicle. They also give non-limiting examples of dimensions and other information about one way to build them.

Thus, as can be appreciated, the foregoing is intended to inform the reader of specific ways the invention can be implemented into a truck and feed delivery system. Variations according to need or desire are possible.

4.1.3.2 System Requirements

In this embodiment, the automated system 100 can provide the following based on the foregoing system of FIGS. 2-12. One example of how these operational requirements can be programmed into the system 100 are illustrated in the state flow diagram 200 of FIG. 13:

1. The system will be able to control engine 20 speed.
2. The system will be able to control belt 12 direction and speed.
3. The system will be able to turn the conveyor 15 on/off.
4. The system will be able to control the conveyor 15 speed.
5. The system will be able to open/close the discharge door 14.
6. The system will be able to lower/raise the spout 16.
7. The system will be able to measure engine 20 speed.
8. The system will be able to measure vehicle 10' speed.
9. The system will be able to measure the state of the interrupter switch.
10. The system will be able to measure the state of the forward belt limit switch 141.
11. The system will be able to measure the state of the back belt limit switch 142.
12. The system will be able to measure the state of the PTO 22 switch.
13. The system will be able to measure the state of the Start Button 114.
14. The system will be able to measure the state of the Stop Button 116.
15. The system will be able to measure the state of the Auto/Manual Switch M.
16. The system will be able to read the scale 50 weight.
17. The system will be able to receive the bunk 6 length and call weight.

4.1.3.3 Functionality 4.1.3.3.1 Normal Operation

1. The driver will drive to the bunk 6 of a specific pen 5.
2. The driver will engage the PTO 22.
3. The driver hit the Auto mode switch 111 (if not already pressed). The system will wait for the GUI and feedlot map software 42 and bunk feeding computer 40 to start (step 202).
4. The driver will press Start button 44 on the system (step 204).
5. The system will perform safety checks. This includes PTO 22 and park brake 27 and vehicle brake 26 checks (step 210). The system will send a request to software 42 for the pre-programmed data regarding the prescription for a bunk 6 of interest (step 206) and do a validity check of any data that is retrieved (step 208).
6. The system will take control of the pedal 26 (step 210).
7. The system will engage (step 212) and read the current weight (step 214 from scale 50), call weight, and bunk length (validated in step 208).
8. The system will lower the spout 16.
9. The system will open the discharge door 14.
10. The system will turn on the belt 12 until the interrupter switch is triggered (first time only).
11. The system will turn on the conveyor 15.
12. The system will begin acceleration the vehicle 10'.
13. The system will regulate the vehicle 10' speed and conveyor 15 speed to hit call weight for the prescribed ration 9 for the identified bunk 6 (step 216).
14. At the end of the bunk 6, the system will stop the vehicle 10' (go to idle) (step 218) and send a "stop" command (step 220).
15. The system will stop the conveyor 15.
16. The system will stop the belt 12.
17. The system will leave the discharge door 14 open.
18. The system will raise the spout 16 (optional).
19. The system will give pedal 26 control back to the driver.

4.1.3.3.2 Additional Functions

1. When the Belt Forward Limit Switch is hit and the system is finished, the belt 12 will move in reverse until the Belt Back Limit Switch 142 is hit or a timeout is reached (optional).
2. When the Brake 28 is pressed, the engine 20 speed will not increase. If the brake 28 is pressed for a set number of seconds, the system will stop.
3. When the Stop button 116 is pressed (step 215), the system will relieve control of the pedal 26, stop the conveyor 15, and stop the belt 12, to allow a "pause" of the automated process 200.
4. If the AHI system (a system that monitors the feed box and can inform/alert the driver to the load is finished and optionally to refill the bulk feed box on the truck, here be monitoring the Digi Scale 50 readout for weight of the feed box and its contents) tells the driver to return to the filling station, the belt 12 will move in reverse until the Back Limit switch 142 is hit or a timeout is reached. In some cases, the driver would manually reverse the belt 12.

4.1.3.4 Driver Inputs and Feedback

1. There will be an Auto/Manual Switch 111
   a. Manual will let the original system have complete control of the RDB 40.
   b. Auto will only let the Driver adjust the door and spout
2. There will be a Start Button 114
   a. This will initiate the feeding sequence
3. There will be a Stop Button 116
   a. This will pause the operation of the system, but the system will still remember relative location and remaining call weight
4. There will be a Fault Light 113
   a. If the system has faulted, the Fault LED 113 will be lit 5. The Start/Stop buttons 114/116 will have additional functionality if pressed twice.
   a. Start 114 pressed twice will tell the system to perform a first feeding sequence, which will get feed onto the conveyor before moving.
   b. Stop 116 pressed twice will tell the system to perform a complete feeding sequence, which includes closing the door 14 and lifting the spout 16 (this will not move the belt 12 back).

As will be appreciated by the reader, the forgoing is one non-limiting way to implement aspects of the invention. Variations are possible according to need or desire. A programmer skilled in the art can program a digital controller according to known techniques to accomplish the same.

FIGS. 15A-E give one non-limiting example of a process flow that follows the functions discussed above in the context of using a feed management software system 42 like Micro-Technologies ACLU-TRAK from which preprogrammed geolocation and ration for each bunk can be retrieved. As shown, this "Micro Data" can include for each bunk the following types of information: bunk length, call weight, ration type and density, and start and stop geolocation points for each bunk. FIGS. 15A-E show one-nonlimiting way to code or program the automation controller 120 and automation user interface 110 to utilize this information. This includes the ability to derive (through appropriate sensors such as digital scale 50 or other) the actual weight of delivered feed to a hunk and compare it to the call weight for the bunk. Any offset can be recorded and stored, and possibly used to adjust the dispensing components the next feed delivery time for that bunk (or for bunks with similar rations) so that system 100 could help learn to fine-tune the dispensing to reduce any offset between call weight or actual delivered weight. As discussed later, this information could also be used by automation controller 120 for machine-learning of such offsets and then automatic adjustment of dispensing control instructions to try to reduce any offsets. As can be further seen, this example allows saving of data related to the dispensing, and either storage for record-keeping or for further use or analysis.

FIGS. 16A-1 to C are non-limiting examples of state flow, process code, and code for certain aspects of the automated dispensing for further understanding of one way to make aspects of the invention. These illustrations give the reader information about how the exemplary embodiment could be made, including how components are interconnected, as well as one example of testing/initialization of such a system with automation controller 120, and an example of coding that might be used. Variations are, of course, possible. The flow chart of FIG. 13, and the functional features of FIGS. 14A-C, can be programmed into an automation controller 120 in a number of ways, as is well understood by those skilled in the art. And, as discussed herein, the specifics of FIGS. 13-46 can be varied according to desire or need for a given application of the automation system according to the invention. The technological solution includes the specific selection, arrangement, and integration of the various, diverse components needed to mechanically dispense feed rations in a manner that provides effective improved accuracy and reliability of rations to the prescribed bunks or drop zones, with minimum driver inputs.

4.1.4 How to Use

The basic way the automated mode 200 according to the invention can be implemented by a driver is set forth above. Below are additional comments about how the use the invention and its benefits.

In testing, the automated mode obtained very acceptable results in hitting prescribed call weights for rations for each bunk. The system functions as follows: (1) when the driver arrives at the prescribed bunk location, the system's GPS coordinates confirm the prescribed location; (2) the driver can then press the start button 114 which initiates a sequence of automated functions, including throttle 26 control on the truck to maintain a given ground speed (such as 3.5 mph), lowering the discharge spout 16, raising the discharge door 14, starting, and controlling the rate of discharge for conveyor 15. At this point, the driver's only function is to steer the truck along the bunk line and if necessary, to interrupt the system by pressing the brake pedal 28. At the end of the bunk line, the system shuts down all automated functions which then allows the driver to proceed to the next prescribed bunk location to initiate the next automated feeding process.

The key benefits of this system will enable feedlot operators to (1) ensure that the truck is in fact at the prescribed pen, (2) deliver an even flow of feed along the prescribed length of the bunk line which will allow each animal to consume an equal amount of the feed, (3) eliminate the likelihood of the driver needing to backup the truck to completely discharge the prescribed call weight, (4) reduce the number of processes the driver needs to perform which will reduce stress and human error, and (5) allow for less experienced and temporary/weekend drivers to achieve these superior results with minimal training.

As will be appreciated by those skilled in this technical field, the foregoing provides details of one way to make and use the exemplary embodiment of the invention. The details show a type of feed dispensing truck into which can be integrated the automation controller and user interface. The details show both the high-level architecture of the automation mode system as well as specific integrations into the vehicle engine, transmission, pedal(s), and the hydraulic and electric systems of the dispensing system. The details provide how the automation controller is programmed to use the various inputs, evaluate them, and instruct system components during automatic mode feed out operations.

4.2 Specific Possible Features 4.2.1 Specific Possible Feature (Load Sense Hydraulics)

4.2.1.1 Overview

One specific optional feature that can be advantageously used in the exemplary embodiment will be called Load Sense hydraulics. See load sense hydraulics subsystem 150 at FIGS. 11A-C. This is a technical solution to a hydraulic-based sub-system being controlled independently of the power source which powers the hydraulic pump, regardless of how applied.

4.2.1.2 How to Make

With specific reference to FIGS. 11A-C, autonomous operation of a "load sense" hydraulic subsystem 150 for the feed delivery box 11 in conjunction with autonomous operation of the corresponding vehicle is illustrated. By adding this to the system, it provides independent control of the rate of feed discharge without regard to vehicle speed and/or engine rpm.

Load sense pumps 152 operate by maintaining a low operating pressure and low flow at system standby. As demand for flow increases, a load sense line 154 causes the pump 152 to increase flow to match the demand. When demand for flow decreases, the load sense line 154 causes the pump 152 to decrease flow, matching demand. This allows full pressure and full flow at high efficiency regardless of truck engine RPM. This is accomplished by applying load sense pressure to the pump control in combination with hydraulic reservoir 153 and hydraulic valve 156. The pump control determines the stroke of the pistons inside the pump 166, which determines the amount of flow produced.

Hydraulics operating the feeder dispensing is unaffected by truck engine rpm (so long as truck at or maybe a bit above idle speed). Control of hydraulics not dependent on or limited by rpm of motor driving hydraulic pump. This innovation can be used regardless of use with the semi-autonomous feed truck invention. In other words, it could be applied to any hydraulic system that has a hydraulically powered actuator and an engine to drive the hydraulic pump.

In one example, this load sense system 150 would operate at or just above idle rpms and then in any normal rpm range above that. For example, if idle rpms are 650-900 rpm, the load sense feature provides virtually instantaneous full and consistent hydraulic power to all components needed in the automatic dispensing whether rpm stays at idle or just above, or increases above that depending on what the autonomous system calls for in terms of vehicle engine rpm. Use in conjunction with autonomous system is more efficient and controllable. Responsiveness of such an autonomous hydraulic system combined with infinitely adjustable hydraulic system is a beneficial factor of the autonomous system according to the invention. In one example, the hydraulic system achieves full power at approximately 1100 rpm. This operating rpm is considerably lower than other competitive systems which require 1500 to 1800 rpms. The lower rpm saves fuel and wear on the truck and delivery box. Of course, the precise rpms vary from vehicle to vehicle, and operating characteristics. These rpms are given as one non-limiting example.

4.2.1.3 How to Use

This feature can be built into the exemplary embodiment and operate automatically during automatic mode feed out operations. FIGS. 11B and 11C give examples of load sense pumps and circuits.

In FIG. 11B, the pump has a dual servo piston design with a cradle-type swashplate set in polymer-coated journal bearings. The bias piston increases swashplate angle. The displacement piston decreases swashplate angle. At equal pressure, the larger diameter displacement piston overpowers the bias piston. Nine reciprocating pistons displace fluid from the pump inlet to the pump outlet as the cylinder block rotates on the pump input shaft. The block spring holds the piston slippers to the swashplate via the slipper retainer. The cylinder block rides on a bi-metal valve plate optimized for high volumetric efficiency and low noise. Tapered roller bearings support the input shaft and a Viton lip-seal protects against shaft leaks. An adjustable one spool or two spool control senses system pressure and load pressure. The control ports system pressure to the displacement piston to control pump output flow.

Load sense control will match the output flow to the circuit demand at a pressure slightly above the load pressure. The load sense compensator will increase or decrease the output flow to maintain a constant delta across the load orifice. This means that regardless of load conditions, the flow will remain constant for a given orifice opening.

The load sense compensator will react to increases in the load by increasing output pressure. This is done by sensing the pressure drop across an external orifice and adjusting displacement to maintain a constant pressure drop across the orifice.

A variable orifice can be used as follows. When the variable orifice is wide open and not restricting the pump flow, pump outlet pressure and load pressure are equal. Since the pressure is equal on both sides of the spool, the differential spring of the spool keeps the spool to one side. There is no control pressure in the servo piston, so the pump will stay at full stroke. IF the variable orifice is restricting pump flow, pump outlet pressure is increased and a pressure drop is created across the orifice. The pump pressure will increase until it overcomes the differential spring force and shifts the spool to direct control oil into the pervo piston and destroke the pump. The pump will maintain a flow level that keeps the pressure drop across the variable orifice constant (equivalent to the differential spring setting). Since the load sense control will adjust pump flow to maintain the pressure drop across the orifice constant, increasing the orifice size will increase the flow to the system. Closing the orifice will decrease the flow to the system. Increasing the pump drive speed will increase the pump output flow, but since the load sense control is working to maintain a constant pressure drop across the orifice, the load sense pump will destroke to maintain the same output flow. Therefore, in a load sense circuit, the pump will maintain the same output flow, independent of pump drive speed. If load pressure increase, the pump outlet pressure will increase proportionality to maintain the constant pressure drop across the orifice. Most load sense control also incorporate a pressure limiter feature which limits the maximum pressure the pump will achieve. Once the load pressure reaches the setting of the maximum pressure spring, the poppet unseats and limits the pressure in the differential spring chamber. As outlet pressure increases it will shift the spool and destroke the pump. Typical load sense delta P setting is around 200-300 psi. Standby pressure is the pressure level the pump will maintain with no load sense signal. This is typically 50-100 psi higher than the load sense delta P setting.

As can be seen, exemplary embodiments according to the invention can work as follows.

The system 100 is applicable to a wide range of uses including but not limited to automated feed delivery for commercial feedlots and dairies. During feed delivery, system 100 increases feeding efficiency and ration delivery accuracy to the feed bunk. Precise feed rations are more accurately and evenly distributed to match individual pen requirements. This system is currently designed to work with the Roto-Mix Ration Delivery Box RDB models 822-17, 1102-23 and 1202-25 however, it is being developed for other Roto-Mix models and other feed management systems, and can be applied to other dispensing systems.

In the version of system 100 working in conjunction with the Roto-Mix Ration Delivery Box (RDB) for the feedbox 11 and Micro Technologies® Accu-Trac for preprogrammed bunk locations and rations, the version of system 100 controls the throttle, ground speed and all RDB functions. This produces more consistent feeding down the bunk, provides better control of call weights and virtually eliminates feeding in reverse. By sensing loaded weight of the feedbox 11 before dispensing a ration and after, system 100 can monitor the difference between a "call weight" the weight of feed prescribed and called for a particular bunk 6 and the delivered weight. This optionally allows system 100 to constantly learn and adjust the feed rate for different rations based on the call weight and delivered weight.

The Load Sense Hydraulic system 150 produces maximum flow and pressure at approximately 1100 engine RPM. Lower engine RPM and ground speed reduces fuel consumption, chassis wear and overall maintenance.

Optionally, remote access by Roto-Mix personnel can be available to each user of system 100 to diagnose issues, change settings or update software as needed, is made possible with Telematics which is standard with a monthly subscription. The advantages of system 100 is an important technological tool to use in the management of precision feed delivery.

The system 100 therefore provides the technological solutions of:

Controls the throttle, ground speed, and all RDB functions

Produces more consistent feeding down the bunk

Provides better control of call weights

System 100 in conjunction with the Ration Delivery Box 11 and Micro Technologies® Accu-Trac software 42 further works as follows:

Once the truck 10' has arrived at the correct pen 7, the driver will lock the transmission into $1^{st}$ gear, make sure the Auto/Manual switch 111 on the Auto-Feed control 110 is set to Auto and turn on the PTO. The floor 12 interrupt control must also be turned on. You are now ready to feed. Pressing the Feed Pen icon on the Micro Technologies tablet 18 will initiate the Auto-Feed system 100. Pressing start on the Auto-Feed control box 110 will energize the system 100. The driver will continue to use the brake to hold the truck 10' at the start of the bunk 6. As the system 100 starts its sequence of operations, the spout 16 will open followed by the door 14 opening to a preset height. The engine RPMs will elevate slightly and the conveyor 15 will begin to discharge feed. As soon as the driver can see feed falling into the bunk, they will slowly release the brake and allow the truck 10' to accelerate to a predetermined speed. At this point, the driver is only steering the truck. The system 100 will continually adjust the discharge rate in relation to the bunk length and desired call weight. When the truck 10' nears the end of the bunk, the driver will need to gently apply brake pressure to stop the truck at the end of the bunk. The system 100 will stop discharging feed when the call weight is reached. Pressing Done on the Micro Technologies tablet 18 will record the delivered weight. You are now ready to proceed to the next pen and repeat the process. At each pen the system 100 will attempt to open the spout 16 but it will not change the door 14 height after the first pen.

When the last pen 7 has been fed, the driver will switch the system 100 to manual mode and reverse the floor 12 so the RDB feedbox 11 is ready for the next load of feed.

While you are feeding with the system 100, the driver will still have manual control of the spout 16 and discharge door 14 to make adjustments if necessary. When feeding hospital pens or very small amounts of feed, a simple changing of the Auto/Manual switch 111 to Manual will allow the driver to have complete control of all functions on the RDB feedbox control panel.

The Roto-Mix RDB Load Sense Hydraulic system 150 produces maximum flow and pressure at approximately 1100 engine RPMs. Lower engine RPMs and ground speed reduces fuel consumption, chassis wear and overall maintenance.

System 100 is constantly learning and adjusting the feed rate for different rations based on the call weight and delivered rate.

Capable of feeding partial sections of a bunk to accommodate lower head counts in large pens with input from Micro Technologies' system.

Telematics is standard with your monthly subscription which allows remote access by Roto-Mix personnel to diagnose issues, change settings or update software as needed.

System 100 works similarly with other feed management software. For example, in the case of system 100 can be used with Rotomix RDS feedbox 11 and Turnkey from AMS Animal Management Studio software (from Animal Health international, 2505 Lakeview Dr., Suite 100, Amarillo, TX 79109 (USA)), once truck 10' has arrived at the correct pen 7, the driver will lock the transmission into 1st gear, make sure the Auto/Manual switch 111 on the Auto-Feed control 110 is set to Auto and turn on the PTO. The floor 12 interrupt control must also be turned on. You are now ready to feed. Pressing the Start Roto-Mix/BFS icon on the AMS Pen Feeding Screen will initiate the system 100. Pressing start on the control box 110 will energize the system 100. The driver will continue to use the brake to hold the truck 10' at the start of the bunk. As the system 100 starts its sequence of operations, the spout 16 will open followed by the door 14 opening to a preset height. The engine RPMs will elevate slightly and the conveyor 15 will begin to discharge feed. As soon as the driver can see feed falling into the bunk 6 for the pen 7, they will slowly release the brake and allow the truck to accelerate to a predetermined speed. At this point, the driver is only steering the truck. The system 100 will continually adjust the discharge rate in relation to the bunk length and desired call weight. When the truck 10' nears the end of the bunk 6, the driver will need to gently apply brake pressure to stop the truck 10' at the end of the bunk 6. The system 10' will stop discharging feed when the call weight is reached. Pressing the feeding status pie chart on the AMS Pen Feeding Screen will record the delivered weight. You are now ready to proceed to the next pen 7 and repeat the process. At each pen 7 the system 100 will attempt to open the spout 16 but it will not change the door 14 height after the first pen. When the last pen has been fed, the driver will switch the system 100 to manual mode and reverse the floor 12 so the RDB feedbox 11 is ready for the next load of feed. While you are feeding with the system 100, the driver will still have manual control of the spout 16 and discharge door 14 to make adjustments if necessary. When feeding hospital pens or very small amounts of feed, a simple changing of the Auto/Manual switch 111 to Manual will allow the driver to have complete control of all functions on the RDB control panel 40.

As will be appreciated, a display could be added to the automated user interface 110 or incorporated into a smart device such as a tablet 18 or even a smart phone that could be with the driver and display information such as:

Pen 7 and bunk 6 identifiers and geolocation information so the driver and the program can confirm the correct pen and bunk.

Overall weight of the feed load in feedbox 11 originally (when feedbox 11 was loaded with bulk feed 8), just before a ration has been dispensed, and just after a ration has been dispensed. This allows a visual representation to the driver (and could be captured and stored) of the mass of the ration that was just dispensed. Also, the display (and the software) could calculate if the measured mass that was dispensed aligns with the mass of the desired prescribed ration for that bunk. Any offset could be displayed (and stored). Such offsets would be used for, inter alia, to assist system 100 in learning of such offsets. In some embodiments, this information could be used by system 100. In some embodiments, this information could be used by system 100 to automatically make dispensing adjustments for further bunk dispensions to try to reduce or eliminate such offsets. It also could be used by the producer to track the offset in the production lives of the animals feeding from a bunk. Other information on such a display is, of course, possible. Examples would be a complete list of bunks to be serviced and details about them, and a real time log of call weights and actual dispensed weights for each. There could be graphics such as simulations of location and size of bunks/pens and position of truck 10' relative them. There could be graphics or other visual or audio alarms to alert a driver of an offset of call weight and actual dispensing weight, or other parameters relating to the feed dispensing job at hand.

4.2.2 Specific Feature (RDB Overload Control)
4.2.2.1 Overview

Another feature that can be beneficially used to further promote even and accurate feed dispensing with an automated operation is illustrated at ref. no. 160 at FIGS. 12A-B.

This technical solution ensures the feedbox 11 compartment with side dispensing conveyor 15 is not overloaded with feed to deliver to the bunk.

4.2.2.2 How to Make

A load cell 162 is mounted in the feedbox 11 compartment as shown in FIG. 12A. It uses the load cell 162 and plate 163 at vertical height in the feedbox 11 compartment so that if feed level gets to load cell 162 via plate 163, the load cell 162 will signal the system 100 through amplifier 164 and the system interrupts the main feed box belt/door 12 until the feedbox level goes down below load cell level 162.

This feature 160 senses overload and interrupts filling of the feedbox 11 until not overloaded.

An example of a sub-system 160 for this feature is illustrated in FIG. 12B. A load cell sub-system 160 can be built and operated as shown. One example of operation is:

- A 2 pound trip point controls the quantity of feed brought forward by the feed bunk belt/door 12.
- At 50 pounds, an alarm sounds indicating the conveyor 15 is overfull.
- A 0.5 pound trip point buffer gradually turns the pump that operates belt/door 12 on and off to extend pump life.
- After testing, the load cell amplifier 164 is resistant to radio and cell phone interference.
- The controller 166 uses standard load cell and power cable connectors.
- The zero point is resettable in case of temperature variation or load cell replacement.

4.2.2.3 How to Use

This feature can be a stand-alone sub-system operatively mounted in the feedbox 11 compartment and used in either manual or automated mode of the truck 10'. It could alternatively be communicated to the automation controller 120 and automatically operative when automated mode is selected.

Movement of the floor belt 12 in the large feedbox 11 compartment behind the discharge conveyor compartment 13 is automatically interrupted when there is an excessive amount of feed in the discharge conveyor compartment 13. Floor belt 12 movement is automatically restored when the discharge conveyor compartment 13 returns to a prescribed level.

In any case, it is another way to promote consistent supply of feed for delivery to bunk.

4.2.3 Specific Possible Feature (Correct Bunk, Ration, Time)

A feature that can be built into the automated system is positive identification that the correct feed load/ration has been delivered to the correct feed bunk at the correct time. This subtle technical solution assures correct prescription, location, and time for each bunk.

Because exemplary embodiments of the invention can have a geo-referenced "map" of each feedlot (including each feed bunk of each lot) (see, e.g., diagram of FIG. 1F), the map can be programmed (and repeatedly updated) to give the desired feed load for each bunk for each delivery day/time. This exemplary embodiment can monitor if the load/ration is in fact accurately delivered according to the map, and can reverse engineer whether or not this has occurred for each and every bunk for each lot.

The embodiment can be programmed, if desired, to (a) generate an "error message" if any prescribed load/ration is not delivered correctly or (b) assume the prescription was delivered correctly if no error message, or (c) both. Thus, a record of correct deliveries for each and every bunk is possible.

Furthermore, an option is to have communication of each automated truck 10' with a central data collection site. In one example, this could be a central site by telemetry. One example would be via the distributed cellular telephone network by using cellular transceivers to send and receive data via the appropriate communication protocols. See, e.g., FIG. 22.

As such, it would be possible for each and every user of the invention to communicate operational data regarding the automated feed delivery system according to the invention from almost any location which can access a wireless communication network. A central location (e.g. the Applicant or its designated agent) could receive and store such data from feed delivery trucks across the world.

This could facilitate a variety of benefits for producer and Applicant.

4.2.3.1 How to Use

As will be appreciated, the foregoing feature can be programmed into the automatic mode of feed dispensing according to the invention.

4.2.4 Specific Possible Feature (Automatic Prevent Unloading Other than at Bunk)
4.2.4.1 Overview An optional feature is automatic prevention of feed delivery unless physically at the correct bunk. The technical solution to preventing inadvertent feed unloading outside a bunk, or at the wrong bunk.

Because invention will have geo-referenced "map" of each feedlot (actually each feed bunk of each lot), the map can be programmed (and repeatedly updated) to give the physical location of each bunk (e.g. georeferenced points of opposite ends of each bunk such as with GPS or other georeferencing device or technique). Because the invention will monitor if the vehicle is in fact at the correct bunk according to the map, the invention can reverse engineer whether or not the vehicle is at the right bunk for each and every bunk, and lock-out operation of the feed delivery components if not. It can authorize feed delivery if between the georeferenced ends of the correct bunk, but prevent feed delivery if anywhere else.

4.2.4.2 How to Make

This feature can also be programmed into the automation controller. It disallows human error by preventing feed dispensing unless at a bunk.

4.2.4.3 How to Use

It can be automatically a part of operation of the automated mode.

4.2.5 Specific Possible Feature (Partial Ration Function)
4.2.5.1 Overview An optional feature is what will be called a partial feed feature 320. See diagrammatic illustration at FIG. 21. The technical solution is the optional ability to apply a prescription to a partial length of the bunk 6. The autonomous mode would still get the right volume per bunk foot length, but along a fraction of the bunk length instead of entire length.

This can be beneficial if, for example, if less than a full set of animals will use the bunk for a given time

4.2.5.2 How to Make

This is an optional feature that can be used with the Accu-Trac® sub-system previously discussed. Because that sub-system knows the geolocation and current prescription of each bunk by bunk ID, it knows both the starting point and ending point of each bunk. It therefore knows the length between. The automated system 100 can be programmed in advance to start and/or stop for a fraction of the length between those two points. An example would be to allow the truck 10' to move 20 feet along the length from the actual start of the bunk 6 before starting feed out and then finish 20 feet from the actual end of the bunk 6.

In one example, the system 100 is programmed as follows:

1. Includes the ability to set a threshold of when a partial feed option is triggered. In one non-limiting example, it could be based on % capacity where the system allows the partial feed option only to adjust if the pen is 80% capacity or less. Other triggers are possible.
2. Includes a definition of what portion of the bunk to feed. In one non-limiting example, it could have options of Start (a sub-length from the beginning point of the bunk towards the middle of the bunk), Middle (a sub-length away from the beginning and end points of the bunk towards the middle of the bunk), or End (a sub-length from towards the middle to the end point of the bunk). Other bunk sub-fractions are possible.
3. When it is determined that a pen bunk is going to be partially fed, a popup could appear on a display on the truck cab (e.g. on a tablet computer). This could provide the driver the opportunity to select a partial ration function 320 for that particular bunk 6.
4. The driver has the ability to move the truck forward if feeding the middle or end of the bunk (optionally some type of indicator could be provided the driver, such as an audible noise, a light, or a text message, when the truck is then positioned correctly for commencement of partial feeding). The driver could acknowledge the alarm or message to begin feeding, which would send a "start feeding signal" so the automation controller can take over the truck.

This can be beneficial if a livestock feedlot operator has a desire to partially feed bunks. One example is if the pen is populated below its potential capacity.

4.2.5.3 How to Use

In one example, the partial feed option can be available for selection by the driver and operate in conjunction with the state flow (described below) as follows:

State Flow

1. Driver selects to partially feed the bunk,
2. When the driver moves the vehicle to the correct/adjusted start position for the bunk, the feedlot mapping system (e.g. Micro Accu-Trac® system) sends a "start" signal to the automation controller of the truck.
3. The driver is alerted (e.g. the fault light flashes) and the driver is prompted to press "start" of the user interface box (such as in FIG. 3A).
4. The truck automation controller takes control and begins the partial feeding according to pre-set partial ration in the system for the particular bunk.

4.3 Options and Alternatives

As discussed earlier, the foregoing exemplary embodiments show how to make and use some forms of the invention. Other forms and embodiments are possible. For example, variations and modifications to the embodiment described above obvious to persons skilled in this technical field are included even if not specifically mentioned.

4.3.1 Optional Feature (Telemetry)

4.3.1.1 Overview

One optional feature that can be used with the automated mode of the present invention is telemetry. The technical solution is to being able to monitor any number of feed dispensing units and how they operate across the world. See diagrammatic illustration at 330 of FIG. 22.

In one non-limiting example, this feature is the ability for each truck 10' (1)-(n) to report wirelessly via a wireless network 336 its state of operation and operating parameters so as to a remote station 334 (e.g. Applicant Roto-Mix). The remote station 334 can record each truck's operations, can collect data for all trucks, and mine that data for insights into how they operate for varying locations/conditions, and/or for machine-learning to perfect the algorithms used for operation of trucks for different locations/conditions/feed types or prescriptions, etc. it can also be used to see if there are malfunctions or maintenance issues, to either prompt the sending of repair personnel to the site of the truck, or at least attempt remote diagnostics and repair.

4.3.1.2 How to Make

As will be appreciated by those skilled in the art, such telemetry can be operatively installed with respect to exemplary embodiments of the invention in any of a variety of ways.

In one example, the system 330 includes connection to a third party system that has wireless telemetry 332 build into it. One example is Accu-Trac®. This feature can be used to send or receive data via, for example, a wireless enabled tablet computer or other digital device. The wireless communication 332 can be via any of a number of wireless last mile systems (which can use wireless to communicate with the tablet but then hard wired or partial hardwired/partial wireless communication systems to reach end points such as central computers at the Applicant or a designated agent of the Applicant).

Basic principles of telemetry, including how to make and operate telemetry between widely dispersed objects, is at U.S. Pat. No. 9,832,547, which is incorporated by reference herein.

4.3.1.3 How to Use

As indicated above, the uses of telemetry with the automated mode of feed dispensing can be many and varied. Such communication of data, and/or instructions or other signals, between any feed truck and a remote center or device can take many forms and embodiments. The designer or user of the system can select and program this feature according to need or desire.

4.3.2 Optional Feature (Dual direction discharge)

4.3.2.1 Overview

An option for use with the automated mode could be a feed discharge sub-system 310 that can dispense feed from the bulk feed box 11 of the truck 10' in more than one direction. One non-limiting example is shown diagrammatically in FIGS. 20A-C. Called "dual direction feed", the technical solution is to substitute for a single lateral direction discharge to bunks system as shown in FIGS. 2A-D, the two lateral direction subsystem 310 of FIGS. 20A-C.

4.3.2.2 How to Make

The substituted discharge system 310 would have a discharge door 14R and L and spout 16R and L on each opposite lateral side of the truck feedbox 11. The same discharge conveyor 15 could be used to move bulk feed 8 from the bulk feed box 11 to deliver feed laterally left or right or both by simply controlling the direction of travel of conveyor 15.

Additional hydraulics for the additional door and spout could be added, as well as (if not already a part of the system) ability to move the discharge conveyor in opposite directions. Whether by adding a manual control to the user interface, or by automatic recognition by sensors of the position of the truck relative to a hunk, the automation controller could automatically control amount of opening of the appropriate discharge door (left side or right side), the lowering of the appropriate spout (left or right side), and the direction of movement of the discharge conveyor depending on left or right discharge.

Further, such a dual direction discharge 310 could optionally utilize the feedbox 11 overload feature 160 discussed earlier to further control evenness and accuracy of ration delivery.

4.3.2.3 How to Use

This feature would allow control of correct prescription out either side with appropriate conveying mechanism, using any of the other features of the automated truck according to the invention.

4.3.3 Optional Feature (Machine Learning)

4.3.3.1 Overview

An optional feature 340 according to the invention would be machine learning to optimize feed delivery. The technical solution would promote the optimizing of performance of each truck 10' by monitoring how close to ration goal was accomplished in a first pass feed delivery to a given bunk, then trying adjustments to get closer to goal of uniform distribution of feed between ends of that bunk for one or more subsequent pass or passes for that bunk. This machine learning could be just to try to optimize even and accurate delivery of a prescribed ration for a given feed for a bunk. It could also be applied to different feeds, prescriptions, trucks, environmental conditions, etc. This is diagrammatically illustrated at FIG. 23.

This feature would include sensors 344 and data collection that would allow a software algorithm 342 to (a) evaluate multiple variables involved in getting a prescribed feed load for each bunk to distribute completely and uniformly along the length of the bunk (so each animal is given access to an appropriate fraction of the feed delivered along the bunk) and then (b) adjust operations, if needed, to meeting those goals better. For example, original set-up of a truck with the automated system 100 may not precisely meet the goal of uniform delivery of the entire prescribed load from one end of a bunk to opposite end—no more and no less. The algorithm 342 can analyze sensors, feed-back, and data from an original run/pass at a bunk, determine any offset from the goal, and automatically adjust operation in a second run/pass it estimates will get closer to a perfect run/pass. The system can thus automatically "learn" from prior performance how to improve performance on a bunk by bunk basis.

4.3.3.2 How to Make

Machine learning based on sensed feedback is a technique used in many situations. It could be applied here in any of a number of different ways. One example is as follows.

Adjustments could be made in testing of a truck in automated mode. A calibration of operation of the automated mode of the feeding system to close the intended parameters (e.g. hit the prescribed call weight within the prescribed length of the bunk line) could be made based on such testing.

Machine learning could be as follows. The system could be placed in a "learning" mode to essentially learn how the rations are fed out for that truck. In one test by the applicant, while in such learning mode for testing, the driver got within 10-25 pounds of the call weight and hit the call weight exactly on several (e.g. four) pens/bunks in a row. This can be derived, in one example, by monitoring the weight of the bulk feed box and contents before dispensing a ration, and then after. The offset in weights before and after could be compared to the pre-stored prescription (prescribed call weight). That testing could allow a calibration of the particular truck to be set/adjusted, at least for a specific type, density, etc. of feed. That calibration is essentially an optimized setting learned by the system. That calibration might be used for other trucks or it could be used just for the tested truck.

An option would be remotely access the system 100 of a truck 10' during a testing period. Telemetry (see FIG. 22 and discussion above) could be used to communicate results during testing/calibration. The results can be analyzed at a central remote site. Telemetry could be used to adjust any true k without personnel traveling to the site of the truck. Telemetry cold also be used for monitoring, troubleshooting, and updating a truck's system in the field anywhere in the world so long as reachable with a telemetry system.

4.3.3.3 How to Use

As set forth above, testing and adjustment to optimize feeding performance can utilize calibration or machine learning. This can be done in pre-calibration of individual trucks.

A possible extension is "on-the-go" adjustment. The system could monitor how close to call weights are being achieved during actual use of each truck, and adjust feeding operations automatically to try to reach or maintain prescribed call weights with actual dispensed call weights.

Basic principles of machine learning are at US20190212749A1, which is incorporated by reference herein.

4.3.4 Optional Feature (Fully Autonomous)

4.3.4.1 Overview

Embodiments of the invention described above are essentially or substantially autonomous, at least for feed ration dispensing, but may require minimal driver manual involvement. For example, an embodiment described above requires driver steering of the vehicle while automated mode of dispensing controls other vehicle functions as well as feed dispensing. Optionally, principles of the invention can be implemented in a more fully autonomous system. This is diagrammatically illustrated at 350 at FIG. 24.

The applicant envisions what will be called fully autonomous mode 350, which is that the afore-mentioned autonomous mode embodiments would also automated vehicle steering. In essence, fully autonomous mode would add automated steering to the vehicle 10'. This could allow driverless operation for a totally autonomous moving vehicle. Fully autonomous also can include automatic control of braking, transmission, and all functions of the vehicle.

4.3.4.2 How to Wake

A variety of agricultural vehicles have hardware and software that control movement through a field hands-free of the operator. An optional embodiment of the invention could be implemented in a truck or other motive vehicle that would move automatically via a georeferenced map relative to the bunks or with some other automated navigation system or auto steer system 352 operatively installed on truck 10', which would be in operative communication with automation controller 120.

Basic principles of automatic steering and navigation can be found at US20180154936A1, which is incorporated by reference herein.

4.3.4.3 How to Use

If this feature is installed, the feedlot operator can simply start the vehicle, its automated steering and the automated feed dispensing mode. Based on a prior-obtained georeferenced map, the automatic steering 352 can control vehicle steering to present the vehicle 10' with side feed delivery to the appropriate side for each bunk to be supplied with a feed ration, and the rationing controlled in automated mode as described above.

Autonomous braking: Besides the various options for autonomous steering, there are a couple of options for integrating autonomous braking. Many truck manufacturers now offer an option for electronic braking systems that allow the integration of active and emergency on road braking that could be leveraged to stop the vehicle at the end of a prescribed bunk length. Other options include the various aftermarket electronic braking options or electro-mechanical braking robots.

One form of automated braking is with what is sometimes called a pedal robot. Sometimes combined with a vehicle steering robot (for full control of a vehicle) a combined brake and accelerator robot (CBAR) is a widely used pedal robot, allowing precise vehicle speed control as well as brake or throttle inputs. It is an electro-mechanical actuator that can be controlled by the automation controller 120 to control pedal position. In the case of braking, a compact rotary actuator is mounted in the cab near the brake pedal and extends or retracts a rod connected to the brake pedal. The actuator has enough force (hundreds or thousands of Newtons) and travel range (e.g. 130 mm) to push the brake pedal to the floor at a relatively quick rate (e.g. 300 mm/sec). CBAR can be upgraded with a backup safety brake system for use in driverless testing. They can be quickly installed in almost any vehicle. See, e.g., information at Vehicle Pedal Robots at www.abdynamics.com/en/products/track-testing/driving-robots. See, also, model RBR600 or RBR1500 brake robots from AB Dynamics, Middleton Drive, Bradford on Avon, Wiltshire, BA1 1 GB (England) and www.abynamics.com/resources/files/SP-6031-Pedal Robots-Outline.pdf for further details. In some configurations, a human driver can operate the vehicle from the driver's seat, if needed or desired to override the robot(s) and take control of the vehicle. A Rotary Brake Robots use compact rotary actuators which provide a very high apply rate. The RBR1500 offers the highest performance (1600N max force) is designed to give the combination of high force and rapid apply rate needed for Brake Assist System testing. The RBR600 uses the same actuator as a CBAR600 for moderate brake force testing (750N max force).

An AR1 accelerator robot from AB Dynamics uses a compact rotary actuator to control throttle pedal position. Used on its own it can give accurate speed control for constant speed/acceleration, and it can be combined with a BR1000 to give full speed control (including deceleration). It can also be used for control of throttle pedal position. It can be used in combination with a brake pedal robot.

4.3.5 Optional Feature (Use on Other Types of Feed Dispenser Set-Ups)

4.3.5.1 Overview

As mentioned earlier, aspects of the invention can be applied to other types of feed dispensing vehicles. One example is where the vehicle has only a bulk feed conveyor to a discharge door, and not a bulk feed conveyor and a side discharge conveyor. The dispensing is still essentially autonomous, at least for feed ration dispensing, with minimal driver manual involvement.

4.3.5.2 How to Make

A single conveyor moves bulk feed to a discharge door. Like other embodiments described herein, the discharge door can be independently controlled between fully closed and fully open positions. The automation controller would be programmed to control conveyor movement (start/stop, and speed) as well as amount of opening of the discharge charge to, in correlation, control an even and accurate ration along the length of a bunk according to principles of the invention.

4.3.5.3 How to Use

If this feature is installed, the driver can simply start the vehicle, ready the conveyor, start the automation controller and steer the vehicle along the bunk. Based on a prior-obtained georeferenced map and ration dose for the bunk, the automation controller 100 controls the conveyor and opening of the discharge door.

4.3.6 Optional Feature (Proportional Door Opening Control)

Option of proportional-integral-derivative controller (PI control 400) for proportional door valve based on vehicle speed and scale weights. With reference to FIG. 25, in the case of a mechanical mixer 11, control of the discharge door 14 opening could be performed by using proportional-integral (PI) control logic 405 to use feedback from scale 50 data and vehicle speed to compare the desired feed rate to the measured feed rate. In combination with a proportional hydraulic valve 403, this would provide smooth and accurate door 14 control with constant feedback throughout the autonomous feed cycle. While this control system does not require absolute door position feedback, the addition of a position sensor 402 either embedded into the hydraulic cylinder 401 or mounted externally, could allow for increased responsiveness. By including an initial door 14 opening height dependent on desired feed rate, the system could target that absolute position before passing control to the PI logic 405, or use additional feedforward values to increase door speed when it is measured to be farther away from the target height. The position sensor 402 would also be valuable in preventing the system from over or under extending the hydraulic cylinder 401 if the desired feed rate were to be outside of the mechanical range of the mixer 11.

A proportional-integral-derivative controller (PID controller or three-term controller) is a control loop mechanism employing feedback that is widely used in industrial control systems and a variety of other applications requiring continuously modulated control. They are commercially available. A PID controller continuously calculates an error value as the difference between a desired setpoint (SP) and a measured process variable (PV) and applies a correction based on proportional, integral, and derivative terms (denoted P, I, and D respectively), hence the name. In practical terms, PID automatically applies an accurate and responsive correction to a control function. An everyday example is the cruise control on a car, where ascending a hill would lower speed if constant engine power were applied. The controller's PID algorithm restores the measured speed to the desired speed with minimal delay and overshoot by increasing the power output of the engine in a controlled manner.

Alternatively, to prevent the over/under extension of the hydraulic cylinder 401 for the door 14 opening, proximity sensors 404 could be mounted to provide the automation controller 120 with feedback in the event that the door 14 were to open or close completely. If used with some variation of autonomous braking, the system could target ground speed and engine speed separately to allow a mechanical mixer to increase its feed rate.

PI control is known to those skilled in this technical field and can be applied in the manner discussed above to door opening control by appropriate logic.

4.3.7 Optional Feature (Position Sensing Hydraulic Cylinders)

4.3.7.1 Overview

An optional feature discussed above for use with the automated mode could be the addition of a position sensor 402 mounted internally or externally to the hydraulic cylinder 401 (see FIG. 25) used in control of the discharge door 14 opening. This would allow a variable door height to maintain its target, regardless of environmental conditions that could affect the flow of hydraulic fluid or mechanically slow the door opening, while also increasing the options to vary door height for other variables.

Benefits of positioning sensing hydraulic cylinders can include: Automation: Allows a system to get things done faster and more efficiently without sacrificing performance. Also improve productivity by allowing increase in cycle speeds safely. Precision and control: Provides load-moving equipment precise, controlled load holding and movement, especially in applications involving heavy loads. The instantaneous feedback give exact cylinder position so that loads can be held longer and control equipment movement managed more effectively. High accuracy and repeatability: Provides predictable, consistent placement. By providing electronic feedback in real-time, position sensing hydraulic cylinders help maintain consistent and accurate position equipment. Safety: The load holding capabilities of position sensing cylinders improves safety on the jobsite. Remote capabilities also enhance safety by allowing workers to control equipment from a safe distance. Plus, automating manual tasks helps prevent operator fatigue.

Position sensing hydraulic cylinders come with different sensors, connections, and output types. Enclosed sensors are protected from physical damage and environmental elements. Such cylinders are available commercially. One non-limiting example is a position sensing hydraulic cylinder from Texas Hydraulics 3410 Range Road, Temple, Texas 76504 (USA) with analog output signal proportional to cylinder stroke, standard connector, accuracy 0.04%, and repeatability 0.005%. The position-sensing feature in the position-sensing cylinder provides instantaneous analog or digital electronic position feedback information from the cylinder that indicates the amount of rod extension throughout the range of stroke.

4.3.7.2 How to Make

One option to provide the primary automation controller 120 with door position feedback would be to replace the standard hydraulic cylinder 401 with a "smart cylinder" 407 (FIG. 26). Such a cylinder 407 would have a linear transducer built into the assembly. Communication could vary (CAN bus, analog or PWM) when being wired directly to the main automation controller 120.

Alternatives to the integrated position sensor include either linear and rotary position sensors of various types (potentiometer, transducer, etc.) to be mounted externally to the discharge door or hydraulic cylinder. Wiring and communication would remain the same, regardless of option.

4.3.7.3 How to Use

This feature would passively adjust the door 15 height for the operator depending on pre-prescribed logic 408 to match the specific variables of the automated feed cycle.

Smart cylinders are operably in harsh environments and high temperatures, increase efficiency and have high levels of performance. Also referred to as electrohydraulic control, intelligent cylinders, and electronic position sensing cylinders, they are specifically designed for direct stroke measurement. By integrating a linear sensor into a cylinder, electronic feedback is provided including its stroke position and velocity. This data is used in many ways to increase equipment productivity and safety while reducing maintenance and downtime. The smart cylinder incorporates a linear transducer (sensor) that can be mounted either internally or externally. The sensor provides instantaneous feedback of position and velocity and can be outputted to various analog and digital formats. Accuracy as high as +/−0.004 inches (+/−0.2 mm) can be achieved, depending on cylinder stroke length and other design parameters. Smart cylinders have the following benefits: Dynamic self-adjusting. A system can feed multiple inputs into a control mechanism and have that sensor react according to those inputs. For example pressure, speed, and velocity can be programmed to dynamically enable cylinder cushioning. Remote adjustability. Settings can be adjusted and fine-tuned on the fly remotely. Repeatability. Recurring operation can be programmed with high precision, accuracy, and repeatability to the sub-millimeter range. Lockout/safety. A system can be programmed to lockout a particular function. Smart cylinders are commercially available. One source is RHK Hydraulic Cylinder Services, Inc., 13111 159 St. NW, Edmonton AB T5V (Canada).

4.3.8 Optional Feature (Vehicle Dynamics Based Scale Compensations 4.3.8.1 Overview An optional feature 410 (FIG. 27) that can be used to increase the accuracy of the automated mode discussed herein for truck 10' over rougher terrain is a package that would provide scale weight compensations based on principles of vehicle dynamics. This can also increase the reliability of the system in the use of weigh measurements to help inform the operation of the system.

Because the load cells 412 or digital scale(s) used to measure the amount of feed in the feedbox 11 of truck 10' measure force in one direction, they can be affected by the changing accelerations seen by the vehicle 10' traversing rough terrain. In some cases, rough roads can cause cyclic increases and decreases in acceleration, and thus spikes in the force measured by the load cells 412. In other cases, uneven terrain can cause the vehicle 10' to lean to a degree that the load cell's 412 measuring axis is no longer aligned with gravity, causing its relative force measured to decrease. With the primary objective being the delivery of a certain mass of feed, additional sensors 414 can be included to compensate for these changes in acceleration and isolate the mass.

4.3.8.2 How to Make

The system would use a combination of sensors 414 (e.g. accelerometers and inclinometers) to provide data to a vehicle dynamics model programmed into the main automation controller 120 or separate controller used in the measurement of scale 50 weights. From this, the number of sensors and scope of the programmed vehicle dynamics model 415 could vary depending on price point of the option and required terrain dependent compensations (vertical accelerations from humps versus vehicle inclination effects or both). This vehicle dynamics model 415 would then produce the appropriate compensations to modify the initial measured scale forces for use by the automated system.

In one example, the option would include a sensor package 414 with a 2-axis inclinometer and single axis accelerometer mounted near every load cell 412. Compensations 416 could then be made for each load cell's force measurement separately before being summed for use by the automated system 100. Another example could include a single 6-axis inertial measurement unit providing data to a more expansive vehicle dynamics model (including an increased number of vehicle and feed location variables for center of mass calculations) to provide compensations for a single weight measurement.

One non-limiting example of a sold-state gyro-compensating inclinometer is Model IQS J1939 Inclination Sensor from STW Technic, LP of 3000 Northwoods Parkway, Suite 240, Peachtree Corners, GA 300071 (US). It utilizes MEMS technology to precisely output angular data to a J1939 bus, automatically detects bus speed 125 Kbps to 1 Mbps, automatically detects mounting configuration, is shock resistance up to 50 g, and is environmentally robust. Measurement angles are between +/−65 degrees (pitch and roll version) and +/−180 Degrees (blade version), with resolution of 0.002 degrees and 0.0007 degrees respectively, and accuracy of +/10 degree. It can be field configurable for pitch and roll or blade angle measurements, raw accelerometer, gyroscope and temperature data measurements, and other possible features.

4.3.8.3 How to Use

As mentioned previously, the logic for this type of scale integration could be integrated either into the primary automation controller 120 or into a separate controller used to measure the weight of feed. In the case of integrating the option into the automation controller 120, the system would work passively with the automated feed system, increasing the accuracy of mass fed without additional operator interaction. In a case where the logic was integrated into a separate controller, this controller could be used along with or replaced by a display to act as the primary scale indicator for the vehicle. The operator would then be able to monitor the already compensated scale measurements as they are passed to the automation controller 120.

4.3.9 Optional Feature (Conveyor Speed Sensor for Use in Calculating Feed Rate)

4.3.9.1 Overview

One option 420 (FIG. 28) to calculate the rate at which the automated system 100 is delivering feed is to include a hall effect type speed sensor 424 on the conveyor 15. In combination with data pertaining to the density or type of ration being delivered, this speed data would be supplied to the automation controller 120 where the rate of feed being dispensed could be calculated with or without the addition of scale measurements. This can be used by itself or with other sensed parameters to promote accurate feed rates. For example, FIG. 9A-3 indicates that the system according to the invention might derive information about the amount of feed 8 in feedbox 11 from a level-sensor (see Binmaster connection in lower right corner of the figure) (see products of Bin Master, 7201 N 98$^{th}$ St, Lincoln, NE 68507 (USA). Such level sensors could alert the system when feedbox 11 is full or empty, or could allow derivation of amount of feed 8 dispensing in each ration 9 from lowering of feed 8 in feedbox 11. As indicated herein, a digital scale 50 is one way to do so. But a feed level sensor could be used, including in combination with, digital scale 50 or other sensors to provide feedback and information to automation controller 120 to assist in automated dispensing according to the invention.

4.3.9.2 How to Make

A hall effect or other frequency-measuring sensor 424 would be mounted near the conveyor's 15 driven shaft 422 along with an indicator ring mounted to the referenced shaft 422. Alternatively, a hydraulic motor 422 with an integrated speed sensor could be mounted to the conveyor 15. Direct wiring with the primary automation controller 120 would depend on sensor communication type (CAN bus, frequency signal, etc.).

The automation controller 120 would then convert frequency data into linear conveyor speed for use in calculating the rate at which feed is being dispensed (along with feed density and known variables such as discharge opening area). This feed rate could then be used either on its own to adjust conveyor 15 speeds appropriately to dispense the prescribed amount of feed, or in combination with measurements from the scale weights to smooth any electronic or mechanical noise inherent in the electronic measurements of force in a mobile machine.

439.3 How to Use

This option would work passively through the logic 426 programmed into the primary automation controller 120 to calculate the rate at which feed is being dispensed and adjust said feed rate to snatch the appropriate rate for the prescribed automated feed cycle.

One non-limiting example of a speed sensor for this use is a model 55505 Hall Effect Flange Mount Geartooth Speed Sensor from Littelfuse, Inc. of 101 Brooks Ave. South, Thief River Falls, MN 56701 (USA). It is designed for harsh environments with internal circuit protection. It includes an on-board 10-bit analog-to-digital (A/D) converter with standard connectors.

4.3.10 Optional Feature (Touchscreen Scale Indicator/User Interface)

4.3.10.1 Overview

An optional feature 430 (FIG. 29) could be a touchscreen display and user interface 432 (or as a replacement or in addition to the standard scale 50 indicator). This display 432 could include relevant information 433 to the operator, including but not limited to: scale weights, hydraulic pressures and temperatures, warnings and diagnostics, etc. As a touchscreen, this user interface could also replace various switches and controls throughout the system. In some scenarios, the display unit could act as a standalone controller to operate many aspects of an automated feed system 100.

4.3.10.2 How to Make

A programmable touchscreen 432 (such as the New Eagle VC800 from New Eagle of Ann Arbor, Michigan (USA)) could be programmed to display a variety of gauges 433D and indicators 433A-C specific to an application. The ability to communicate with CAN bus, analog signals or RS232 allows integration with most existing systems in the feed trucks for both purposes as a display and to allow user interaction with the feed unit 11 and automated system 100. This could include the replacement of the standard button and toggle switch user interface 110 for the automated system 100. Further, the programmable nature of the touchscreen 432 allows the option to include simple logic directly in the display unit, allowing it to act as a standalone automation controller in cases where larger numbers of inputs/outputs are not required.

4.3.10.3 How to Use

The operator would interact with the touchscreen display 432 in a variety of ways depending on other options and requirements. As mentioned previously, the display could function solely as a display to relay system and diagnostic information. It could also replace existing manual controls in a way that allows operation of the system through on-screen controls.

A non-limiting example of such a display is Model Raptor VeeCAN800 (part number DISP-VC800-1402) from New Eagle Consulting, of Ann Arbor, MI (USA). A seven-inch touchscreen display with two CAN channels and twenty-five pins of I/O, it has a rugged, environmentally-sealed enclosure, fourteen analog inputs, three digital inputs, eight outputs, two CAN channels, and a USB port for data logging. IT is MATLAB/Simulink programmable with a Freescale iMX 286 454 MHz processor, with 128 MB flash and 128 MV Ram Memory. Its compiler is CodeSourcery 2010.1.0.202. It can be programmed not only to display information but also to act as a stand-alone controller for even complex electro-mechanical systems. The unit can leverage all native Simulink blocks and features to create any control logic necessary for their application. It is capable of interfacing with any CAN-based actuator or sensor.

Such a display/controller 432 could present data to the driver (e.g. call weights and actual delivered weights, or other information) and, in addition, serve as at least a partial auxiliary automation interface 110 (having at least some of the features of 110).

4.3.11 Additional Option (Utilizing CAN Bus Hydraulic Valves)

4.3.11.1 Overview:

With reference to FIG. 30, another possible optional feature 440 is illustrated. The utilization of hydraulic valves that communicate via CAN bus 446 opens up the option to greatly reduce the wiring and hardware required to control an automated feed system. This would allow greater flexibility in packaging the hardware required in tighter places (such as tractor cabs versus truck cabs).

One non-limiting example is D 7700 CAN Directly mounted CAN controls from HAWE Hydraulik SE of Einsteinring 17, 85609, Aschheim/Munich, Postfach 11 55, 85605 Aschheim (Germany). It includes directly mounted CAN controls for proportional directional spool valves used to control the direction of movement and the infinite adjustment of the movement speed of hydraulic cylinders independent of the load. Multiple hydraulic cylinders can be run at the same time and independently of each other at different speeds and pressures, as long as the sum of the partial flow rates required for this is covered by the total delivery flow on the pump side. It includes simple wiring, hysteresis minimization through closed-loop slider position control, high repeat accuracy due to linearized characteristics, reduced commissioning time thanks to customized settings and factory calibration, very fast reaction behavior, and good diagnostic options. The CAN bus (Controller Area Network) is an asynchronous, serial bus system requiring just two wires for data transmission. According to ISO 11989-2 (High-Speed Medium Access Unit), twisted-pair cables with a surge impedance of 108 to 132 Ohm are recommended as a bus medium. Conventional data transmission formats are protocols CANopen2.0 A & B and J1939, based on 11 Bit or 29 Bit address data.

4.3.12 Other Options and Alternatives

As will be appreciated, other options or alternatives are possible. Some are indicated in the description above. Others are, of course, possible.

For example, the automated mode dispensing can be applied in analogous ways to other types of feed dispensing vehicles than shown in the exemplary embodiments.

Also, automated mode could be on trucks with on-board dispensing of a variety of materials other than feedlot rations.

Also, aspects of the invention could be applied to trucks pulling trailers with the bulk feed.

What is claimed is:

1. A system for at least substantially autonomous feed delivery system from a motorized vehicle for evenly dispensing a specified amount of feed into a specified distance to a feed bunk of feed drop location, the system comprising:
   a. a motorized vehicle with motive power, steering, and braking capabilities capable of manual driver control;
   b. a bulk feed box mounted on the vehicle;
   c. a feed dispensing system mounted on the vehicle including mechanized components to move feed from the bulk feed box to out of the vehicle;
   d. an automation controller installed to the vehicle and operatively connected through interfaces to the motor power and braking capabilities of the vehicle, the automation controller having a user interface with manual user selection between automated control and manual driver control and selective "start" and "stop", when automated control is selected, programmed for:
      i. receiving pre-established input data regarding geo-location of each bunk or feed drop location, the ration density, type, and amount for each bunk or drop, and
      ii. automatically controlling of both the mechanized components of feed dispensing from the vehicle as well as most driver inputs for the vehicle for each bunk or drop,
   e. so that, even and accurate rations prescribed for each bunk or location are promoted to, in turn, reduce human error and improve efficacy and efficiency of feed delivery for a livestock producer.

2. The system of claim 1 further comprising:
   a. integration of a load sense hydraulics control with the vehicle to provide consistent available full hydraulic power regardless of vehicle engine rpm or speed to assist even and accurate feed dispensing, including at relatively low engine rpms.

3. The system of claim 2 wherein the load sense control comprises:
   a. powering a hydrostatic pump with rotational power (PTO) of the motive power (engine or motor) of the motorized vehicle;
   b. operating one or more hydraulic actuators with the hydrostatic pump;
   c. wherein the hydrostatic pump creates a hydraulic flow that is adjustable independently of rpm of the engine or motor;
   d. so that feed delivery with the hydraulic circuit can be controlled regardless of engine rpm of the motorized vehicle engine, and independent adjustment of the hydraulic circuit can be achieved without influencing ground speed of the vehicle.

4. The system of claim 1 wherein:
   a. the mechanical components to move feed from the bulk feed box include one or more of (1) a conveyor having an adjustable speed, (2) a door having an adjustable opening, and (3) a spout having an adjustable angle in a vertical plane;
   b. the motorized vehicle includes throttle and ground speed controls;
   c. the pre-established input data comprises a unique bunk identifier for each bunk, start and stop geolocation points for each bunk, ration information for each bunk including a call weight, vehicle state information for the vehicle when at each bunk, and feed box weight;
   d. and, when activated, the automation controller operates in coordination the throttle and ground speed of the vehicle and at least one of the mechanized components to move feed from the bulk feed box to promote more consistent, even, and accurate dispensing of the ration along each bunk and better control of call weights by continuously adjusted discharge rate of feed from the bulk feed box to each bunk based on bunk length and prescribed call weight for the bunk;
e. with the selective ability to de-activate the automation controller to assume manual control of the vehicle or mechanized components to move feed from the bulk feed box.

5. The system of claim 1 further comprising:
a. integration of georeferenced bunk or drop location data with the dispensing control sub-system to improve accuracy of dispensing.

6. The system of claim 5 wherein the integration of georeferenced bunk or drop location data to improve accuracy of dispensing comprises one or more of:
a. positive identification of each bunk or drop for accuracy in correlating the correct prescription for each bunk or drop;
b. lock out of dispensing unless confirmed that the dispensing is to the correct bunk or drop location; and
c. ability to customize the ration at each bunk or drop, including for a partial ration if desired.

7. The system of claim 1 further comprising:
a. utilizing machine learning to optimize automated dispensing by comparing instructed call weight of a ration to be dispensed with actual dispensed weight in the automation controller for any offset, and adjusting by the automation controller one or more of the mechanized components to move feed out of the bulk feed box to reduce such offset for a subsequent feed dispensing of the same or similar ration.

8. The system of claim 1 further comprising a subsystem to:
a. monitor amount of feed from the bulk feed box conveyed to the feed dispensing subsystem;
b. interrupt feed conveyed from the bulk feed box if a sensor indicates an overload at the feed dispensing subsystem; and
c. ending the interruption if the sensor indicates no overload.

9. The system of claim 8 wherein the sensor comprises a load sensor positioned at a height in the feed dispensing subsystem and configured to instruct the interruption above sensing feed at that height and to release the interruption when sensing feed is not at that height.

10. The system of claim 1 further comprising:
a. a wireless transceiver operatively connected to the automation controller of one or more of the motorized vehicles;
b. a remote digital device to wirelessly communicate with each automation controller of each said motorized vehicle via its wirelessly transceiver, so that data of operation of each said motorized vehicle can be collected and evaluated, stored, or processed individually or collectively.

11. The system of claim 1 wherein the feed dispensing system comprises:
a. a conveyor to deliver feed from the motorized vehicle to an opposite lateral side of the motorized vehicle.

12. The system of claim 11 further comprising:
a. an autosteer sub-system to automatically steer the motorized vehicle to a bunk or bunks.

13. The system of claim 1 further comprising:
a. retrieving a prescribed feed ration for a partial bunk;
b. applying the prescribed ration to the partial bunk.

14. The system of claim 1 applied to automatic control of a single conveyor to an independently controlled discharge door opening to regulate even and accurate dispension of a ration of feed along a bunk.

15. The system of claim 1 wherein the feed dispensing system includes a discharge door that is adjustable between fully closed and fully open positions by an actuator having a range of positions correlated to fully closed and fully open positions of the discharge door, and further comprising one or more of (a) a position sensor for sensing the position of the actuator and (b) proximity sensors for sensing fully closed and fully open positions of the door, and PI logic to control the actuator in response to readings from the position sensor and/or proximity sensors.

16. The system of claim 15 wherein the actuator is a hydraulic cylinder and the PI logic controls a proportional hydraulic valve.

17. The system of claim 15 wherein the actuator is a smart hydraulic cylinder and the position sensor is built into the smart hydraulic cylinder.

18. The system of claim 1 further comprising at least one load cell associated with a digital scale to measure weight of the bulk feed box and any feed in the bulk feed box from which rate of discharge of feed from the feedbox can be derived, and further comprising sensors to monitor one or more of acceleration or incline of the load cells, and a compensation algorithm to compensate for errors in weight measurements from the load cell(s) because of change in acceleration or incline during feed dispensing.

19. The system of claim 1 wherein the feed dispensing system comprises a discharge conveyor which moves feed from the feedbox through a discharge door in the feedbox, and further comprising a speed sensor operatively connected to the discharge conveyor and logic to derive speed of the discharge conveyor to assist in estimating rate of discharge of feed from the feedbox during operation.

20. The system of claim 1 further comprising an interactive display available to a driver of the vehicle, the interactive display providing one or more of:
a. information about the operative of the dispensing to the driver;
b. active selectable controls to the driver.

21. The system of claim 1 wherein at least some communications between components are via a CAN bus.

22. A method of dispensing a prescribed ration of feed to each of a plurality of individual feeding locations comprising:
a. loading feed materials capable of being dispensed as the prescribed rations in a feedbox carried on a motor vehicle having throttle, braking, and steering controls capable of manual driver control, the feedbox comprising a set of dispensing components to adjustably control the dispensing rate from the feedbox;
b. upon selection through a user interface of automated mode, automatically controlling at least the throttle and ground speed of the vehicle through interfaces with the throttle and braking controls, with and selective "start" and "stop", and dispensing of prescribed rations through the dispensing components of the feedbox to dispense the prescribed ration to any of the plurality of individual feeding locations by comparing an instructed ration to be dispensed with identifying information of a bunk and adjusting one or more of the set of dispensing components to move feed out of the bulk feed box to dispense the prescribed ration evenly and accurately between ends of the bunk.

23. The method of claim 22 wherein the prescribed ration comprises a mass of feed and the prescribed ration can be the same or different for any two or more of the plurality of feeding locations.

24. The method of claim 22 wherein the plurality of different feeding locations each comprises a feed bunk or drop zone having a length with starting and ending points.

25. The method of claim 24 wherein the dispensing rate of a prescribed ration is controlled to provide an even distribution of the ration between starting and ending points of the feed bunk or drop zone.

26. The method of claim 22 wherein the set of dispensing components comprises:
   a. a belt with variable speed actuator to move feed in the feed box towards a dispensing discharge;
   b. a door with adjustable actuator to move the door over a range of opening positions between closed and fully open conveyor to allow feed out of the feedbox; and
   c. a conveyor with variable speed actuator to move feed out the door.

27. The method of claim 22 wherein the vehicle throttle and braking are automatically controlled.

28. The method of claim 27 wherein the vehicle steering is also automatically controlled.

29. The method of claim 22 wherein the geolocation and prescribed ration of each of the individual feeding locations is pre-stored and accessible prior to dispensing the feed.

30. The method of claim 22 further comprising a manual override to the automated dispensing.

* * * * *